United States Patent
Porter et al.

(10) Patent No.: US 6,694,438 B1
(45) Date of Patent: Feb. 17, 2004

(54) SYSTEM FOR CONTROLLING THE DELIVERY OF POWER TO DC COMPUTER COMPONENTS

(75) Inventors: Robert M. Porter, Livermore, CO (US); Gennady G. Gurov, Fort Collins, CO (US); Anatoli V. Ledenev, Fort Collins, CO (US)

(73) Assignee: Advanced Energy Industries, Inc., Fort Collins, CO (US)

(*) Notice: Subject to any disclaimer, the term of this patent is extended or adjusted under 35 U.S.C. 154(b) by 481 days.

(21) Appl. No.: 09/584,412

(22) Filed: May 31, 2000

Related U.S. Application Data

(60) Provisional application No. 60/144,342, filed on Jul. 16, 1999, and provisional application No. 60/142,102, filed on Jul. 2, 1999.

(51) Int. Cl.⁷ .............................. G06F 1/26; H02M 5/45; H02M 5/00
(52) U.S. Cl. .......................... 713/300; 363/27; 363/157
(58) Field of Search ........................... 713/300; 363/37, 363/157, 127, 271, 281

(56) References Cited

U.S. PATENT DOCUMENTS

| | | | |
|---|---|---|---|
| 3,628,123 A | 12/1971 | Rosa et al. | 321/9 |
| 3,848,175 A | 11/1974 | Demarest | 321/11 |
| 3,919,656 A | 11/1975 | Sokal et al. | 330/51 |
| 4,449,174 A | 5/1984 | Ziesse | 363/21 |
| 4,605,999 A | 8/1986 | Bowman et al. | 363/19 |
| 4,785,387 A | 11/1988 | Lee et al. | 363/21 |
| 4,788,634 A | 11/1988 | Schlecht et al. | 363/21 |
| 5,019,717 A | 5/1991 | McCurrey et al. | 307/66 |
| 5,179,512 A | 1/1993 | Fisher et al. | 363/127 |
| 5,187,457 A | 2/1993 | Chawla et al. | 333/170 |
| 5,187,580 A | 2/1993 | Porter, Jr. et al. | 330/207 |
| 5,406,051 A | 4/1995 | Lai | 219/130.1 |

(List continued on next page.)

FOREIGN PATENT DOCUMENTS

| | | | |
|---|---|---|---|
| JP | 09261953 A | * 10/1997 | H02M/3/28 |
| WO | WO 00/57543 | 9/2000 | |
| WO | WO 01/03279 | 1/2001 | |
| WO | WO 02/17469 | 2/2002 | |

OTHER PUBLICATIONS

Poon et al, Very Fast Transient Voltage Regulators Based on Load Correction, 1999 IEEE, pp. 66–71.*

(List continued on next page.)

*Primary Examiner*—Thomas Lee
*Assistant Examiner*—Suresh K Suryawanshi
(74) *Attorney, Agent, or Firm*—Santangelo Law Offices, PC

(57) ABSTRACT

Method and apparatus are disclosed for controlling the delivery of power to DC components such as computer components, microprocessors or the like. Designs of voltage regulation modules are presented which are appropriate for faster components, lower voltages, and higher currents. Embodiments are especially suited to applications which cause rapid changes in the conductance of the load, even in the sub-microsecond time domain as is common in computer applications and the like and in powering electronics equipment, especially a distributed system and especially a system wherein low voltage at high current is required. Embodiments and sub elements provide energy storage for low voltage, high current electronic loads, an ability to supply current with rapid time variation, providing extremely low inductance connections, permitting VRM's and the like to be located relatively remotely from the powered electronic load, and a steady voltage from a transformer isolated, high frequency ac to dc converter under varying load without the necessity for feedback control, among other aspects.

56 Claims, 34 Drawing Sheets

U.S. PATENT DOCUMENTS

| | | | |
|---|---|---|---|
| 5,444,608 A | | 8/1995 | Jain et al. .................... 363/17 |
| 5,712,772 A | | 1/1998 | Telefus et al. ................ 363/21 |
| 5,757,171 A | * | 5/1998 | Babcock .................... 323/271 |
| 5,867,715 A | * | 2/1999 | Lin et al. .................... 713/300 |
| 5,939,868 A | * | 8/1999 | Hall et al. .................. 323/281 |
| 5,982,645 A | | 11/1999 | Levran et al. ................ 363/37 |
| 5,991,168 A | | 11/1999 | Farrington et al. ........... 363/16 |
| 6,023,154 A | | 2/2000 | Martinez .................... 323/272 |
| 6,046,546 A | | 4/2000 | Porter et al. ............ 315/111.21 |
| 6,055,163 A | | 4/2000 | Wagner et al. ................ 363/37 |
| 6,144,194 A | | 11/2000 | Varga ........................ 323/285 |
| 6,232,754 B1 | | 5/2001 | Liebler et al. .............. 323/272 |
| 6,281,666 B1 | | 8/2001 | Tressler et al. ............. 323/272 |
| 6,453,421 B1 | * | 9/2002 | Taylor ........................ 713/300 |
| 6,462,963 B1 | | 10/2002 | Wittenbreder ................ 363/16 |
| 6,462,964 B2 | | 10/2002 | Porter et al. ............. 363/21.01 |

OTHER PUBLICATIONS

"High–Frequency High–Density Converters for Distributed Power Supply Systems," by John G. Kassakian and Martin F. Schlecht, Proceedings of the IEEE, vol. 76, No. 4, Apr. 1988, pp. 362 through 376.

"Powersystems World™", HF22A, Voltage Regulator Module For Future Generation of Processors, Presented by Dr. Fred C. Lee, Nov. 1998, 194 pages.

"Designing Minimum Cost VRM8.2/8.3 Compliant Converters," by Richard Redl and Brian Erisman, published in the Official Proceedings of the Thirteenth International HFPC '98, Nov., Santa Clara, California, pp. 172–181.

"A Fast, Efficient Synchronous–Buck Controller for Microprocessor Power Supplies," by David Briggs, Robert Martinez, Rais Miftakhutdinov, Dale Skelton, Texas Intrument Incorporation, published in the Official Proceedings of the Thirteenth International HFPC '98, Nov., Santa Clara, California, pp. 182–198.

PCT Application entitled "High Frequency Switch–mode DC Powered Computer System", Application No. PCT/US00/07779, filed Mar. 23, 2000 (corresponding international publication WO 00/57543 cited above).

PCT Application entitled "System for Controlling the Delivery of Power to DC Computer Components," Application No.: PCT/US00/18086, filed Jun. 30, 2000 (corresponding international publication WO 01/03279 cited above).

PCT Application entitled "Multiple Power Converter System Using Combining Transformers," Application No.: PCT/US01/25749, filed Aug. 17, 2001 (corresponding international publication WO 02/17469 cited above).

U.S. patent application entitled "Multiple Power Converter System Using Combining Tranformers", Application No. 09/641,584, filed Aug. 18, 2000.

U.S. patent application entitled, "Low–Voltage, High–Current DC Computer Power System", Application No. 09/932,032, filed Aug. 17, 2001.

U.S. patent application entitled, "High Frequency Power System and Related Methods", Application No. 10/222,167, filed Aug. 16, 2002.

United States National Phase Patent Application entitled," Multiple Power Converter System Using Combining Transformers", Application Number not yet available, filed Feb. 18, 2003, 09/641,548.

U.S. patent application entitled, "Method for Power Conversion Using Combining Transformers", Application No. 10/409,899, filed Apr. 8, 2003.

* cited by examiner

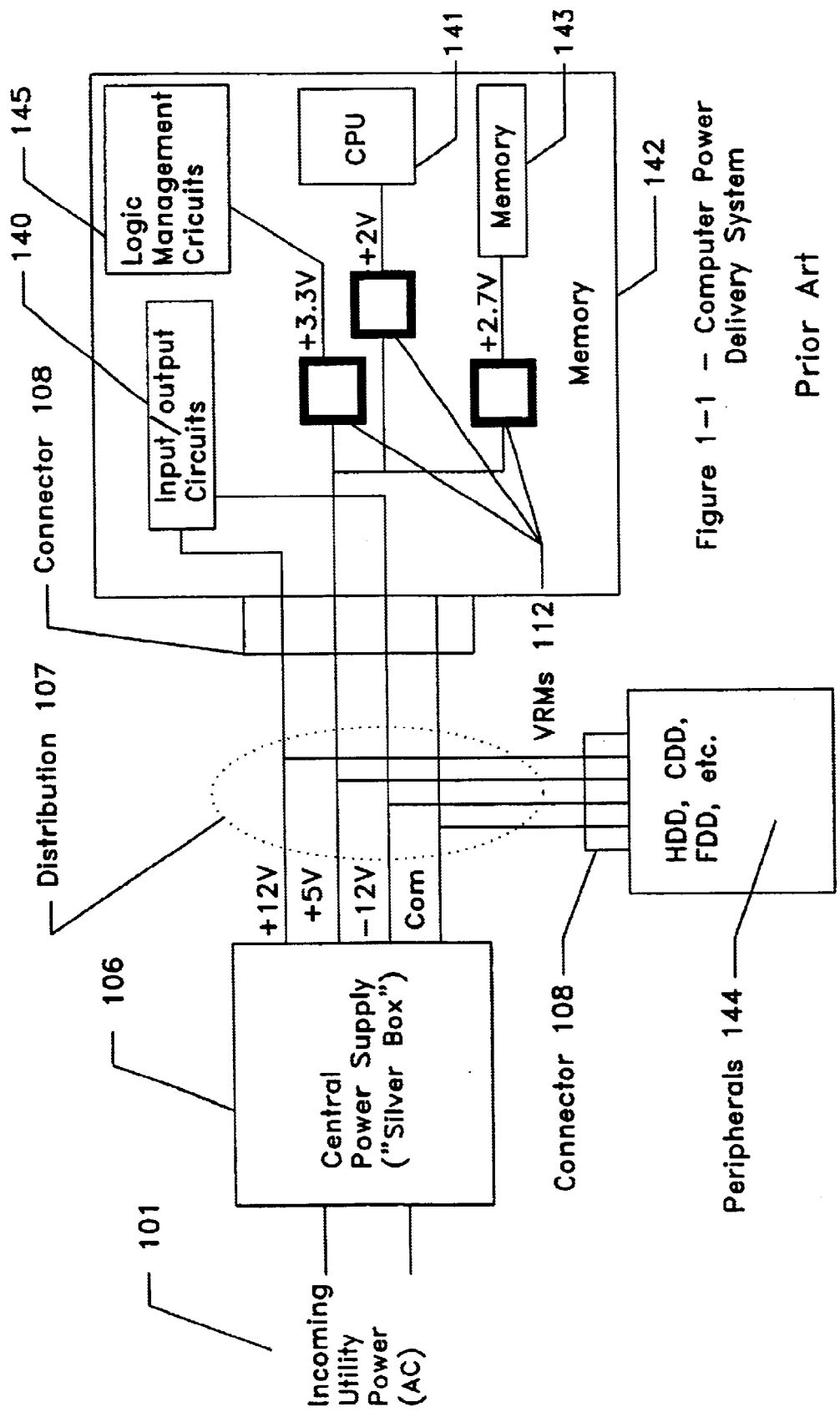
Figure 1-1 — Computer Power Delivery System
Prior Art

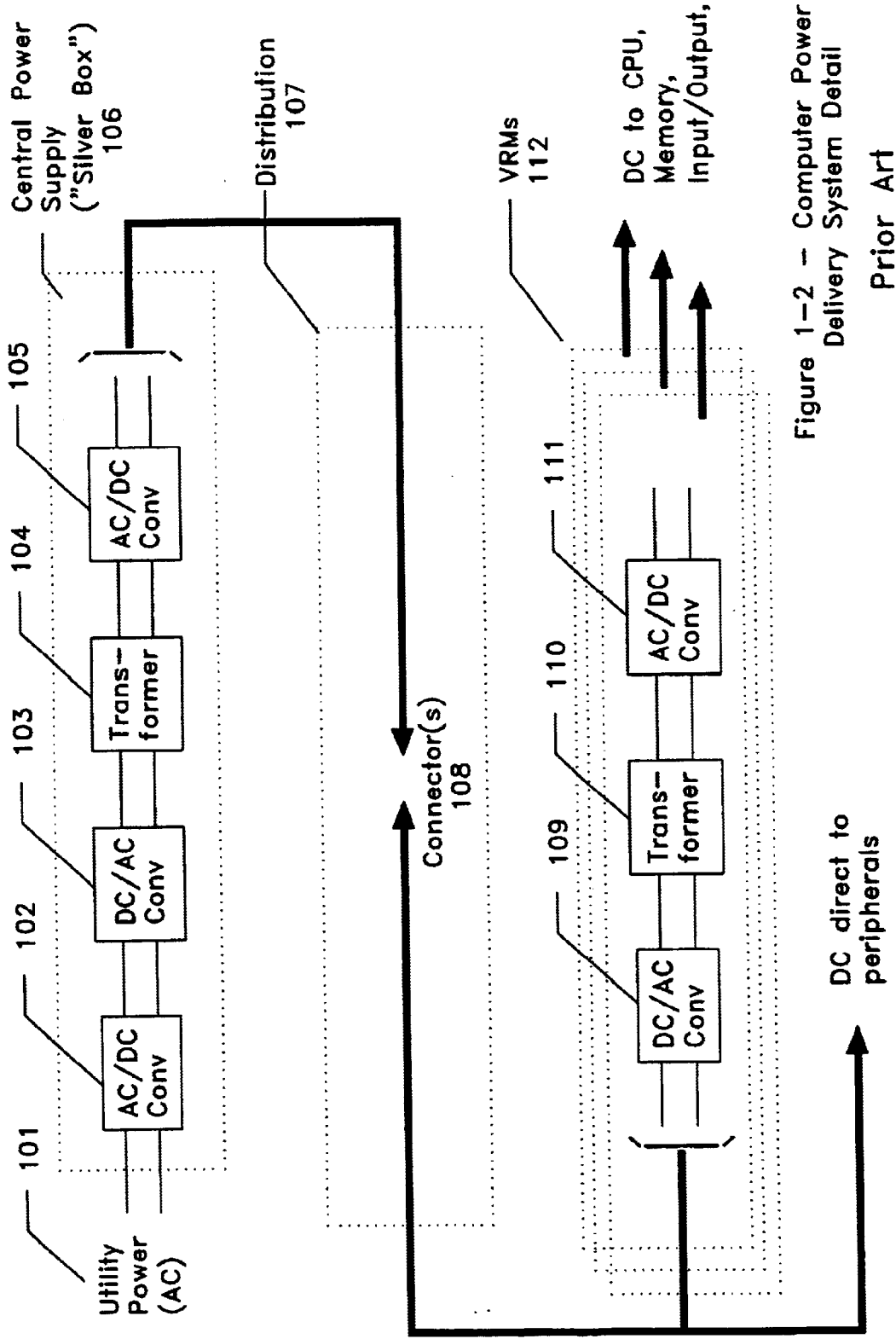

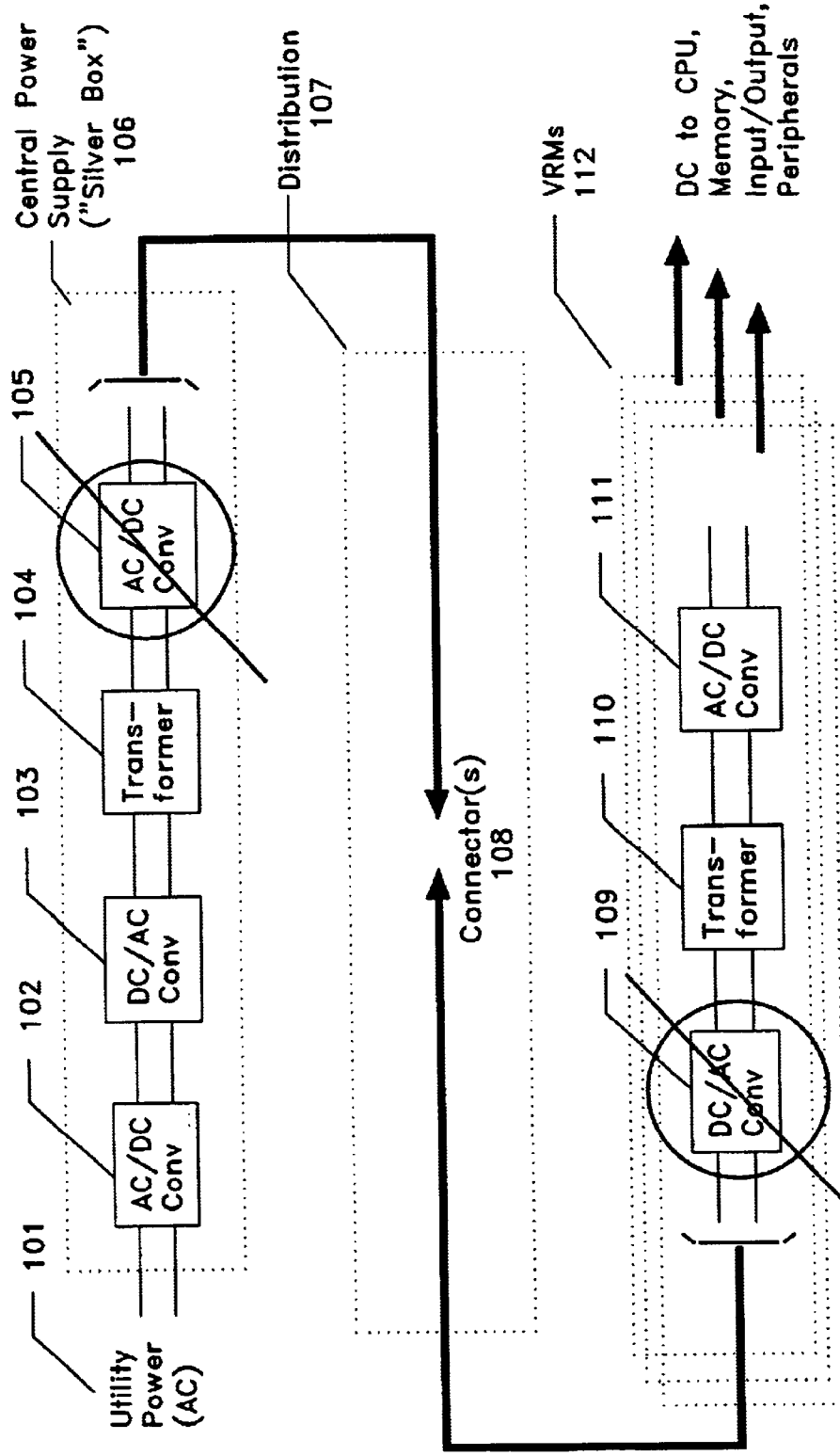
Figure 1-3 – Components eliminated by invention
Prior Art

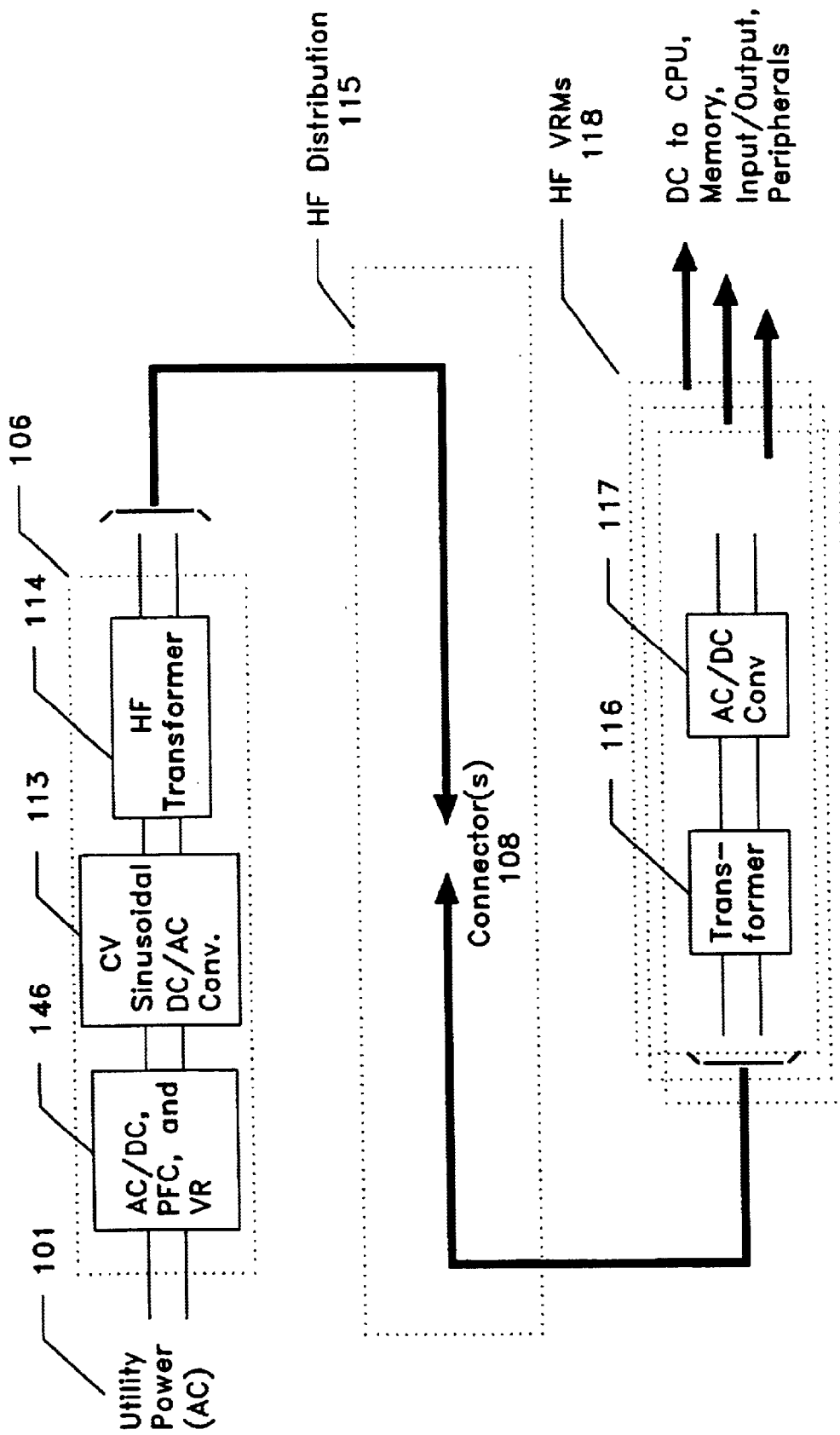
Figure 1-4 — HFAC Power System

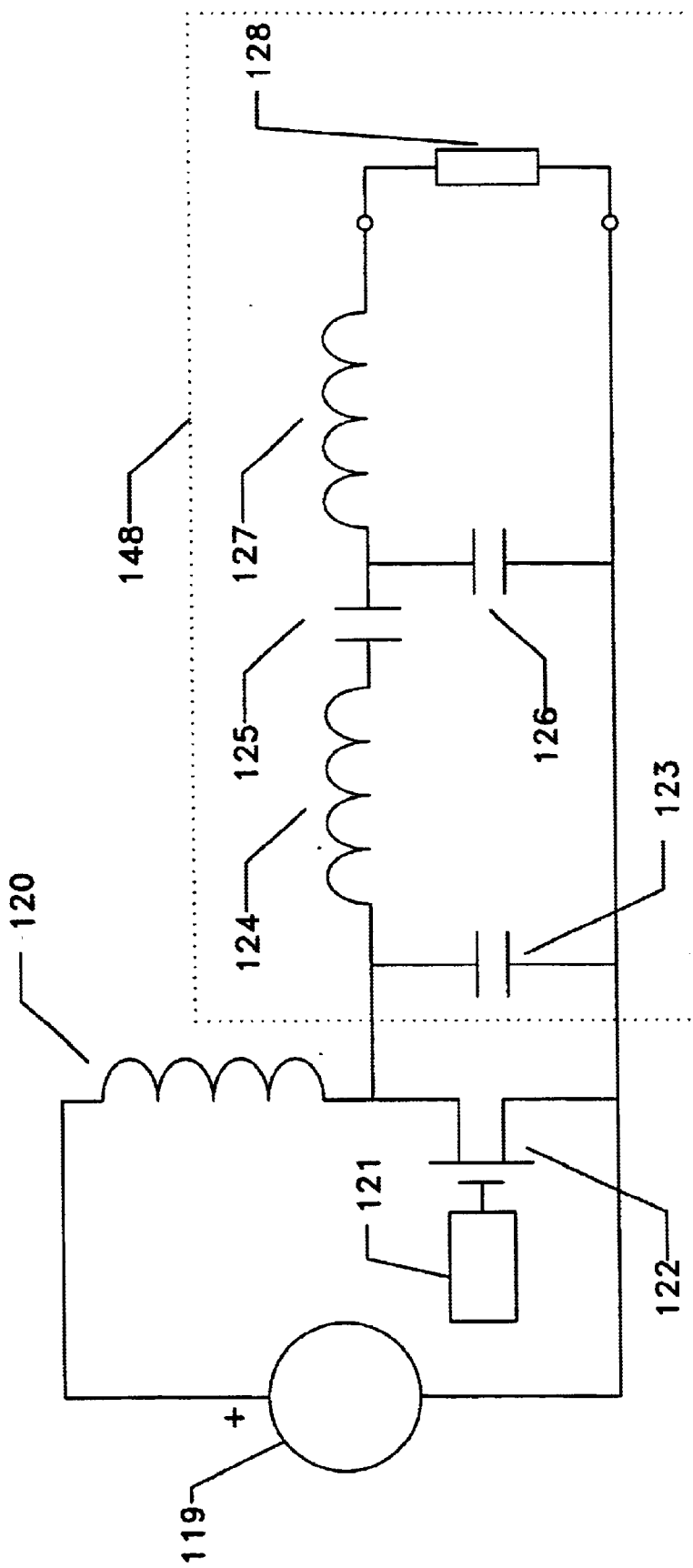

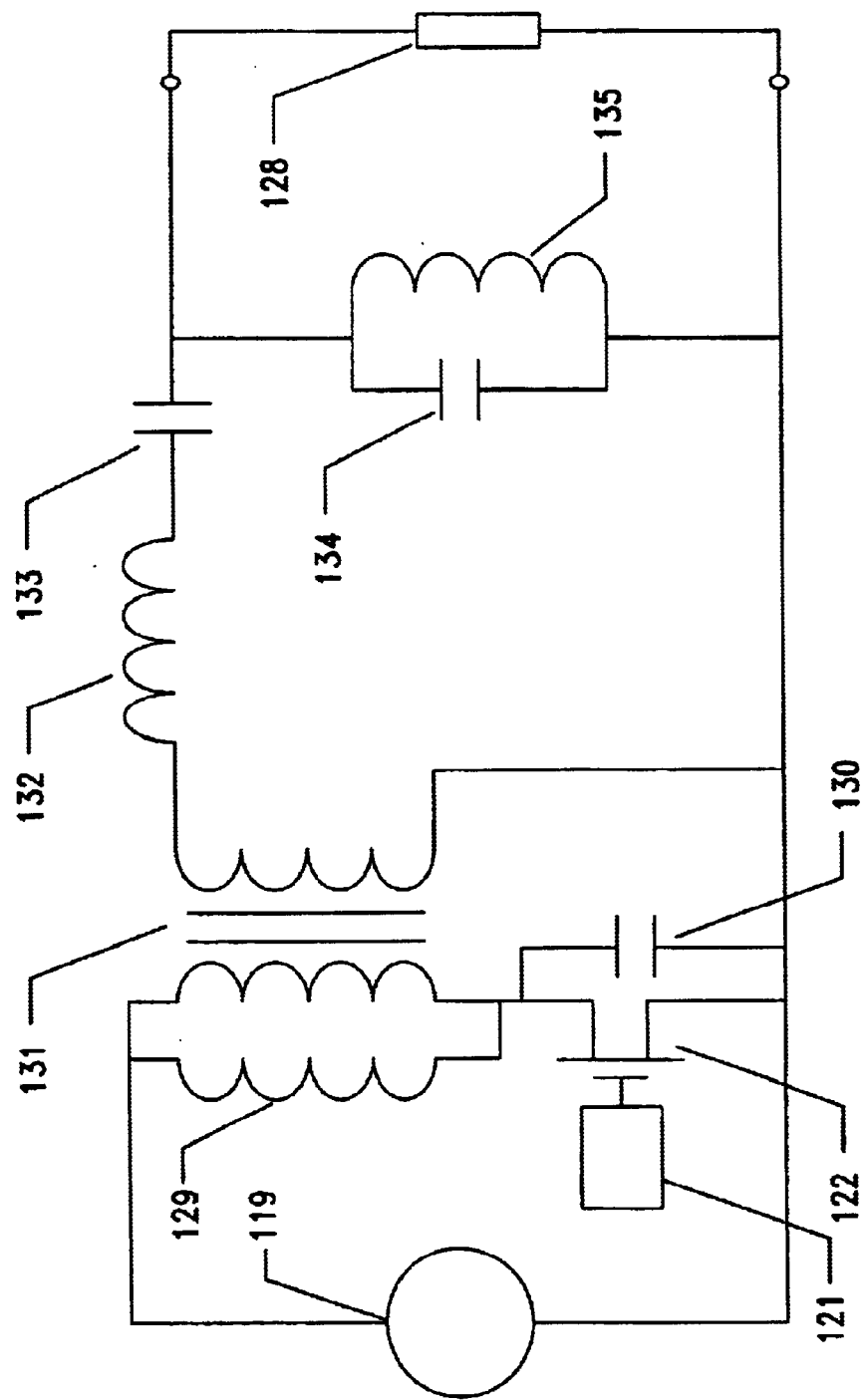
Figure 1-6 – High Frequency CV Generator – resonant

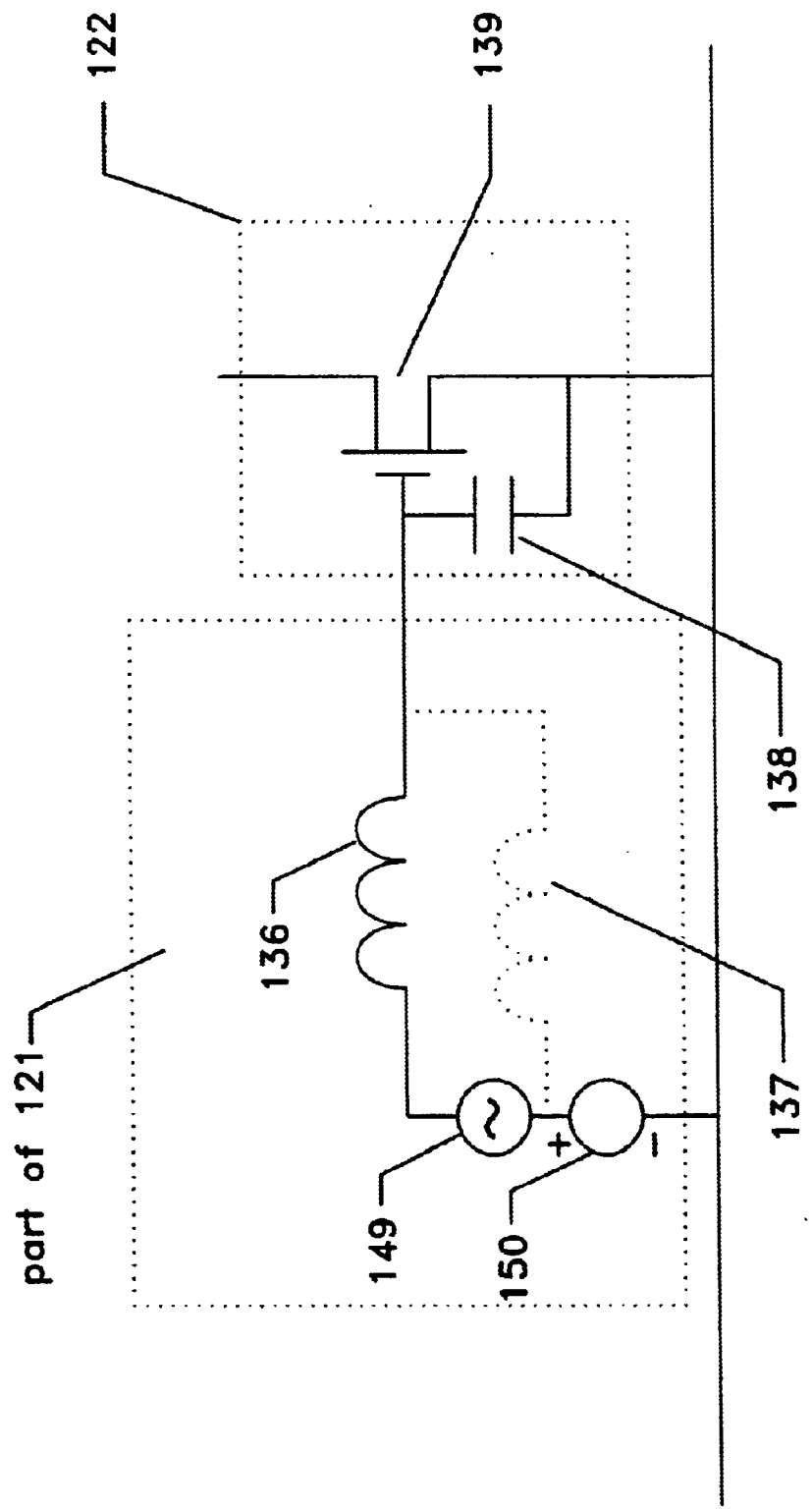
Figure 1-7 — Switch Drive Details

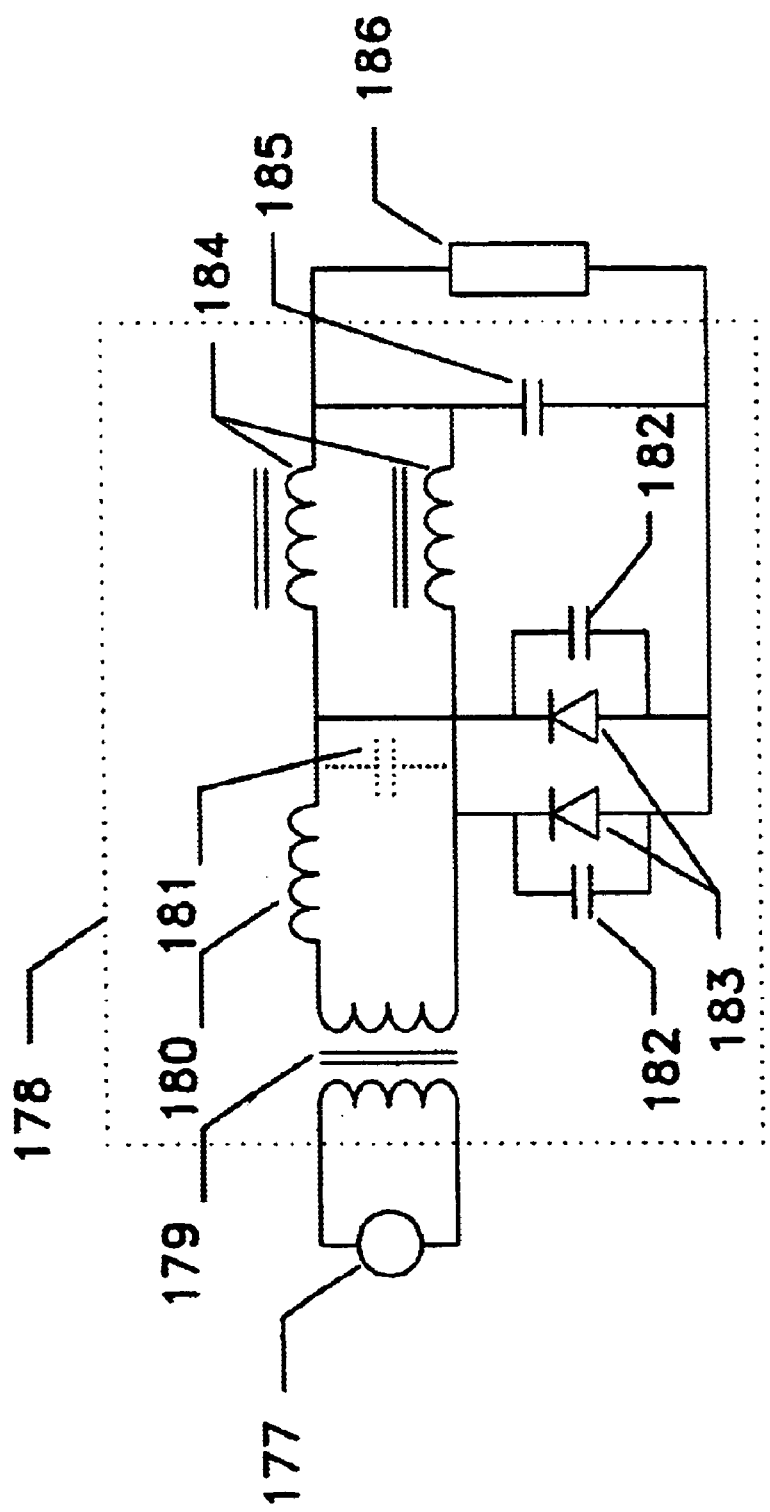
Figure 1-8 - Rectifier Circuit

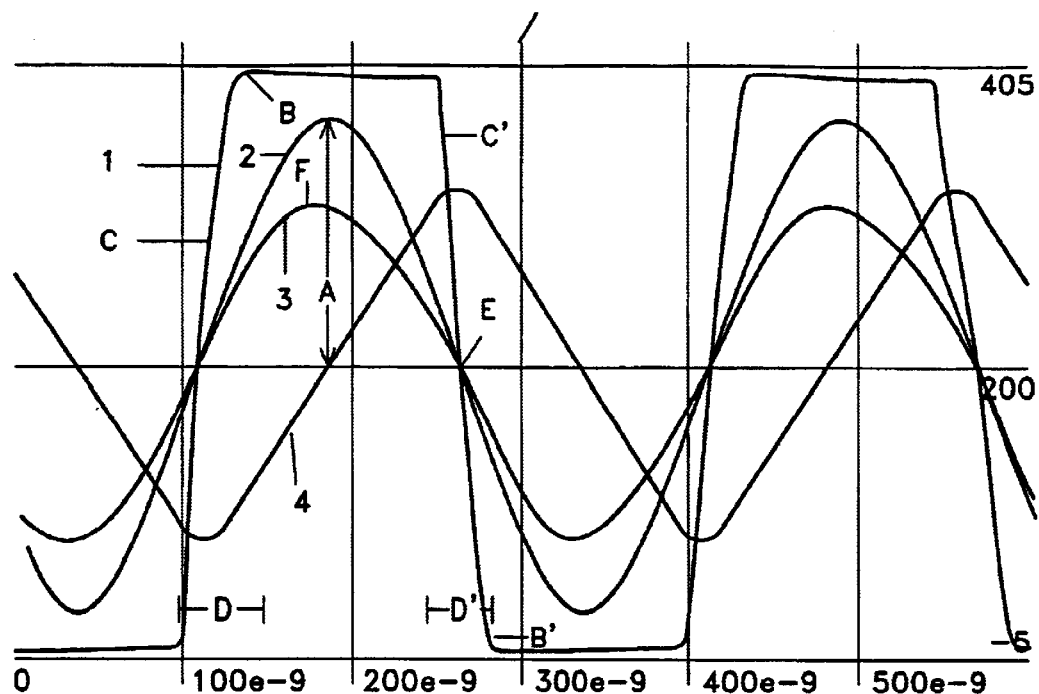
300 Watts Output    Figure 1-13
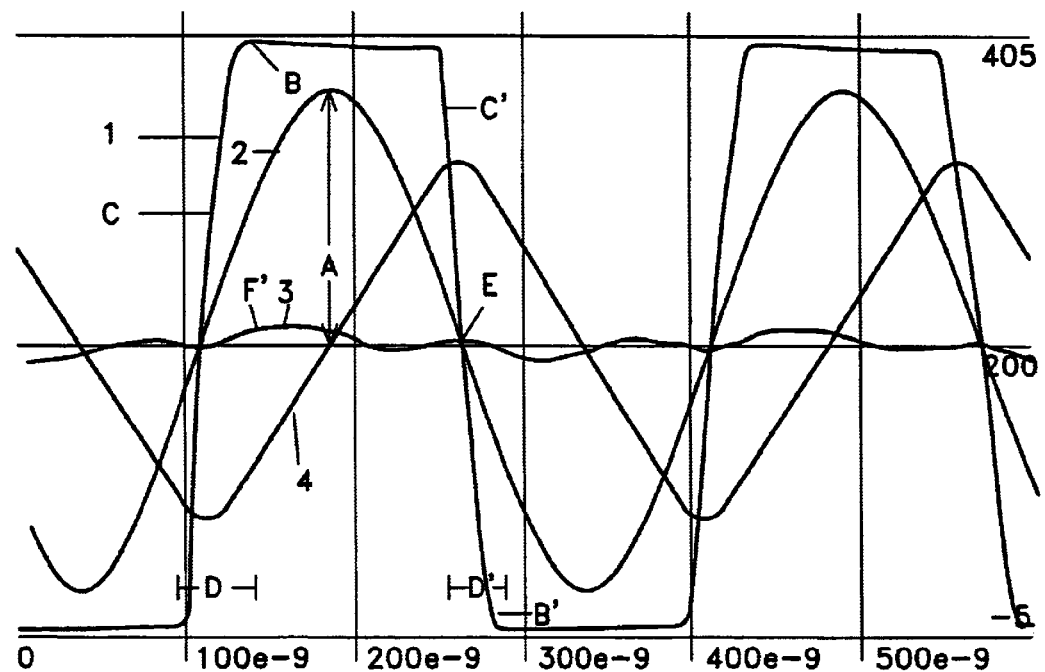
30 Watts Output    Figure 1-14

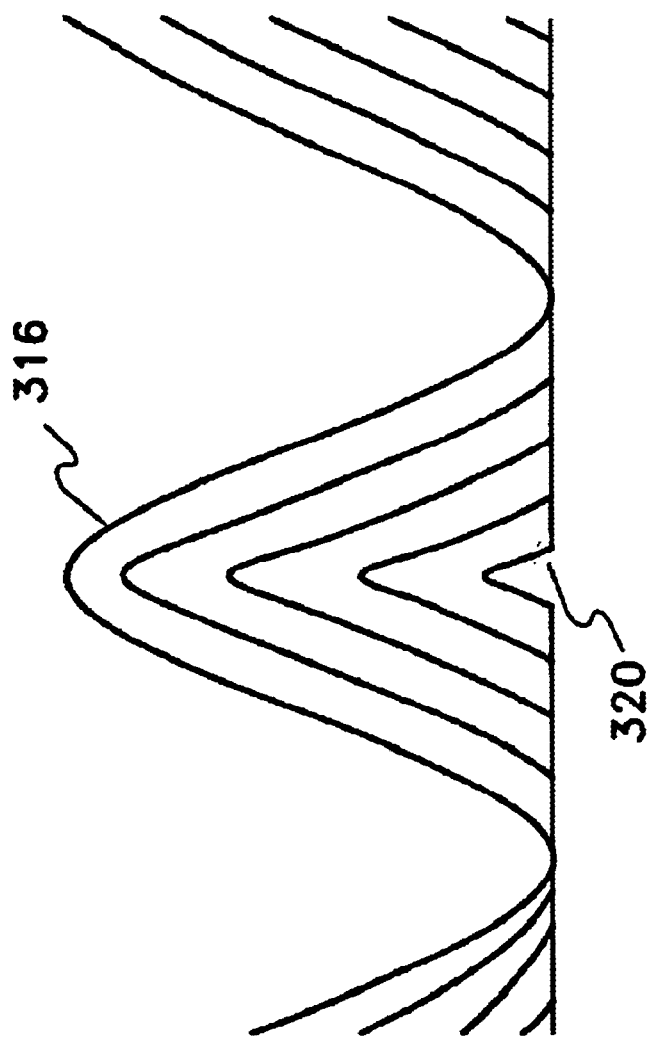

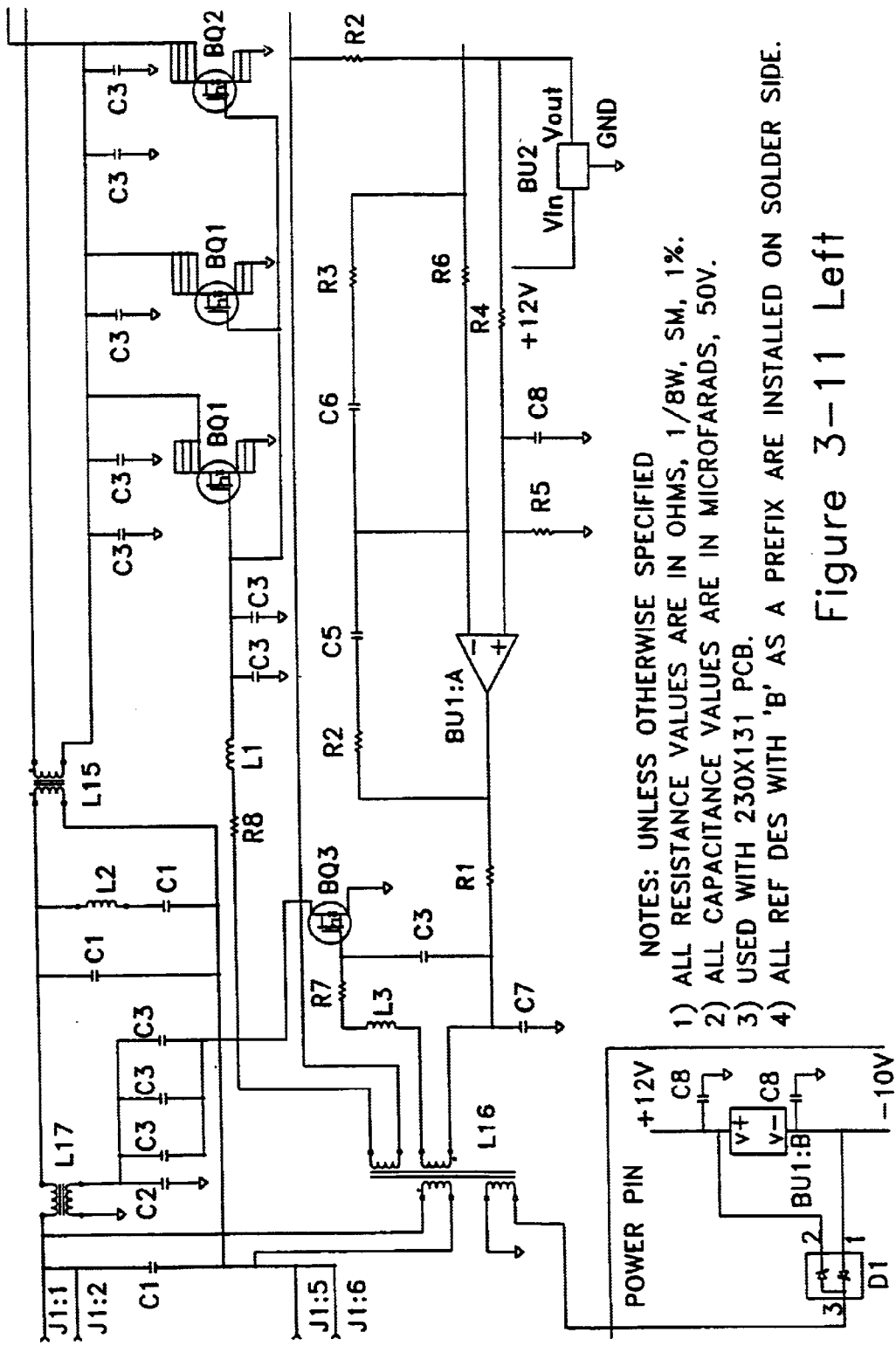
Figure 3-11 Left

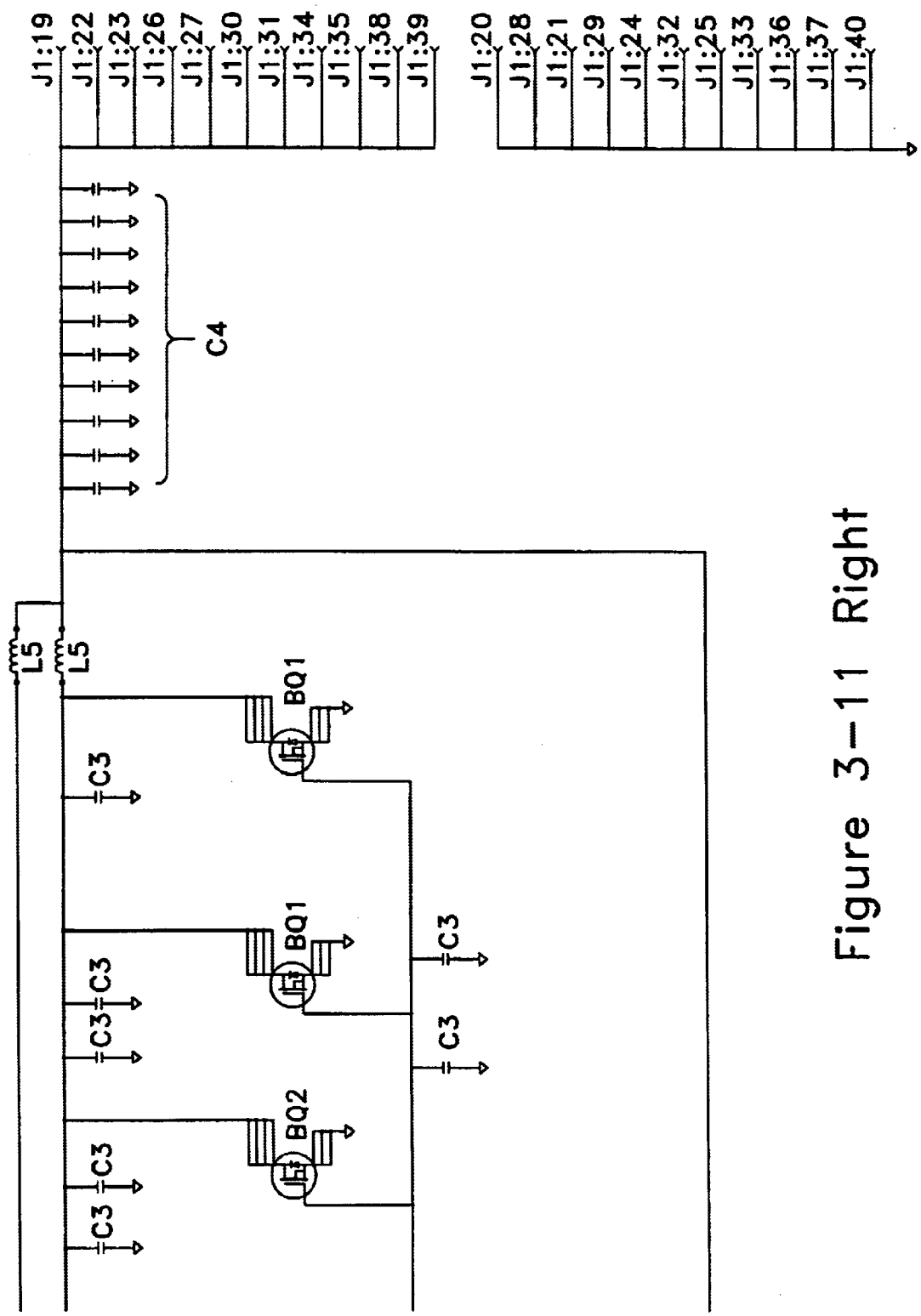
Figure 3-11 Right

Capacitors

| | | |
|---|---|---|
| C1 | 470PF | 100V |
| C2 | 1000PF | 100V |
| C3 | 2200PF | |
| C4 | 22uF | 10V |
| C5 | 100PF | 100V |
| C6 | 4700PF | 100V |
| C7 | 5600PF | 100V |
| C8 | 0.1 | |

Resistors

| | | |
|---|---|---|
| R1 | 124 | |
| R2 | 10K | |
| R3 | 49.9 | |
| R4 | 3.24K | |
| R5 | 1.82K | |
| R6 | 499 | |
| R7 | 5.6 | 1/2W 5% SM |
| R8 | 0.1 | 1/2W SM |

Inductors

| | |
|---|---|
| L1 | 330NH |
| L2 | No Value |
| L3 | 150NH |
| L5 | 100NH |

Miscellaneous

| | |
|---|---|
| BU1:A | AD825 |
| BU1:B | AD825 |
| BU2 | AD1585 |

Transformers

| | | |
|---|---|---|
| L15 | TRANS | L2 |
| L16 | TRANS | L4 |
| L17 | TRANS | L6 |

| | |
|---|---|
| D1 | HSMS2802 |

Transistors

| | |
|---|---|
| BQ1 | OPEN |
| BQ2 | M14420T |
| BQ3 | Q1 NOTEST |

Figure 3-11 Values

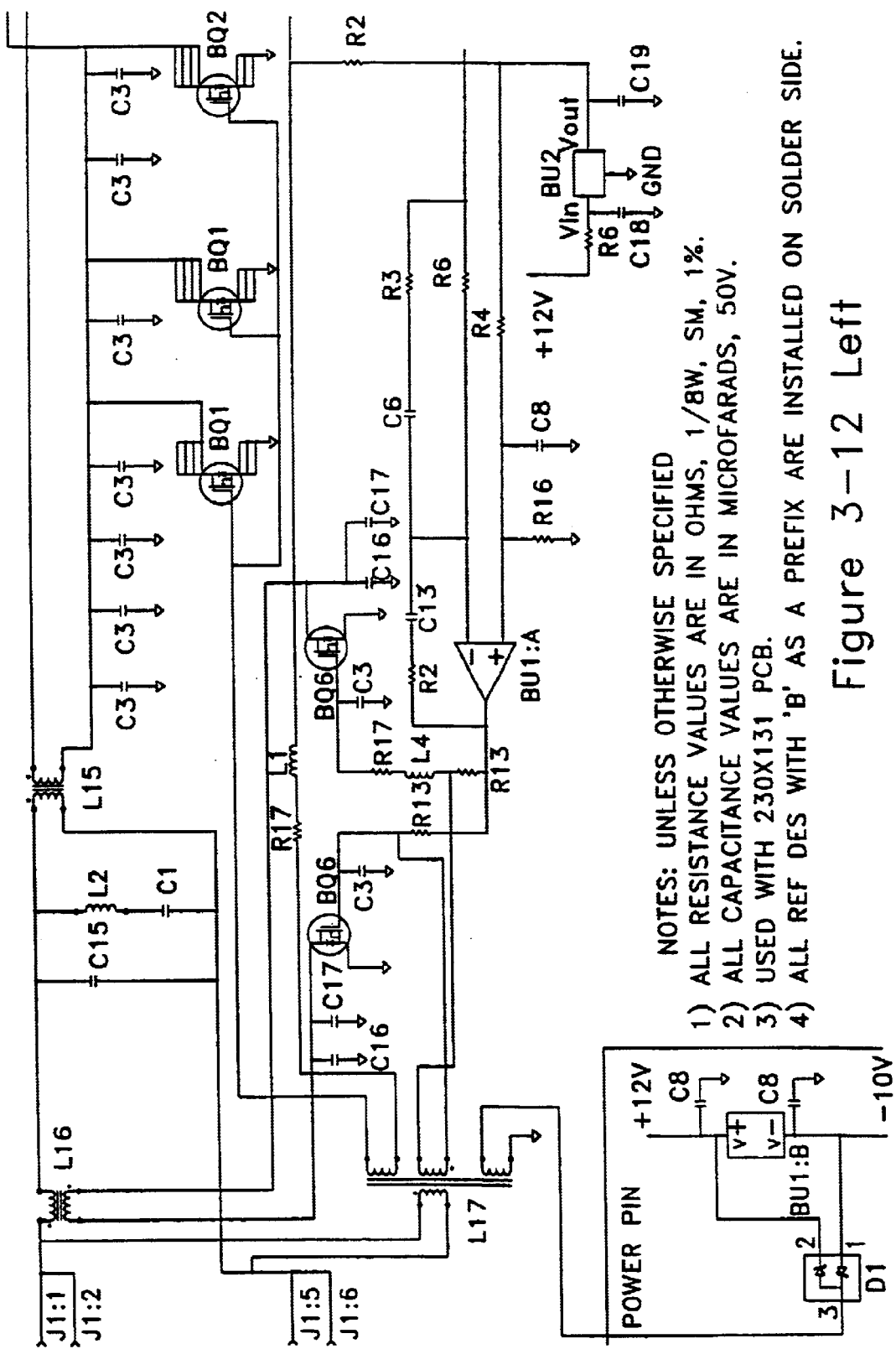
Figure 3-12 Left

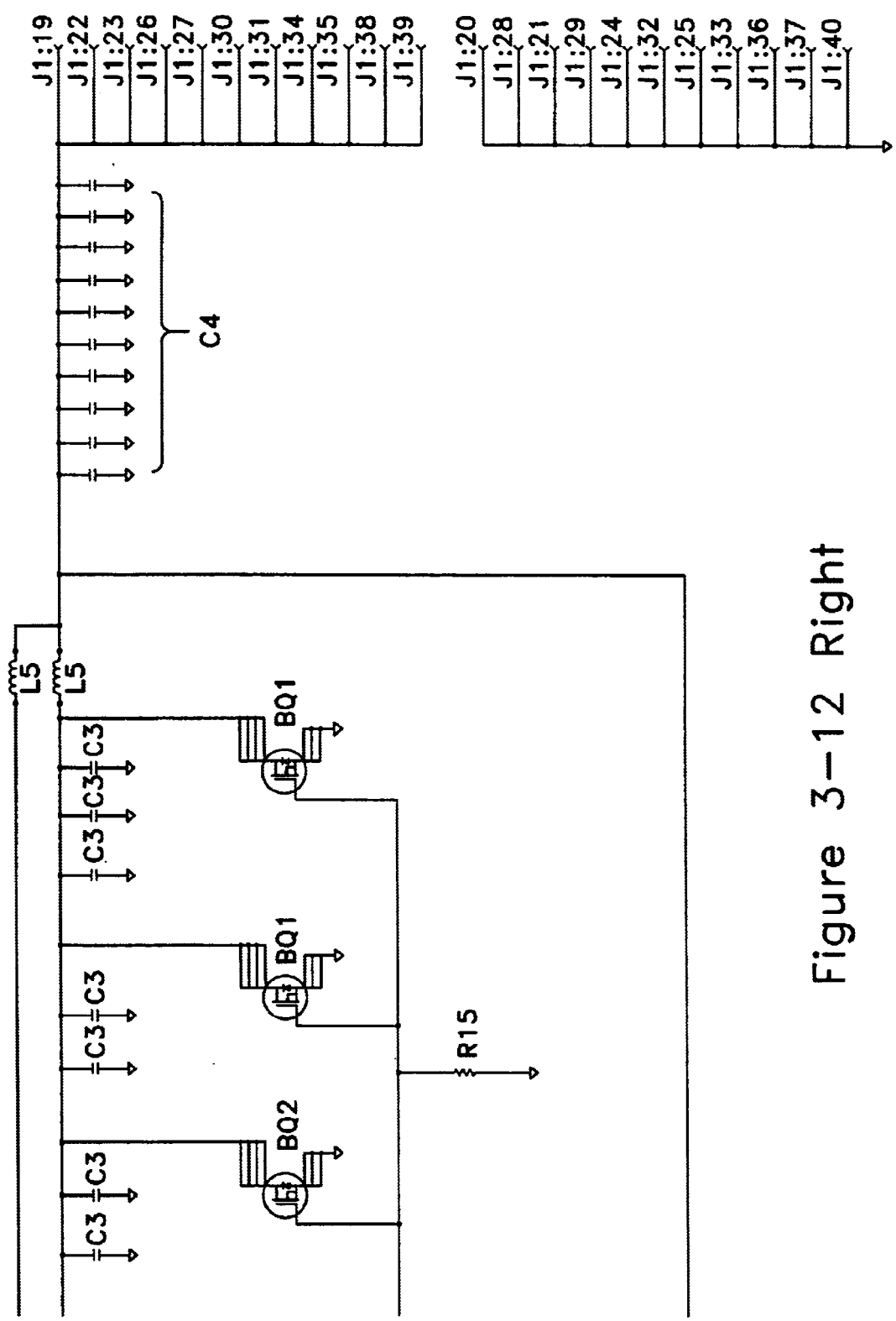
Figure 3-12 Right

| Capacitors | | | Resistors | |
|---|---|---|---|---|
| C1 | 470PF | 100V | R2 | 10K |
| C3 | 2200PF | | R3 | 49.9 |
| C4 | 22uF | 10V | R4 | 3.24K |
| C6 | 4700PF | 100V | R6 | 499 |
| C8 | 0.1PF | | R13 | 100 |
| C15 | 1500PF | 50V | R15 | 24.9K |
| C16 | 2700PF | 100V | R16 | 1.82K |
| C17 | 680PF | 100V | R17 | OPEN 1/2W |
| C18 | 4.7uF | | | |
| C19 | 1uF | | | |

| Inductors | | | Miscellaneous | |
|---|---|---|---|---|
| L1 | 330NH | | BU1:A | AD825 |
| L2 | No Value | | BU1:B | AD825 |
| L4 | OPEN | | BU2 | AD1585 |
| L5 | 100NH | | | |
| | | | D1 | HSMS2802 |

| Transformers | | | Transistors | |
|---|---|---|---|---|
| L15 | TRANS | L2 | BQ1 | OPEN |
| L16 | TRANS | L4 | BQ2 | M14420T |
| L17 | TRANS | L6 | BQ6 | RFD16NO06LESM |

Figure 3-12 Values

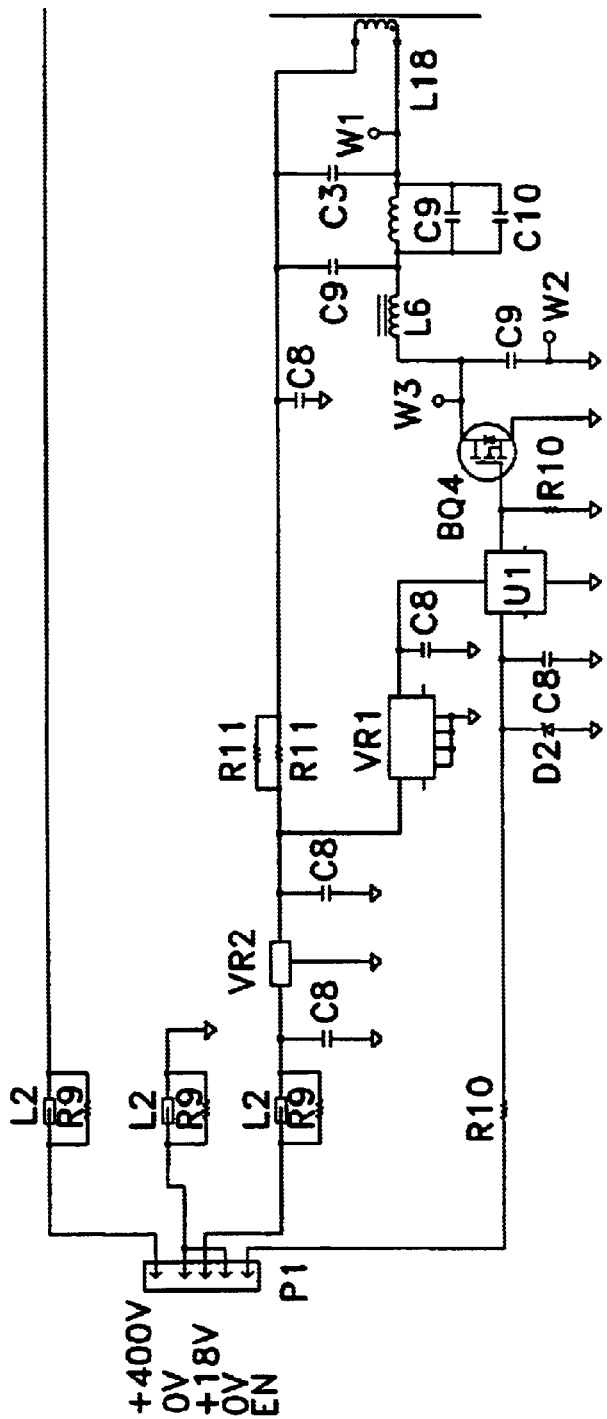
Figure 3-13 Left

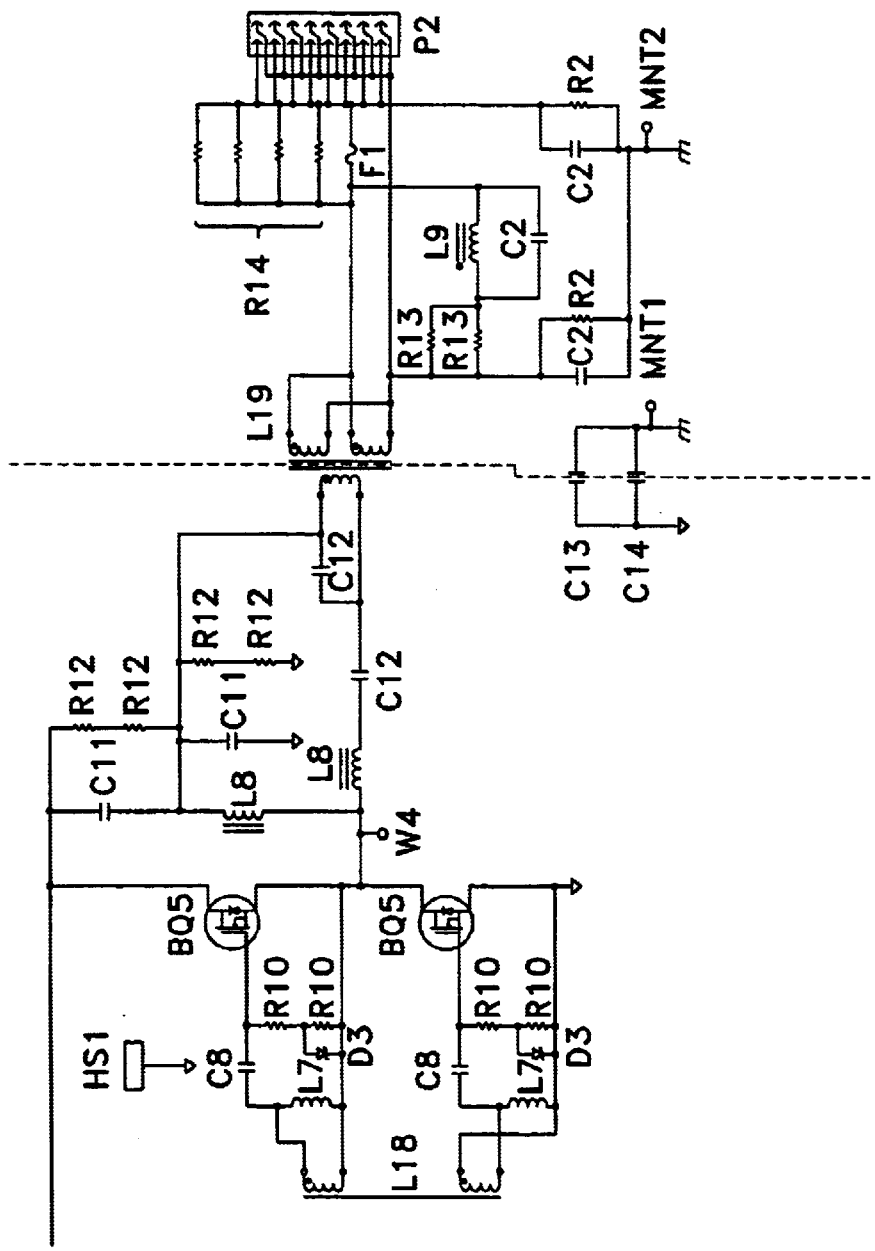
Figure 3-13 Right

Capacitors

| | | |
|---|---|---|
| C2 | 1000PF | |
| C3 | 2200PF | |
| C8 | 0.1PF | |
| C9 | 220PF | 100V |
| C10 | 150PF | 100V |
| C11 | 0.1PF | 500V |
| C12 | 270PF | 1KV |
| C13 | OPEN | |
| C14 | 2200PF | 250VAC |

Resistors

| | |
|---|---|
| R2 | 10K |
| R9 | OPEN |
| R10 | 1K |
| R11 | 10 |
| R12 | 200K |
| R13 | 100 |
| R14 | 0 |

Inductors

| | |
|---|---|
| L2 | No Value |
| L6 | 5.6UH |
| L7 | 1.5UH |
| L8 | 6.2UH |
| L9 | 2.2UH |

Miscellaneous

| | |
|---|---|
| D2 | 5.6V |
| D3 | _____ |

Transformers

| | | |
|---|---|---|
| L18 | TRANS | T1 |
| L19 | TRANS | T2 |

| | | |
|---|---|---|
| U1 | P1 | E/D |
| | P2 | NC |
| | P3 | GND |
| | P4 | OUT |
| | P5 | NC |

Transistors

| | |
|---|---|
| BQ4 | NDS7002A |
| BQ5 | IRF840LC |

| | | |
|---|---|---|
| VR1 | P1 | V (OUT) LM78L05 |
| | P2, 3, 6, 7 | GND |
| | P4 | NC |
| | P5 | NC |
| | P8 | V(IN) |

| | |
|---|---|
| HS1 | HEAT SINK |
| F1 | FUSE OPEN |

| | | |
|---|---|---|
| VR2 | P1 | 78M15CDT |
| | P2 | GND |

Figure 3-13 Values

SYSTEM FOR CONTROLLING THE DELIVERY OF POWER TO DC COMPUTER COMPONENTS

This application claims the benefit of application number 60/142,102, filed on Jul. 2, 1999 and application number 60/144,342, filed on Jul. 16, 1999, the contents of each being hereby incorporated by reference.

BACKGROUND OF THE INVENTION

This invention is applicable for use in powering a wide variety of circuitry that requires low voltage and high current. In addition it provides capability to provide rapidly changing current. In particular it applies to microprocessors and similar circuitry especially where they are requiring less than 2 volts and are projected to require less than one volt.

Buck converter topologies are in current use for powering microprocessors. For a 2.5 volt, 13 ampere requirement, a switching frequency of 300 kHz is becoming inadequate. To meet substantial step load changes a large output capacitance is becoming required. As microprocessor voltage requirements move downward toward 1.0 volt at 50 amperes, the prior art topologies become even less suitable. With a drop in voltage (and an attendant drop in differential voltage tolerance) of 2.5 times, and an increase of current of 4 times, a larger output capacitor is now needed to maintain the required step response. It becomes increasingly difficult or impossible, however, to locate such a large capacitor close to the microprocessor connections. In addition, the cost of this approach increases with decreasing voltage. One solution to this problem has been to increase the frequency of the voltage regulation module. When the frequency increases in such an arrangement, however, the non-resonant edges of this waveform cause problems such as the commutation of FET output capacitance and prevent increasing the switching frequency above about a megahertz. This situation is rapidly becoming serious as microprocessors and other low voltage electronics are being developed which are increasingly difficult to provide suitable power for. The present invention permits the achievement of power for such needs. It permits higher frequencies and can be configured to handle higher currents.

This situation is rapidly becoming serious as microprocessors and other low voltage electronics are being developed which are increasingly difficult to provide suitable power for.

As mentioned, this invention specifically relates to powering computer systems. Here, often switch-mode DC is created to power the internal components of the system. It has particular applicability in new designs where microprocessors have high demands and power changes. Such an relate to the area of powering low voltage, high current electronics. As mentioned, though, the invention is applicable in the field of computing, and much of the following description is presented in that context. It should be understood, however, that other embodiments are in no way limited to the field of computing, and are applicable to a wide variety of circumstances wherein a variety of power absorbing loads which absorb electrical power may abruptly change their power absorbing characteristics (that is to say, their impedance may undergo a rapid change). They are also applicable if such loads are separated physically such that the voltage which may be dropped across the dynamic impedance of the power carrying conductors is a significant fraction of the voltage delivered to such loads. They are also increasingly applicable to applications wherein design tradeoffs are forcing a steady decrease in operating voltages. Such situations may arise in telecommunications, radar systems, vehicle power systems and the like, as well as in computing systems. Further, the DC/AC converter itself may have applications in broader and other contexts as well.

The architecture of computing systems has undergone tremendous changes in the recent past, due principally to the advance of microcomputers from the original four-bit chips running at hundreds of kilohertz to the most modern 32 and 64 bit microprocessors running at hundreds of megahertz. As the chip designers push to higher and higher speeds, problems arise which relate to thermal issues. That is, as the speed of a circuit is increased, the internal logic switches must each discharge its surrounding capacitance that much faster. Since the energy stored in that capacitance is fixed (at a given voltage), as the speed is increased, that energy, which must be dissipated in the switches, is dumped into the switch that many more times per second. Since energy per second is defined as power, the power lost in the switches therefore increases directly with frequency.

On the other hand, the energy stored in a capacitance increases as the square of the voltage, so a capacitor charged to two volts will store only 44% of the energy stored in that same capacitor charged to three volts. For this reason, a microcomputer designed to operate at two volts will, when run at the same speed, dissipate much less power than the same microprocessor operating a three volts. So there is a tendency to lower the operating voltage of microprocessors.

Other considerations cause the microprocessor to exhibit a lower maximum speed if operated at a lower voltage as compared to a higher operating voltage. That is, if a circuit is operating at full speed, and the voltage on that circuit is simply reduced, the circuit will not operate properly, and the speed of the circuit (the "clock speed") may have to be reduced. To maintain full speed capability and still operate at lower voltage, the circuit often must be redesigned to a smaller physical size. Also, as the size of the circuitry is reduced, and layer thickness is also reduced, the operating voltage may need to be lowered to maintain adequate margin to avoid breakdown of insulating oxide layers in the devices. For the past few years, these steps have defined the course of microprocessor design. Key microprocessor designers, seeking the maximum speed for their products, have therefore expended considerable effort trading off the following considerations:

higher speed chips are worth more money;

higher speed chips must dissipate more heat;

there are limitations to removal of that heat;

lower voltages reduce the heat generated at a given speed; and smaller devices run faster at a given voltage.

Of course, there are many, many important trade-off considerations beyond these, but the above list gives the basic elements which relate to some aspects of the current invention. The result of these considerations has been for the microprocessor designers to produce designs that operate at lower and lower voltages. Early designs operated at five volts; this was reduced to 3.3. to 3.0, to 2.7, to 2.3, and at the time of writing the leading designs are operating at 2.0 volts. Further reductions are in store, and it is expected that future designs will be operated at 1.8, 1.5, 1.3, 1.0, and even below one volt, eventually perhaps as low as 0.4 volts.

Meanwhile, advances in heat removal are expected to permit processors to run at higher and higher heat dissipation levels. Early chips dissipated perhaps a watt; current designs operate at the 30 watt level, and future heat removal designs may be able to dissipate as much as 100 watts of power generated by the processor. Since the power dissipated is proportional to the square of the operating voltage, even as the ability to remove heat is improved, there remains a tendency to run at lower operating voltages.

All of this is driven by the fundamental consideration: higher speed chips are worth more money. So the designers are driven to increase the speed by any and all means at their disposal, and this drives the size of the chips smaller, the voltages lower, and the power up. As the voltage drops the current increases for a given power, because power is voltage times current. If at the same time improvements in heat removal permit higher powers, the current increases still further. This means that the current is rising very rapidly. Early chips drew small fractions of an ampere of supply current to operate, current designs use up to 15–50 amperes, and future designs may use as much as 100 amperes or more.

As the speed of the processors increase, the dynamics of their power supply requirements also increase. A processor may be drawing very little current because it is idling, and then an event may occur (such as the arrival of a piece of key data from a memory element or a signal from an outside event) which causes the processor to suddenly start rapid computation. This can produce an abrupt change in the current drawn by the processor, which has serious electrical consequences.

Inductance is the measure of energy storage in magnetic fields. All current-carrying conductors have associated with their current a magnetic field, which represents energy storage. It is well known by workers in the art that the energy stored in a magnetic field is half the volume integral of the square of the magnetic field. Since the field is linearly related to the current in the conductor, it may be shown that the energy stored by a current carrying conductor is proportional to half the square of the current, and the constant of proportionality is called the "inductance" of the conductor. The energy stored in the system is supplied by the source of electrical current, and for a given power source there is a limit to the rate at which energy can be supplied, which means that the stored energy must be built up over time. Thus the presence of an energy storage mechanism naturally slows down a circuit, as the energy must be produced and metered into the magnetic field at some rate before the current can build up.

The available voltage, the inductance, and the rate of change of current in a conductor are related by the following equation, well known by those skilled in the art:

$V=L*\partial I/\partial t$, where L is the inductance of the conductor, and $\partial I/\partial t$ I is the rate of change of current in the conductor.

This equation states that the voltage required to produce a given current change in a load on a power system increases as the time scale of that change is reduced, and also increases as the inductance of any connection to that load is increased. As the speed of microprocessors is L increased, the time scale is reduced, and as the available voltage is reduced, this equation requires the inductance to be dropped proportionally.

Normally, in powering semiconductor devices one does not need to consider the inductance of the connections to the device, but with modem electronics, and especially with microprocessors, these considerations force a great deal of attention to be brought to lowering the inductance of the connections. At the current state of the art, for example, microprocessors operate at about two volts, and can tolerate a voltage transient on their supply lines of about 7%, or 140 millivolts. These same microprocessors can require that their supply current change at a rate of at least one-third or even nearly one ampere per nanosecond, or $3*10^8$ or $10^9$ amperes/second, respectively. The above equation indicates that an inductance of about 140 picohenries ($1.4*10^{-10}$) and ½ nanohenry, ($5*10^-$) will drop a voltage of 140 millivolts at these two rates of current rise. To put this number in perspective, the inductance of a wire one inch in length in free space is approximately 20 nanohenries, or 20,000 picohenries. While the inductance of a connection can be reduced by paralleling redundant connections, to create a connection with an inductance of 140 picohenries with conductors about a centimeter long would require some 20 parallel conductors, and for instance a connection with an inductance of ½ nanohenry would require nearly 100 parallel conductors.

The foregoing discussion implies that the source of low voltage must be physically close to the microprocessor, or more generally the active portion of a particular component, which in turn implies that it be physically small. While it might be suggested that capacitors might be used to supply energy during the delay interval required for the current in the conductors to rise, the intrinsic inductance of the connections to the capacitors currently severely limits this approach. So the system designer is faced with placing the source of power very close to the processor to ensure that the processor's power source is adequately stable under rapid changes in current draw. This requirement will become increasingly severe as the voltages drop still further and the currents increase, because the former reduces the allowable transient size and the latter increases the potential rate of change of current. Both factors reduce the permissible inductance of the connection. This can force the designer to use smaller capacitors which have low inductance connections, and because the smaller capacitors store less energy, this drives the power system to higher frequencies, which adds costs and lowers efficiency.

The foregoing remarks are not limited in computers to the actual central microprocessor. Other elements of a modem computer, such as memory management circuits, graphic display devices, high speed input output circuitry and other such ancillary circuitry have been increased in speed nearly as rapidly as the central processing element, and the same considerations apply.

Many modem electronics circuitry, including computers, are powered by switchmode power conversion systems. Such a system converts incoming power from the utility line to the voltages and currents required by the electronic circuitry by operation of one or more switches. In low power business and consumer electronics, such as desktop personal computers, the incoming power is supplied as an alternating voltage. generally 115 volts in the United States, and 220 volts in much of the rest of the world. The frequency of alternation is either 50 or 60 Hertz, depending upon location. Such utility power must be converted to low voltage steady (direct) current, or dc, and regulated to a few percent in order to be useful as power for the electronic circuits. The device which performs such conversion is called a "power supply". While it is possible to create a low voltage regulated dc power source using simple transformers, rectifiers, and linear regulators, such units would be heavy, bulky and inefficient. In these applications it is desirable to reduce weight and size, and this approach is unsuitable for this reason alone. In addition, the inefficiency of linear regulators is also unacceptable. Efficiency is defined as the ratio of output power to input power, and a low efficiency implies that heat is being developed in the unit which must be transferred to the environment to keep the unit cool. The lower the efficiency the more heat must be transferred, and this is itself a reason for finding an alternate approach.

For these reasons, virtually all modern electronics circuitry is powered by switchmode conversion systems. These systems typically operate as follows. The incoming utility power is first converted to unregulated direct current by a rectifier. The rectified dc is then converted to a higher frequency, typically hundreds of kilohertz, by electronic switches. This higher frequency power is then transformed by a suitable transformer to the appropriate voltage level; this transformer also provides isolation from the utility power, required for safety reasons. The resulting isolated higher frequency power is then rectified again, and filtered into steady direct current for use by the electronics. Regulation of the output voltage is usually accomplished by control of the conduction period of the electronic switches. The resulting power conversion unit is smaller and lighter in weight than earlier approaches because the size and weight of the transformer and output filter are reduced proportionally to the increase in frequency over the basic utility power frequency. All of this is well known in the prior art.

In a complex electronic system, various voltages may be required. For example, in a computer system the peripherals (such as disk drives) may require +12 volts, some logic circuits may require +5 volts, input/output circuits may additionally require −12 volts, memory interface and general logic may require 3.3 volts, and the central microprocessor may require 2 volts. Standards have developed so that the central power source (the device that is connected directly to the utility power) delivers ±12 and +5 volts, and the lower voltages are derived from the +5 supply line by additional circuitry, called voltage regulation modules, or VRMs, near to the circuits that require the lower voltage. These additional circuits convert the +5 volt supply to high frequency ac power again, modifying the voltage through control of the period of the ac power, and again re-rectifying to the lower voltage dc.

The resulting overall system is complex and not very efficient, in spite of the use of switchmode technology. In a typical 200 watt computer system, four watts are lost in the initial rectification of the utility line, eight watts in the electronic switches, 2.5 watts in the transformer, 20 watts in the output rectification and filtering, and four watts in the connections between the center power supply and the electronics boards. Thus 38.5 watts are lost in the conversion process for the higher voltage electronic loads. Substantial additional losses may be sustained in the low voltage conversion process. A typical 50 watt voltage regulation module, which may convert +5 volts at 10 amperes to +2 volts at 25 amperes for the microprocessor, will itself have losses of about one watt each in the ac conversion and transformer, and ten watts in the final rectification and filtering. Other voltage regulation modules will have losses almost as great, resulting in losses for the entire system which may be one-third of the power used. Some particularly inefficient approaches may demonstrate efficiencies as low as 50%, requiring that the input power circuits utilize twice the power required by the actual final circuitry, and requiring that twice the heat be dissipated in the electronics (which must be removed by a fan) as is theoretically required by the actual operating circuitry.

This system evolved over the years and is not optimum for many current uses, but persists because of inertia of the industry and because of the perceived benefit of maintaining industry standards on voltages and currents as generated by the central power unit.

An analysis of current trends in the microprocessor industry clearly indicates that the current system will not be adequate for the future. These trends show that the current draw of critical elements such as the core microprocessor has been steadily increasing and will continue to do so into the future. Meanwhile, the operating voltage has been steadily decreasing, dropping with it the allowable tolerance of the supply voltage in absolute terms. Finally, the rate of change of processor current—the current slew rate—is increasing very rapidly, with substantial additional increases forecast for the near future. All of these factors mitigate against the current technology and require a new approach to be adopted in the future. It has been reliably estimated that the current powering and other technology will not last more than one additional generation of microprocessors, and since designers are currently at work on the generation following the next, it can be said that these designers are in the process of developing a microprocessor which cannot be powered by currently available technology.

A further problem in the prior art is the use of square wave electronic conversion techniques. Such technology, known as PWM, for Pulse Width Modulation, produces switch voltage waveforms which have steeply rising edges. These edges produce high frequency power components which can be conducted or radiated to adjacent circuitry, interfering with their proper operation. These high frequency power components may also be conducted or radiated to other electronic equipment such as radio or television receivers, also interfering with their proper operation. The presence of such components requires careful design of the packaging of the power system to shield other circuitry from the high frequency power components, and the installation of expensive and complex filters to prevent conduction of these components out of the power supply package on its input and output leads. What is needed then, is a power conversion system which enables small, highly efficient voltage regulation modules to be placed close to the point of power use, which is fast overall, and which is itself efficient and at least as low in cost as the prior art technology it replaces.

SUMMARY OF THE INVENTION

It is an object of the present invention, therefore, to provide a means for storing energy with lower inductance connections than could be achieved with the prior art. It is a further object of the present invention to provide a source of energy at low voltage and high current which does not need to be placed in very close proximity to the electronic load. Similarly, it is yet an another object of the invention to provide a source of low voltage which can sustain the voltage across the powered load even in the presence of high rates of change of current draw It is also an object of the present invention, to provide a means of converting utility power to high frequency alternating power for efficient distribution at higher efficiency than can be achieved using existing techniques. It is also an object to provide a means of converting high frequency ac power to the low dc voltages and high dc currents required by current and future electronics at higher efficiency than can be achieved using current techniques. It is another object of the present invention to maintain that efficiency over a wide range of load conditions.

A further object of the present invention is to provide a source of high frequency power which is substantially smaller than that of the prior art. Similarly it is an object to provide a source of low voltage at high current which is substantially smaller than that of the prior art to permit such a source to be placed in very close proximity to the electronic load.

It is also an object of the preset invention to provide closer control of the output voltage of a power source, even for extremely short time periods. That is to say, it is an object to ease the task of the powering or of providing a power source so that it does not need such wide bandwidth and has a small transient response to changes in load. Thus an object is to provide a system with better transient response to changes in load.

It is a further object of the invention to provide a power conversion system which stores less energy than that required by the prior art.

It is additionally an object of the present invention to provide a power conversion system which can be produced at lower cost than the prior art.

It is also an object to address problems associated with the use of square wave electronic conversion techniques. It is yet another object of the invention to reduce possible interference between the power system and the electronics being powered, as well as with other devices in the vicinity of the powered electronics, by reducing the rate of rise of currents and the rate of fall of voltages in the power system. Similarly, an object is to provide power using smoothly varying waveforms in the power conversion circuitry.

It yet a further object of one embodiment of the present invention provide to power with the aforesaid objects being satisfied, yet operate at either a constant frequency or, through other embodiments, to accommodate variable frequencies as well.

Another fundamental aspect of the invention is the potential for the affirmative use of the transformer leakage inductance. This can be necessary as the DC output voltage requirement is lowered.

Another benefit of this invention involves the very nature of a power source. By incorporating some or all these elements it can be possible to provide power remotely. By making the output capacitance consist of only the bypass capacitors necessary on the microprocessor pins, the circuit feeding the microprocessor assembly can have essentially an inductive output.

Several features will be disclosed which taken together or separately can allow the power conversion frequency to be increased to provide a low stored energy approach to meet the high di/dt requirements for next generation low voltage requirements. Thus, yet other objects include providing a circuit and method for providing power to electronics with low voltage, high current and high di/dt requirements, providing substantially higher power conversion frequencies, providing a circuit which allows a reasonable amount of transformer leakage inductance and switching device capacitances, providing a circuit or method whereby the synchronous rectifiers (SR's) always switch with zero voltage across the device, allowing high frequency operation, providing a circuit or method whereby the control signal to the SR operates in a non-dissipative fashion, allowing HF operation, and providing a reduced size of the output capacitance through HF operation.

Accordingly, in one embodiment the present invention is directed to a system of energy storage which can store more energy and be placed physically farther from the powered electronics, through the reduction of magnetic fields surrounding the electrical connections and the magnetic energy stored therein, thereby creating a faster responding storage and powering medium. The reduction of the magnetic fields and the resulting reduction of inductance permits electronics to operate at higher speed, and the increased energy storage permits the powering system to operate at lower speed. This reduction in powering system frequency may permit lower costs than could be obtained using high frequency power systems.

Similarly, the present invention in another embodiment is directed to a system of power conversion which eliminates many of the elements of the prior art, by distributing high frequency ac power to a point near the loads, and performing a single conversion from ac to dc at the point of power consumption. In particular, the present invention addresses this latter ac to dc conversion and solution of the problems related to conversion of higher voltage ac power to very low dc voltages with good regulation and transient response.

The elimination of many of the redundant elements in the prior art approach not only increases efficiency by eliminating a power loss element, but also reduces cost by elimination of the cost of the elements removed from the system. The reduction of frequency also increases the efficiency of the powering system, because at higher frequencies switching losses become increasingly important and may equal or exceed all other losses. The present invention accomplishes many of these objects by providing a low inductance connection for energy storage elements which is not limited in length through the mechanism of reducing the volume of the magnetic field surrounding the conductors intermediate to the energy storage element and the powered electronics.

In yet another embodiment, the present invention distributes high frequency smoothly varying or even sinusoidal waveforms, which exhibit relatively low rates of voltage change for a given frequency, and much lower than alternative ac approaches, such as distribution of square wave or trapezoidal waveforms. The distribution of sinusoidal ac voltage, rather than dc voltages as is usually done in the prior art, not only simplifies the central power unit, but also greatly simplifies the voltage regulation modules, reducing cost and raising efficiency. This approach also results in greatly reduced interference between the power unit and adjacent circuitry, and simplifies the design and reduces the cost of the line filters used to avoid conducted interference along the utility power lines. Also, distribution of low dc voltages (e.g., 5 volts) results in relatively higher losses in the distribution wires and connectors when compared to the use of medium voltage alternating distribution levels (e.g., 30 volts rms), which nevertheless remain safe to touch.

BRIEF DESCRIPTIONS OF THE DRAWINGS

FIG. 1-2 is a more detailed depiction of a computer power delivery system of the prior art.

Figures 1, 2, 3, 4, 5, 6, 7, 8, 9:
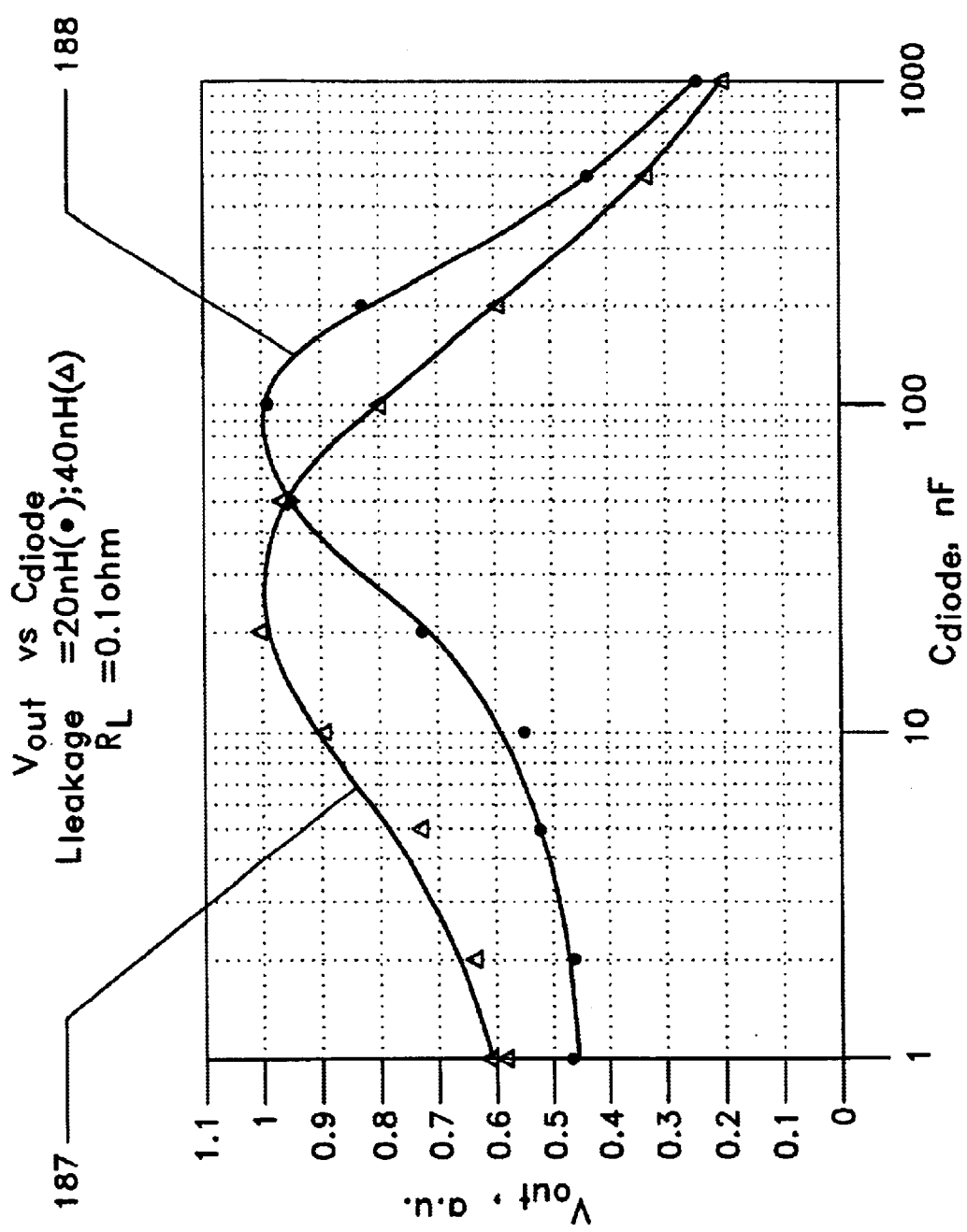
Figures 1, 2, 3, 4, 5, 6, 7, 8, 9, 10:
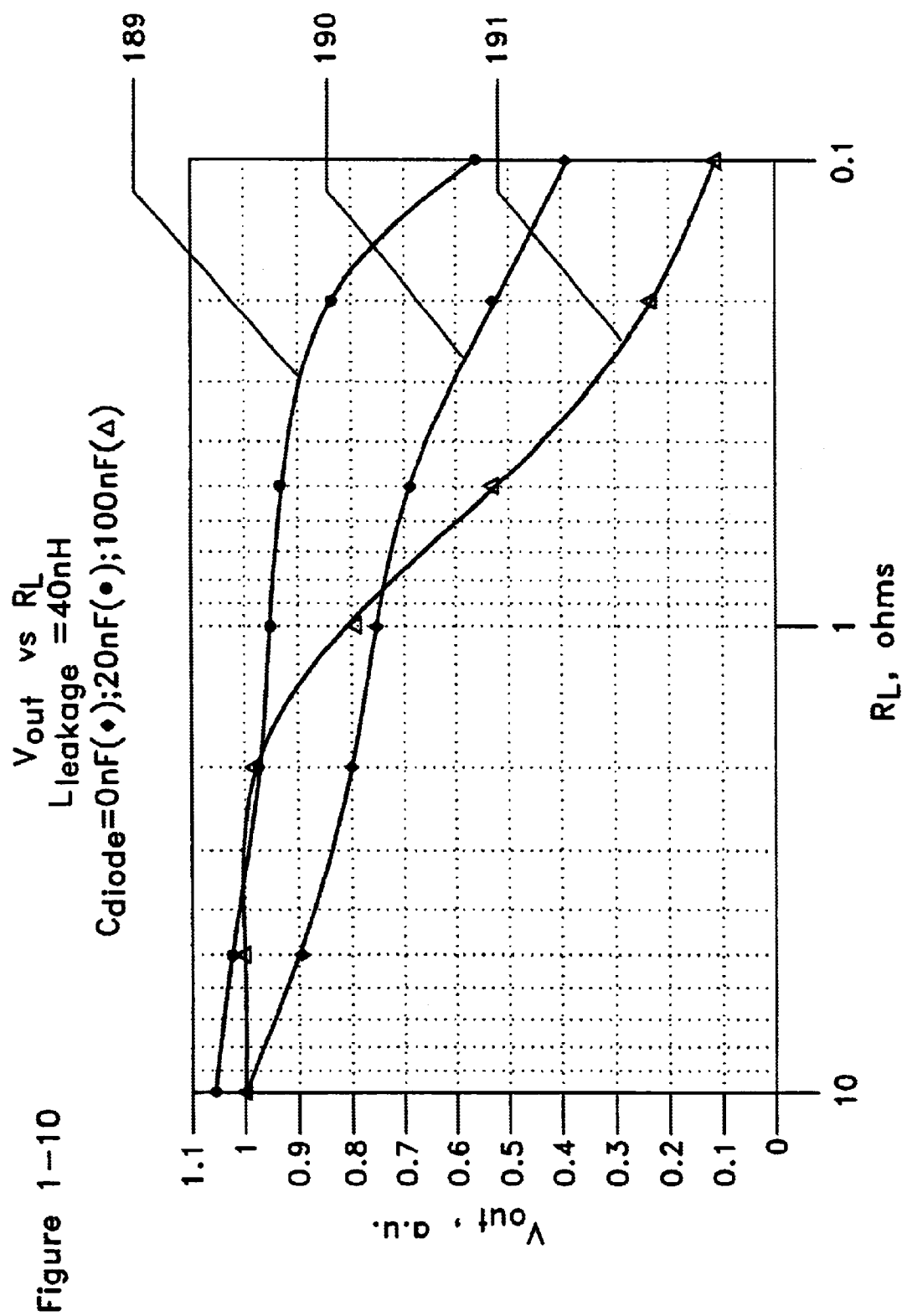
Figures 1, 2, 3, 4, 5, 6, 7, 8, 9, 10, 11:
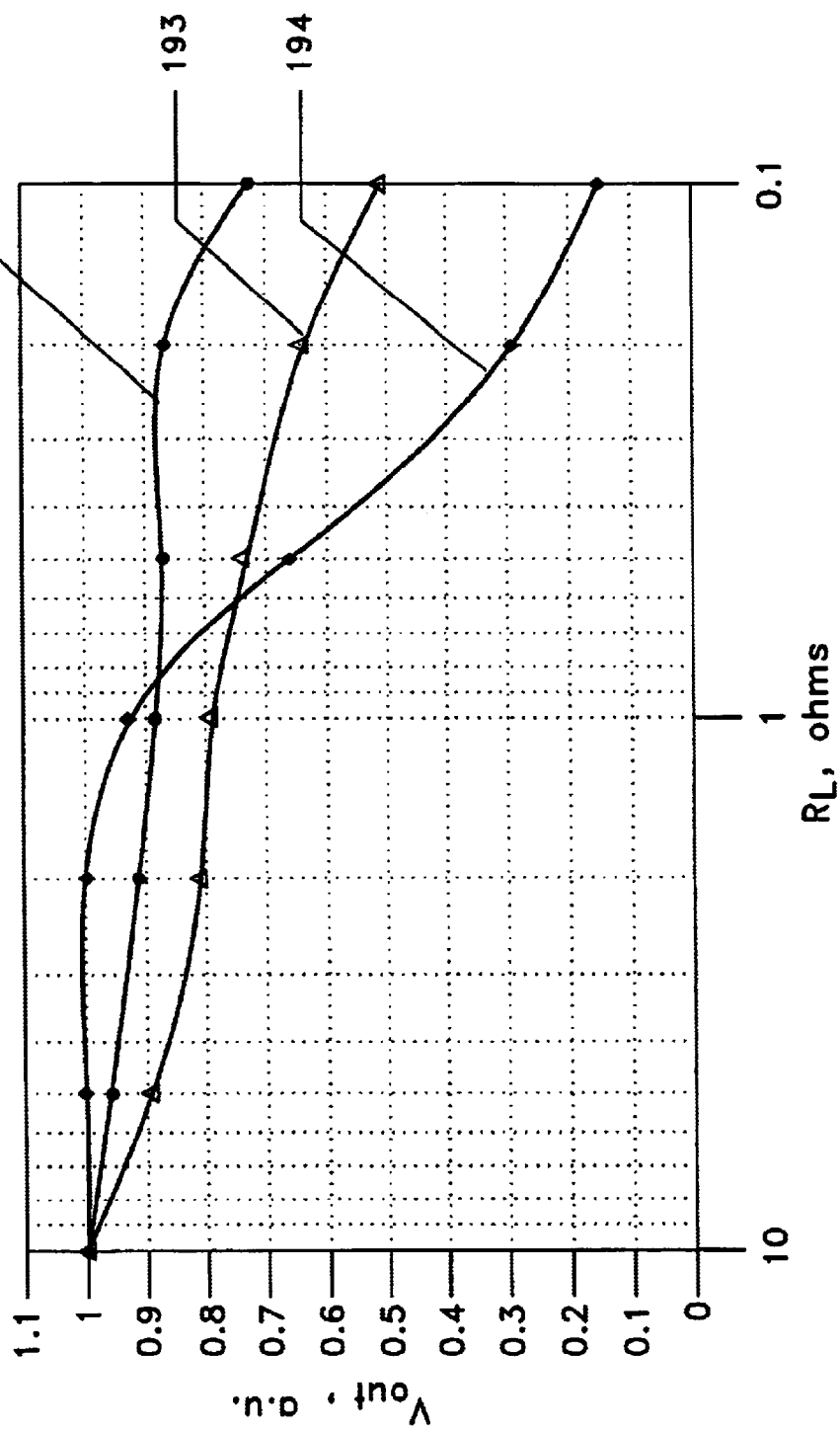
Figures 1, 2, 3, 4, 5, 6, 7, 8, 9, 10, 11, 12:
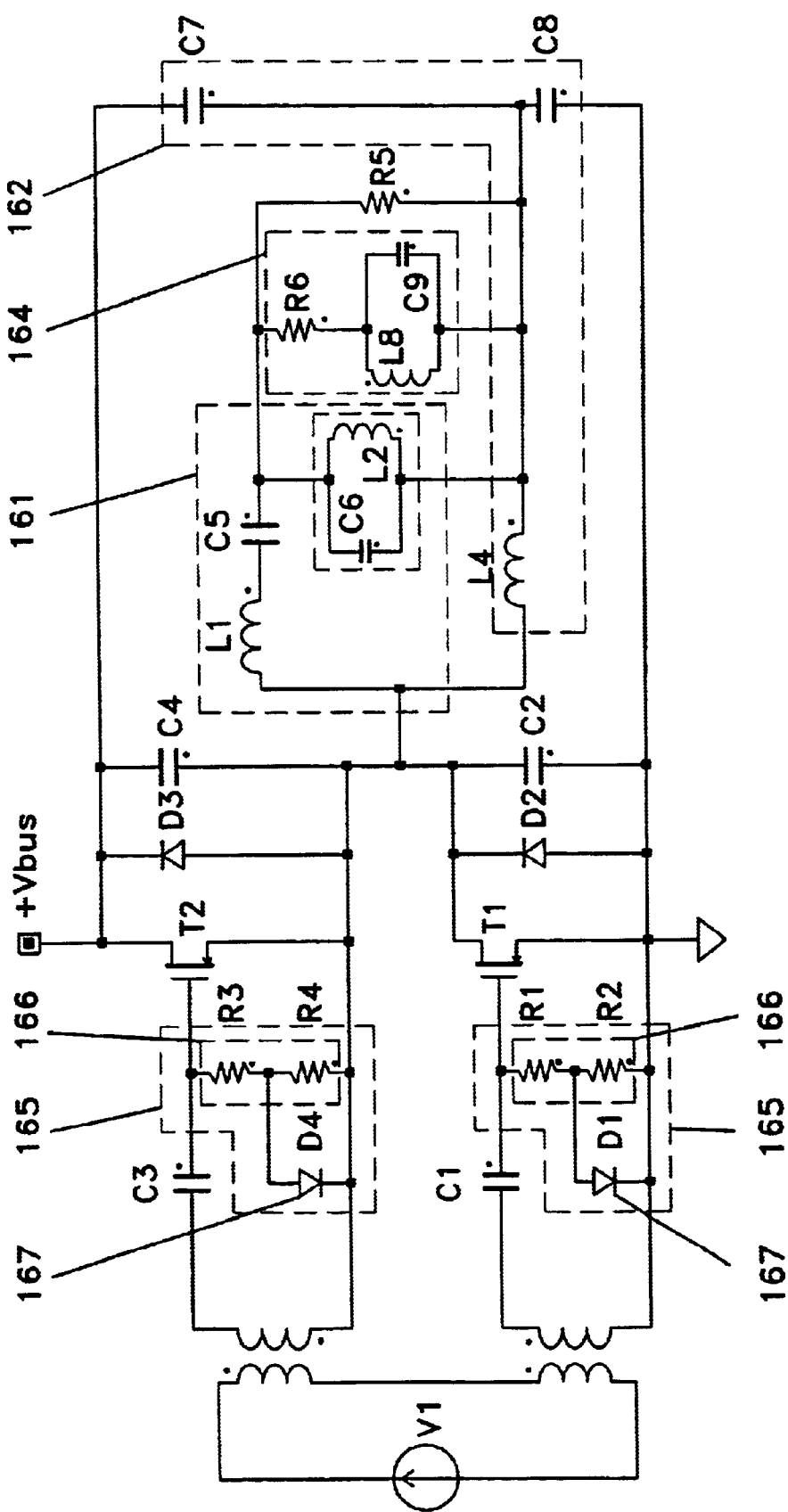
Figures 1, 3:
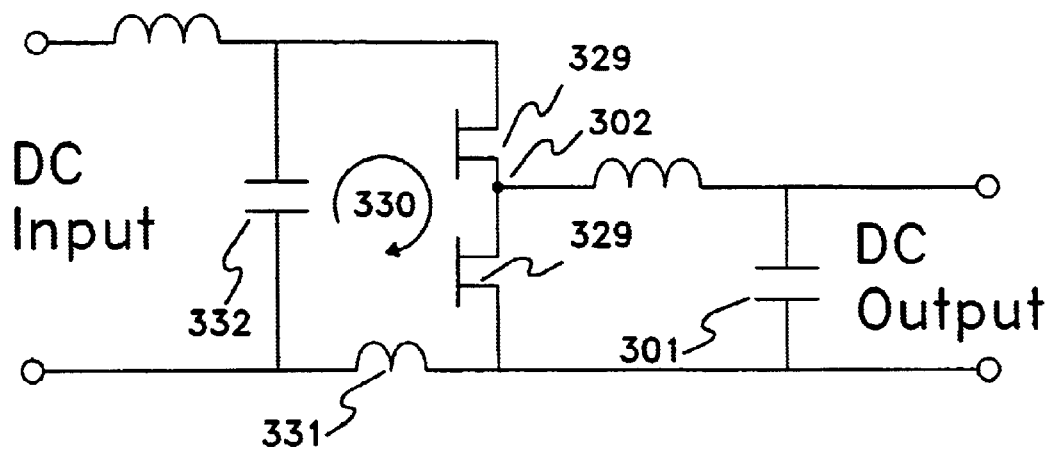
FIG. 1-1 shows a conventional computer power delivery system of the prior art.
Figures 2, 3:
Figure 3:
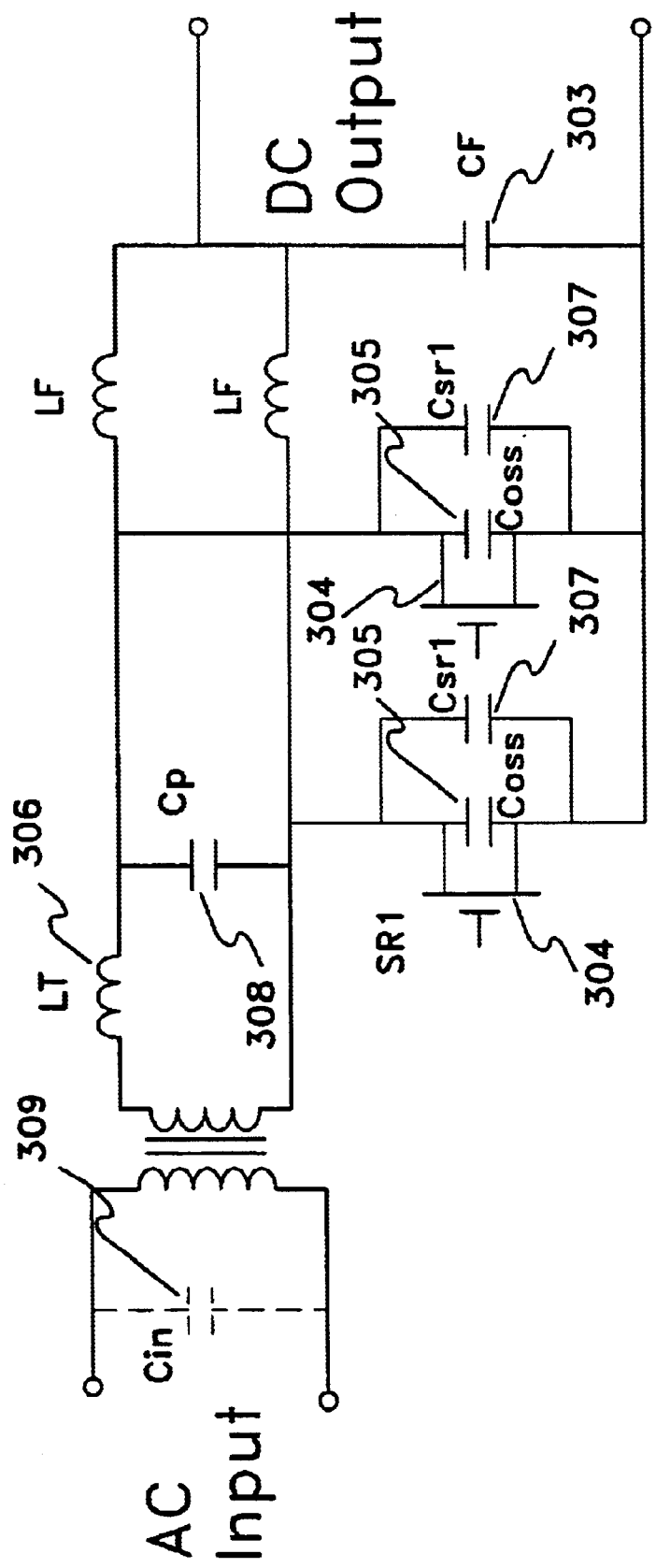
Figures 3, 4:
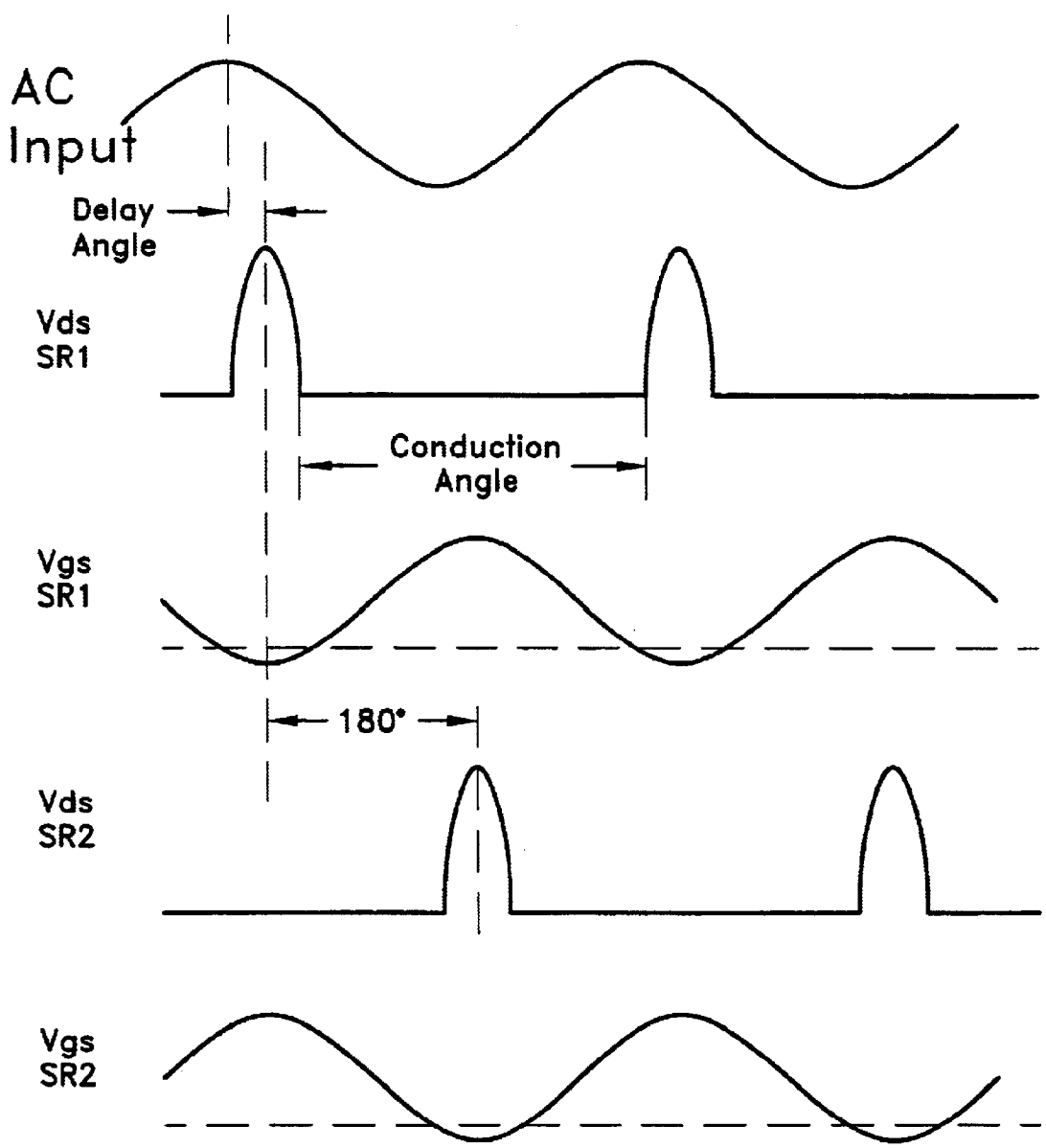
Figures 3, 4, 5:
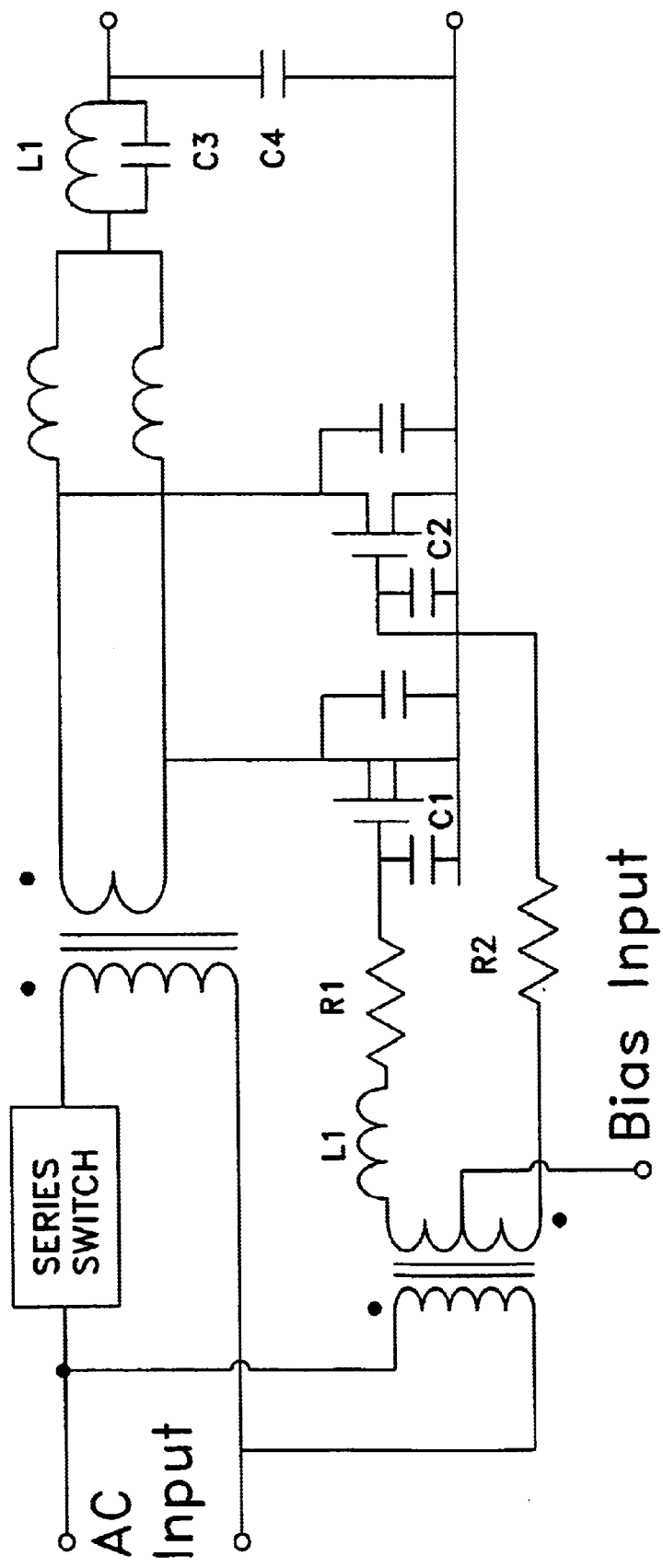
Figures 3, 4, 5, 6:
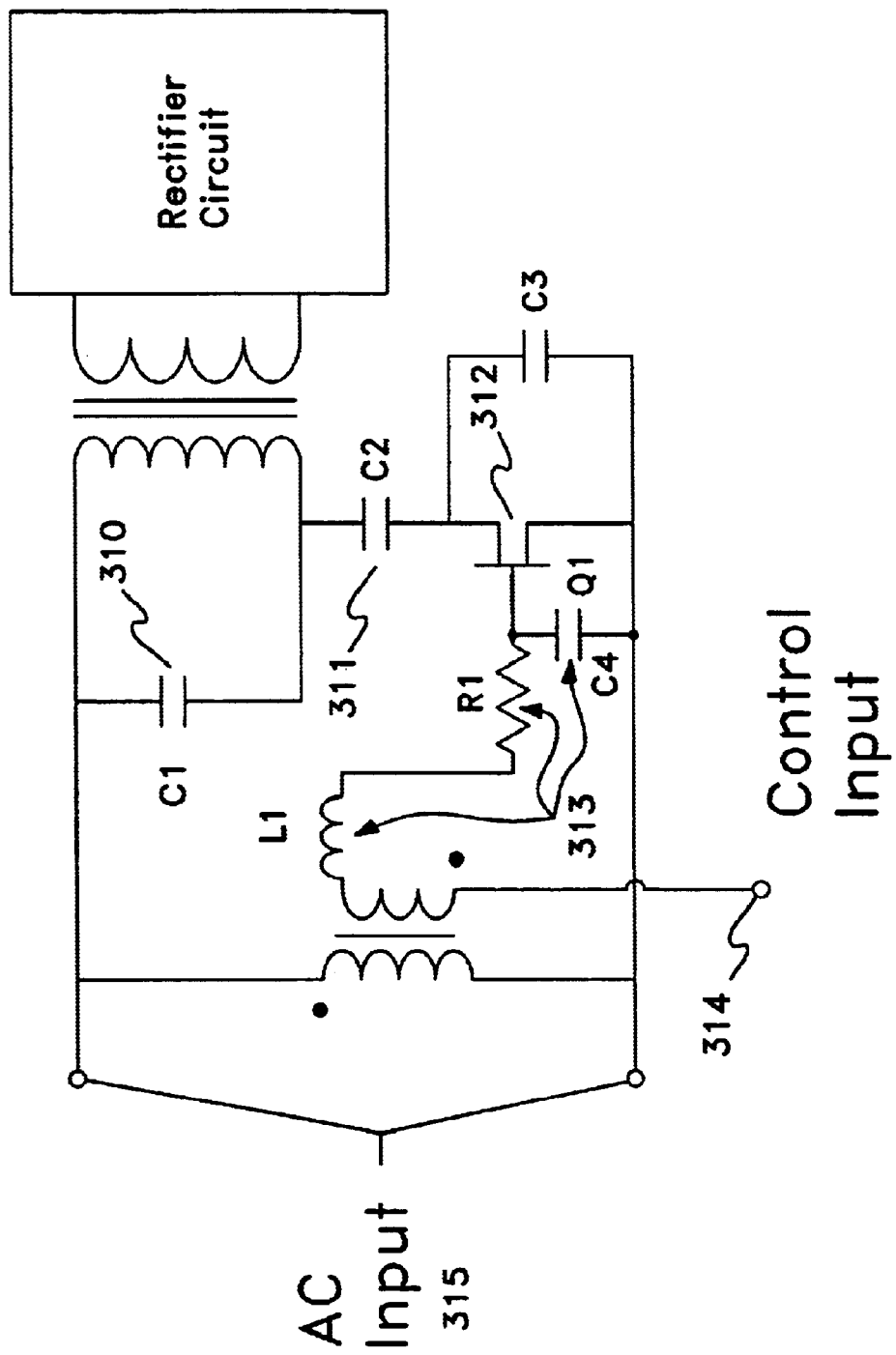
Figures 3, 4, 5, 6, 7, 8:
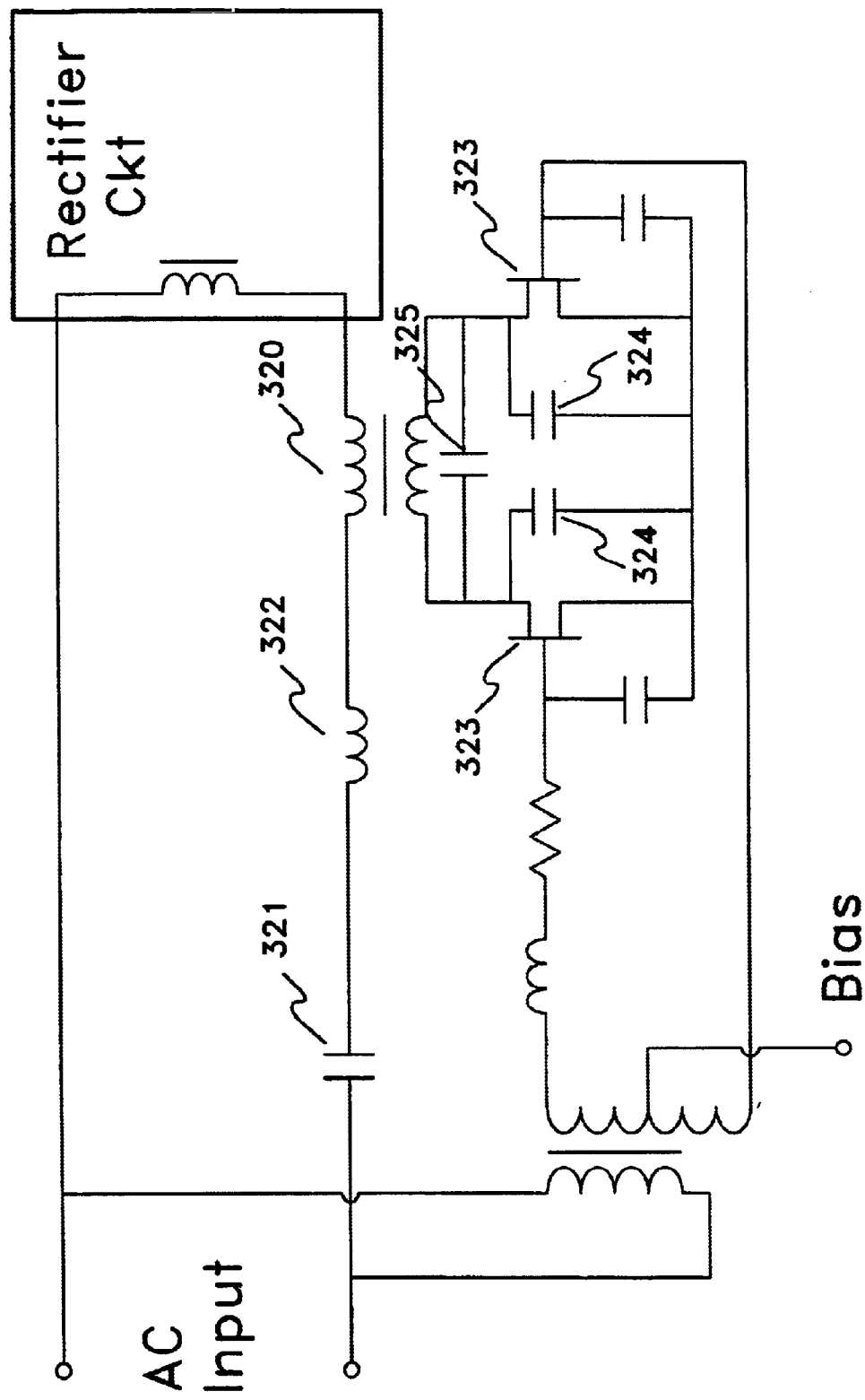
Figures 3, 4, 5, 6, 7, 8, 9:
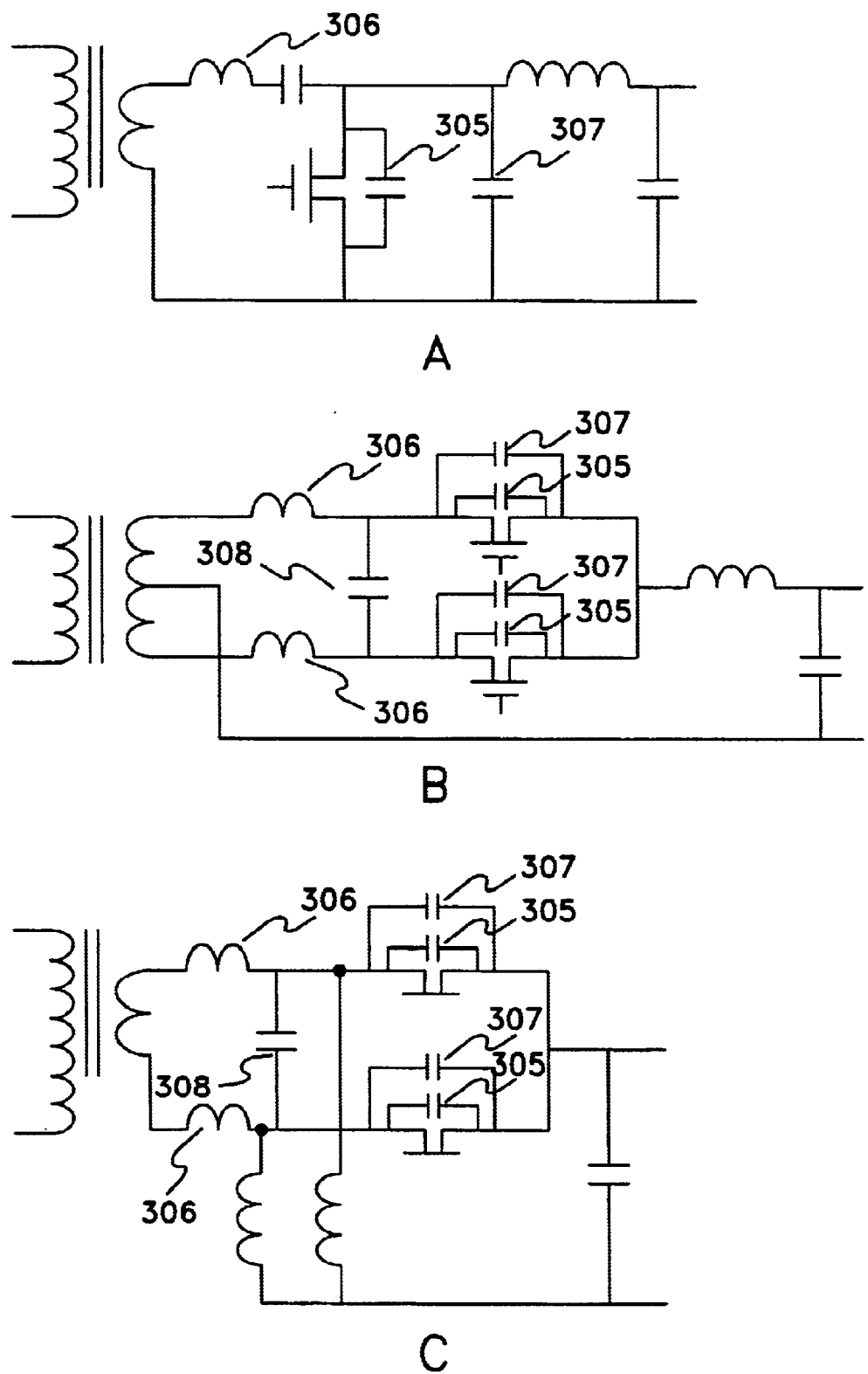
Figures 3, 4, 5, 6, 7, 8, 9:
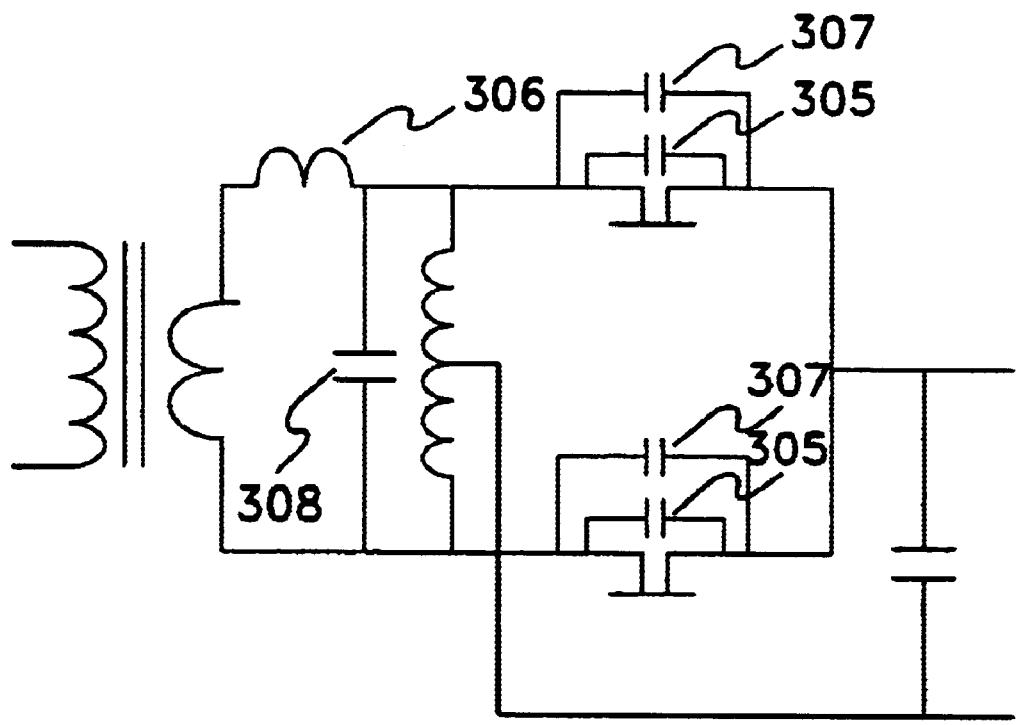
Figures 3, 4, 5, 6, 7, 8, 9, 10:
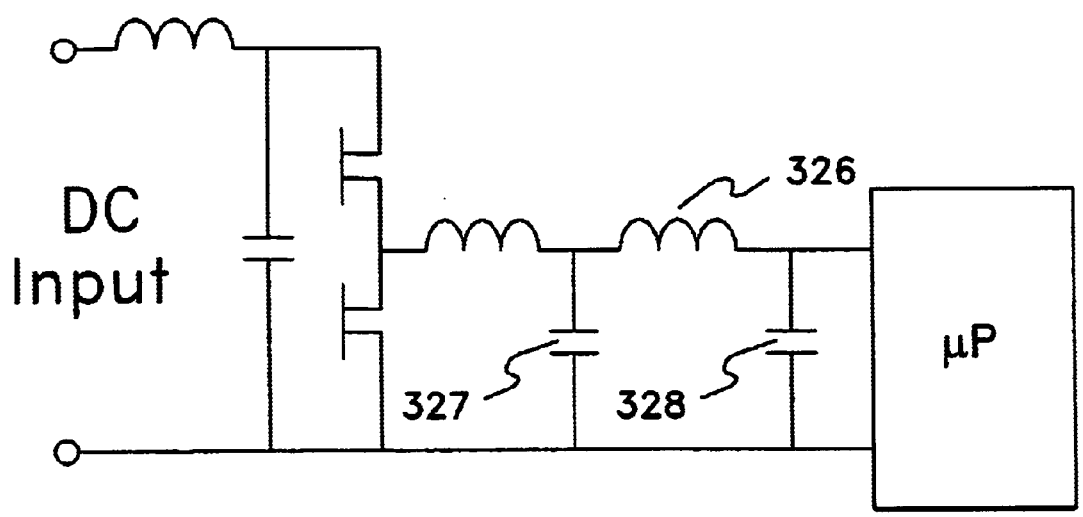
Figures 3, 4, 5, 6, 7, 8, 9, 10, 11, 12, 13, 14:
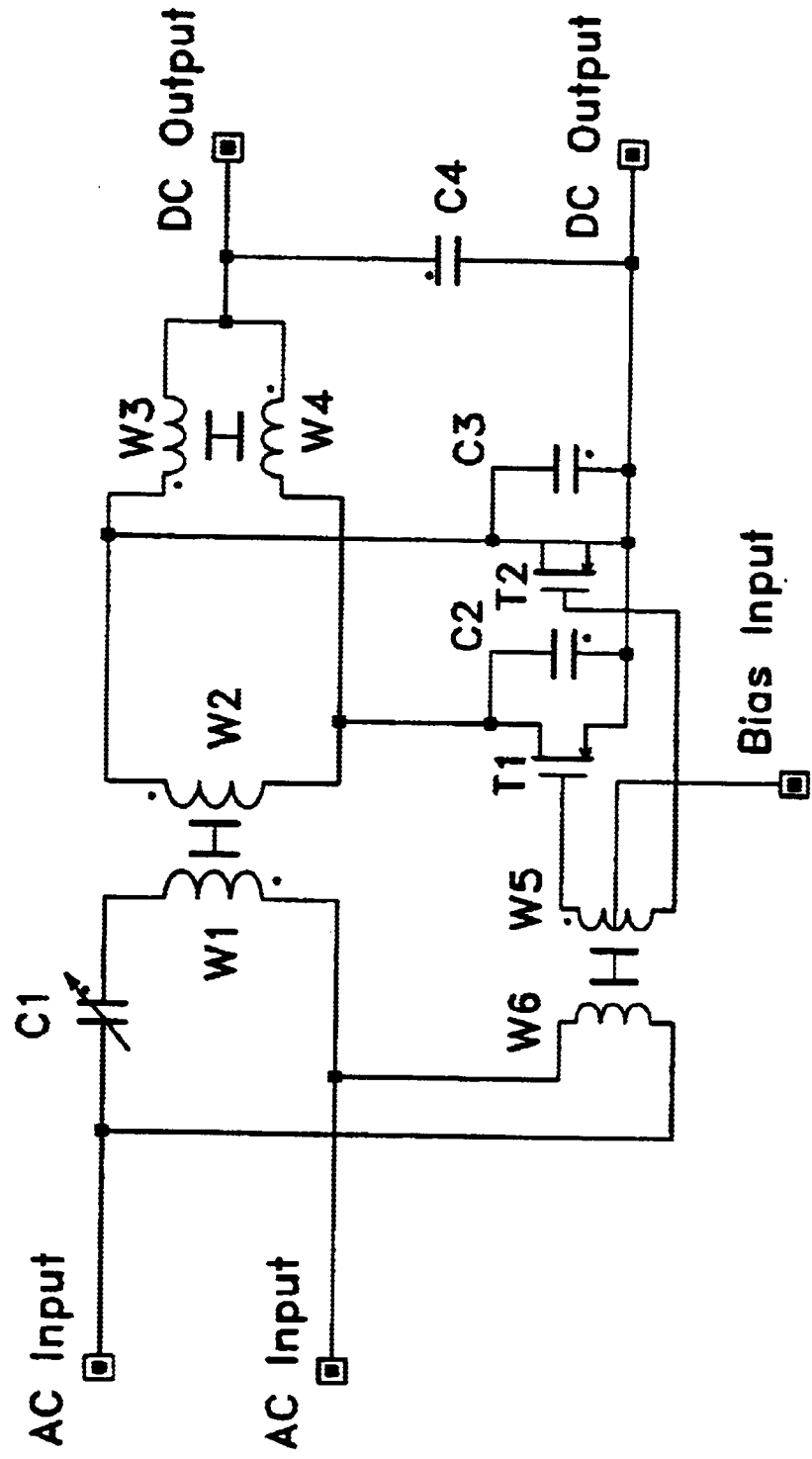
Figures 3, 4, 5, 6, 7, 8, 9, 10, 11, 12, 13, 14, 15:
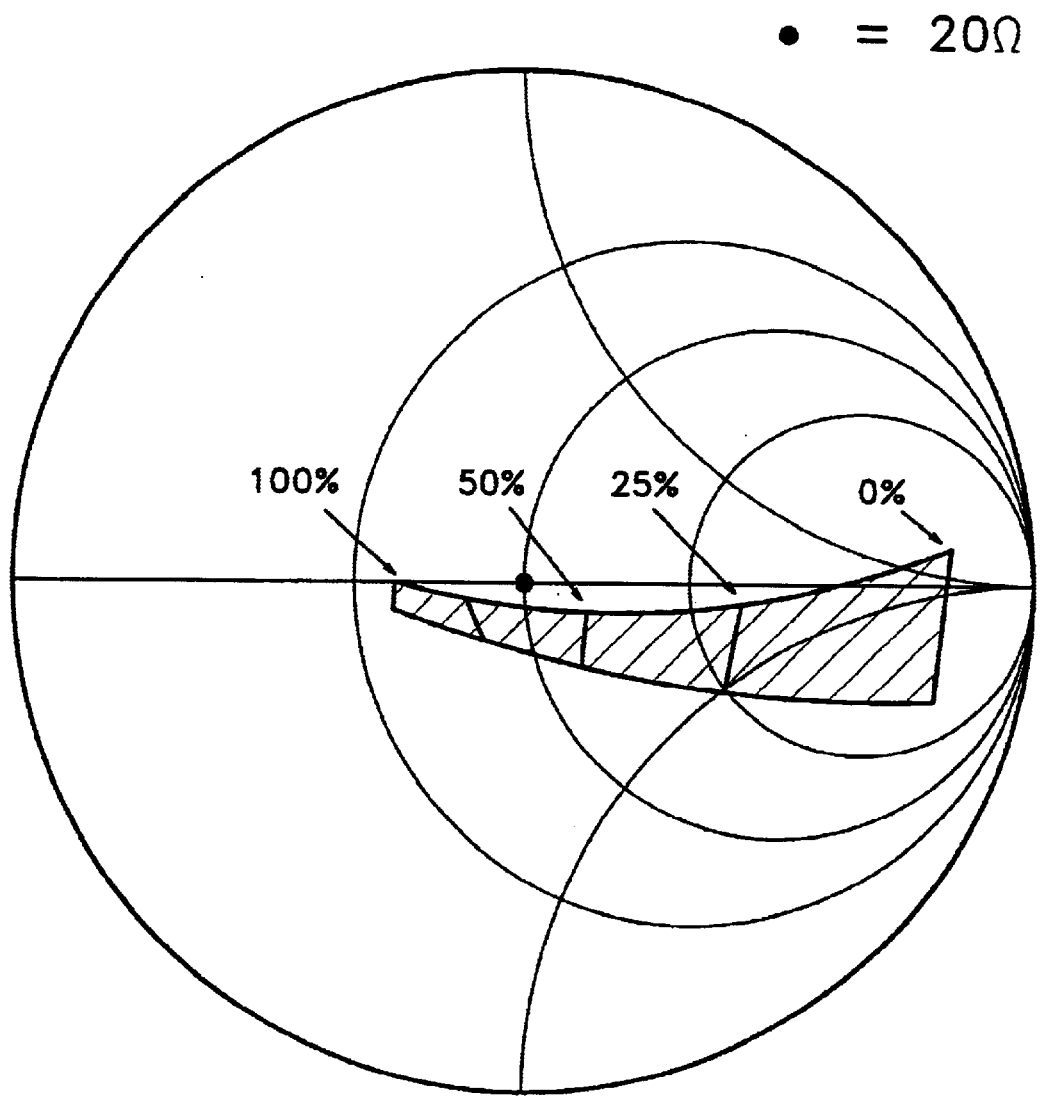

FIG. 1-3 indicates the parts of the computer power delivery system of the prior art that may be eliminated by the present invention.

FIG. 1-4 shows a computer power delivery system according to one embodiment of the present invention.

FIG. 1-5 indicates an embodiment of the power conversion element of the present invention.

FIG. 1-6 depicts another embodiment of the power conversion element of the present invention.

FIG. 1-7 shows details of a switch drive according to the present invention.

FIG. 1-8 shows a rectifier circuit of the present invention.

FIG. 1-9 shows a variation of output voltage with changes in the value of a capacitance in one embodiment.

FIGS. 1-10 and 1-11 show two variations of the voltage across a load resistance as a function of the load resistance.

FIG. 1-12 shows another embodiment with a two switch configuration and various general elements.

FIGS. 1-13 and 1-14 are plots of voltage waveforms at various locations for two different loads, high and low respectively.

FIG. 3-1 shows a traditional buck converter of the prior art.

FIG. 3-2 shows a waveform of the center point of the buck converter shown in FIG. 3-1.

FIG. 3-3 shows an embodiment of a transformer and rectifier portion according to the present invention.

FIG. 3-4 shows the voltage waveforms as they may exist at various locations in the circuit shown in FIG. 3-3.

FIG. 3-5 shows one gate drive embodiment for the SR's according to the present invention.

FIG. 3-6 shows a circuit for voltage control on the primary side with a single switching design.

FIG. 3-7 shows a family of drain to source voltages as a function of the control input voltage across the FET.

FIG. 3-8 shows a circuit for voltage control on the primary side with a dual switching design.

FIGS. 3-9 *a, b, c* & *d* shows various synchronous rectification circuits according to the invention.

FIG. 3-10 shows a bulk capacitor and a by pass capacitor arrangement as applied to a microprocessor system in the prior art.

FIG. 3-11 shows an overall preferred embodiment of the invention using a single switch control element.

FIG. 3-12 shows an overall preferred embodiment of the invention using a dual switch control element.

FIG. 3-13 shows an overall preferred embodiment of important aspects of the aspect of the design.

FIG. 3-14 shows yet another preferred embodiment of a voltage regulation module design using a variable capacitor for primary side regulation.

FIG. 3-15 is a Smith chart showing a range of VRM input impedances vs load current percentage for one design of the present invention.

DETAILED DESCRIPTION OF THE PREFERRED EMBODIMENTS

As can be easily understood, the basic concepts of the present invention may be embodied in a variety of ways. These concepts involve both processes or methods as well as devices to or which accomplish such. In addition, while some specific circuitry is disclosed, it should be understood that these not only accomplish certain methods but also can be varied in a number of ways. Importantly, as to all of the foregoing, all of these facets should be understood to be encompassed by this disclosure.

In the prior art, the central power supply provides several standard voltages for use by the electronics. Referring to FIG. 1-1, utility power 101, typically at 110 or 220 volt nominal ac power alternating at 50 or 60 cycles, is converted by power supply 106 to standard dc voltages, usually ±12 and +5 volts. These voltages are brought out of the power supply on flying leads, which form a kind of distribution system 107, terminated in one or more connectors 108. These standard voltages are useful directly for powering most of the input/output circuitry 140 and peripherals 144, such as a hard disc, floppy disc, and compact disc drives. As the technology of central processing unit (CPU) chip 141 has advanced, as discussed above, the operating voltage of such chips has steadily been reduced in the quest for higher and higher operating speeds. This increase in processor speed eventually required an increase in speed of the dynamic random access memory (DRAM) chips 143 used to hold instructions and data for the CPU, and as a result the operating voltage of these DRAM chips has also been reduced. Also, not all of the logic required to manage the input/output functions and particularly the flow of data to and from the CPU and the memory and external devices is present on the CPU chip. These management functions, along with housekeeping functions (such as clock generation), interrupt request handling, etc., can be dealt with by the "chip set", shown in FIG. 1-1 as logic management circuits 145. These circuits also have steadily increased in speed and have correspondingly required lower operating voltages.

The standard voltages are thus too high to properly power CPU 141, memory 143, and management circuits 145. These may all require different voltages, as shown in FIG. 1-1, where the actual voltages shown are representative only. These different voltages may each be created by an individual Voltage Regulation Module 112 (VRM), which may reduce the voltage supplied by the power supply 106 to the voltage required by the powered circuitry.

From an overall point of view, the prior art process of delivering power to a circuit load such as CPU 141 involves all of the power processing internal to power supply 106, distribution system 107 and connectors 108, and the power processing internal to VRM unit 112. This overall process is shown in FIG. 1-2. Central power supply 106, also called the "silver box", uses switchmode technology, with processing elements 102, 103, 104, and 105. The voltage regulation module (VRM) also uses switchmode technology. It should be understood that the discussion provided applies to both components. Thus the various features discussed in one context should be understood as potentially being applicable to the other. Focusing upon the silver box design only for purposes of initial understanding, it can be understood that utility power 101 enters the silver box and is converted to unregulated dc power by rectifier unit, or AC/DC converter 102. The resulting dc power is then re-converted to alternating current power at a higher frequency by inverter unit 103 (also called a DC/AC converter). The higher frequency ac is galvanically connected to and is at the voltage level of utility power 101. Safety considerations require isolation from utility power 101, and as the required output voltage is much lower than that of utility power 101, voltage reduction is also needed. Both of these functions are accomplished by transformer 104. The resulting isolated, low voltage ac is then rectified to direct or multiply direct current power output(s) by rectifier and filter unit 105, distributed to the circuitry loads by distribution wiring 107 and connectors 108. As mentioned before, specific standard voltages ±12 and +5 volts must be converted to lower voltages for CPU 141, memory 143 and management logic 145, by VRM unit 112. The standard dc voltage from power supply unit 106 (usually +5 volts) is converted to alternating power again by DC/AC converter 109, transformed to the lower voltage by transformer 110, and re-rectified to the proper low voltage by AC/DC unit 111.

As the voltage of the delivered power to the circuit load is decreased, the current increases, and as the speed of CPU 141 is increased, the power system must be able to handle larger and larger rates of change of current as well. As discussed above, this requires the source of power, 20 which for CPU unit 141 (and other low voltage circuits) is VRM 112, to be close to the circuit load. While for the near term designs the rate of change of current can be handled by capacitive energy storage, for future designs at still lower voltages and higher currents VRM unit 112 must be made extraordinarily small so that it can be placed close to its circuit load, and also must operate at a very high frequency so that large amounts of energy storage are not required. The requirement for low energy storage is rooted in the two facts that there is no physical room for the larger storage elements and no tolerance for their higher intrinsic inductance. Thus a requirement emerges that the frequency of VRM 112 must be increased.

Further, a glance at FIG. 1-2 indicates at least two redundant elements which can be eliminated. The established policy of distributing direct current power requires rectifier and filter 105, and the need for dropping the voltage to lower levels requires re-conversion of the dc to alternating current power by inverter 109. One of these is clearly redundant.

This opens the possibility of reduction of cost by eliminating elements 105 and 109, and choosing to distribute alternating current power instead of direct current power. Of course, the AC improvement may also be configured with existing, traditional DC leads as well in a hybrid system if desired. Returning to the improvement, however, as mentioned before, the frequency of inverter 109 has had to increase and will continue to increase, which requires, in the reduced system, that the frequency of inverter 103 be increased to a level adequate to serve the future needs of the system. FIG. 1-3 indicates these redundant elements.

Another redundancy exists in principle, between transformers 104 and 110, but the desire to provide isolated power in the distribution system 107 mandates the use of transformer 104, and the requirement for different voltages for the different loads may also require the various VRMs to utilize transformer 110. Assuming that these elements are left in place, then, the use of high frequency ac distribution produces a system as shown in FIG. 1-4. Thus one embodiment is directed specifically to the simplified VRM. Such an arrangement also permits electrically remote location of power element (e.g. at locations where the lead inductance would have otherwise have come into play using the prior techniques).

In FIG. 1-4, central power supply 147 converts utility power 101 to dc power by AC/DC converter 146. This dc power is then converted to high frequency sinusoidal power by DC/AC converter 113. The sinusoidal power (or perhaps "substantially" or "approximately" sinusoidal power, as may be produced by even a less than ideal inverter or the like) is distributed to the location of use of the power, where high frequency VRMs 118 convert the sinusoidal power to low voltage, high current power for the circuit loads such as CPU 141, input/output circuits 140, logic management circuits 145, and memory 143. In this approach, a VRM is required not only for the aforementioned low voltage circuits, but also for peripherals 144, since the DC power (likely +12 volt) requirement for these units is not supplied by the central power supply 106. (Note, the central power supply 106 may supply only sinusoidal high frequency AC power in this approach). High Frequency Transformer 114 may thus provide galvanic isolation and may transform the voltage from constant voltage Sinusoidal DC/AC Converter 113 to a level considered safe to touch.

It is possible to organize a distribution system which provides a constant current to the totality of the loads, or alternatively to provide a constant voltage to those loads. The architecture of computer systems and other complex electronic systems with loads which require multiple voltages is more suited to the latter approach. That is, it is desirable that the magnitude of the distributed ac voltage be maintained very close to constant against any output load variation, even on a microsecond time scale. Thus, it can accommodate a variable load, namely a load which alters at levels which would have caused variation in the power supplied in arrangements of the prior art. It may also be important to keep the Total Harmonic Distortion (THD) of the distributed ac voltage in low, to reduce Electro-Magnetic Interference (EMI). It should be noted, however, that the present invention may be modified to provide a constant current as well. That is, as those of ordinary skill in the art would readily understand, it is possible to modify the described circuit so that a constant current is delivered into a load which varies from nominal to a short circuit, for use in constant current applications.

Converter 113 may be designed to provide a constant output voltage with low THD, independent of load. Some of the embodiments presented herein depend upon being supplied with a constant input dc voltage from converter 146. It would of course also be possible to create this constant distribution voltage by feedback internal to converter 113, as an alternative, which then would not require a constant input voltage from converter 146. The latter approach—creating constant voltage through feedback—requires that the feedback system have very high bandwidth (high speed) in order to maintain the output voltage very close to constant against any output load variation, even on a nanosecond time scale. This feedback approach may be difficult and expensive to achieve, and the present invention is directed to accomplishing a constant voltage from converter 113 by the intrinsic operation of the circuit, without feedback. This can be significant because it can satisfy the needs of a system which has rapid energy demands such as a rapid current demand of at least about 0.2 amperes per nanosecond, at least about 0.5 amperes per nanosecond, at least about 1 ampere per nanosecond, at least about 3 amperes per nanosecond, at least about 10 amperes per nanosecond, and even at least about 30 amperes per nanosecond and beyond. It also can be significant because it can permit reaction to a change in conditions very quickly, such as within:

- less than about a period of a "Nyquist frequency" (e.g. the Nyquist rate, that is the maximum theoretical rate at which sampling or transmission of an event can occur for a feedback-type of system),
- less than about two and a half times a period of a Nyquist frequency,
- less than about five times a period of a Nyquist frequency,
- less than about ten times a period of a Nyquist frequency,
- less than about twice a period of said alternating power output,
- less than about four times a period of said alternating power output,
- less than about 200 nanoseconds,
- less than about 500 nanoseconds,
- less than about 1000 nanoseconds, and
- less than about 2000 nanoseconds.

FIG. 1-5 shows one embodiment of a constant voltage high frequency power source to accomplish the function of converter 113. Here dc power source 119 is the circuit representation of the constant voltage from converter 146, and load 128 represents the constellation of loads connected to distribution system 115 (including the effects of connectors 18 and distribution system 115). The voltage from source 119 is converted to a constant current by inductor 120 and either shunted by switch 122 when the switch is ON, or permitted to flow into network 148, comprising the elements in parallel with switch 122 when the switch is OFF. The network thus acts as a response network, that is, one which acts after the switch has transitioned. The voltage across switch 122 is approximately zero when switch 122 is ON and is dependent upon the response of network 148 when switch 122 is OFF. This response waveform, or "switch voltage waveform" is transformed by network 48 to form the voltage across load 128. It turns out to be possible to choose the values of elements 123, 124, 125, 126, and 127 such that the switch voltage is zero at the commencement of the interval of time when switch 122 is ON, independent of the value of the conductance of load 128, at least within a nominal range of conductance for load 128. This may be accomplished in the following way. If the conductance of load 128 is very small (light loading), little current will flow in inductance 127, and its value will not strongly affect the waveform across switch 122. Then the values of elements 123, 124, 125, and 126 may be chosen to cause the waveform across switch 122 to be approximately zero, or to be a desired fixed value, at the moment when switch 122 begins to conduct. Clear descriptions for the methodology for accomplishing this may be found in U.S. Pat. Nos. 3,919,656 and 5,187,580. Once this has been accomplished, the conductance of load 128 may be changed to the maximum nominal value, and the value of inductor 127 chosen to return the value of voltage across switch 122 at the commencement of its ON period to the value chosen in the first step. This algorithm will result in a circuit for which the value of the switch voltage waveform at the commencement of the ON period of switch 122 is nearly independent of the value of the conductance of load 128, within the defined nominal range. It also results in a circuit for which the shape of the switch voltage waveform varies minimally over the range of the conductance of load 128. A significant function of the network formed by elements 123, 124, 125, 126, and 127 is to form a sinusoidal waveform across load 128. Since this is a linear passive network, namely, a network with no active elements (including but not limited to steering diodes, diodes generally, other active elements, or the like) or a network without some type of feedback element (an element which senses a condition and then responds to that condition as a result of a delayed decision-type of result), if the shape of the switch voltage waveform does not change in any substantial way, and especially if the fundamental frequency component of the switch voltage waveform (the Fourier component of the waveform at the operating frequency) does not change substantially, for this circuit the value of the sinusoidal voltage across load 128 will not change substantially. Thus selection of the values of elements 123, 124, 125, 126, and 127 in this manner results in a stable, constant, high frequency, pure sinusoidal voltage across load 128, independent of the value of the conductance of load 128, thereby accomplishing the objective of providing a constant voltage to the distribution system. It should be noted that the operation of this network to produce a constant output voltage is very fast; abrupt changes in the conductance of load 128 anywhere over its entire nominal range may be corrected in a few cycles of operation. This is much faster than typical feedback approaches could make the same correction and serves to provide a fast acting network, namely one which does not suffer the existing delay in a feedback type of system.

A unique element of the invention is its high efficiency over the entire load range from a nominal load to an open circuit or from a nominal load to a short circuit. (As one skilled in the art should understand, one way to achieve one as opposed to the other simply involves altering the AC distribution system by one-quarter wavelength.) This comes about largely as a result of the constant switch waveform described above. Since the voltage waveform changes but little over the load range, switching losses in the circuit are not affected by load variations. It should also be noted that all of the benefits of this invention are obtained without changing the frequency of operation. Thus, high efficiencies such as at least about 80%, at least about 85%, at least about 90%, at least about 95%, at least about 98% and even at least about 99% efficiency and beyond can be attained.

Such a circuit, which provides a constant voltage sinusoidal output across a load (or even in not strictly "across" the load, more generically "to which the load is responsive" thus encompassing bit direct and indirect responsiveness) which can vary at high speed, utilizing a single or multiple switch and a simple circuit, operating at constant frequency, while maintaining high efficiency over the entire load range, is a unique aspect of this invention in the field of power conversion.

Another unique element of the invention is in the nature of the method of driving switch 122. As has been pointed out previously, efficiency is important in these applications, and it is desirable not to waste energy anywhere, including the circuit used to drive switch 122. It is in the nature of high frequency switches such as Field Effect Transistors (FETs) that they have a large input capacitance. Circuits which change the voltage on the gate terminal in a square-wave manner must first charge that capacitance to a voltage well above the gate threshold voltage for switch 122, turning ON the FET, and in the process deposit energy into that capacitance. It must then discharge that capacitance to a voltage well below the gate threshold voltage for switch 122, in the process absorbing the energy stored in the gate capacitance. The power lost in the process is the energy stored in the gate capacitance, multiplied by the frequency of operation, and this can be a substantial number. In the present invention this loss is avoided by affirmatively utilizing the gate capacitance of switch 122, thus coordinating the circuitry to the gate or capacitance. That is, the energy stored in the gate capacitance during the period switch 122 is ON is, in the present invention, stored in another element of the system during the period switch 122 is OFF, and is thereby available on the next cycle to return the gate above the threshold voltage for the next ON period. This may be accomplished by "resonating" the gate capacitance (or the effective capacitance of the system) with a series or parallel inductor. The entire system may be tuned to coordinate with the frequency of the output and the output capacitance of the switch. Referring to FIG. 1-7, FET switch 122 is depicted as an internal switch device 139 with an explicit gate capacitance 138, shown separately. Gate drive circuit 121, according to the current invention, contains inductor 136 connected in series (or in parallel as shown in the dotted-line alternate connection 137) which is selected such that the reactance of inductor 136 or 137 is equal to the reactance of capacitor 138 at the frequency of operation. In this way the energy in the gate system is transferred from gate capacitor 138 to inductor 136 (or its alternate 137) and back again each cycle, and only the inevitable losses in the inductor and gate resistance need to be regenerated for each cycle.

In such a system the gate voltage is substantially sinusoidal. It will be obvious to those skilled in the art that the duty cycle of the system (that is, the fraction of the total period that switch 122 is ON) is determined by the fraction of the sinusoidal cycle which is substantially above the threshold voltage of switch 122. It will also be obvious that, while the duty cycle of switch 122 may be controlled by the magnitude of the sinusoidal signal, such an approach places limits on the available range of duty cycle, and also may result in longer than desirable commutation times (that is, the fraction of the total period during which the switch is transitioning from the ON to the OFF state), which may increase the losses of switch 122 and thereby reduce the efficiency of the system. For this reason, the drive waveform for switch 122 may be divided in the present invention into an ac portion 149 and a dc portion 150, and variation in the duty cycle of switch 122 may be controlled by varying the relative magnitude of the ac and dc components of the drive waveform for switch 122.

An alternative approach to constant voltage, high frequency power generation is shown in FIG. 1-6. Here again, dc power source 119 is the circuit representation of the constant voltage from converter 146, and load 128 represents the constellation of loads connected to distribution system 115 (including the effects of connectors 108 and distribution system 115). Switch 122 is placed in series with inductor 129, across source 119. The voltage across inductor 129 is transformed by transformer 131 and placed across the network comprised of elements 132, 133, 134, and 135. This network produces the output voltage appearing across load 128, which again represents the constellation of loads connected to distribution system 115 (including the effects of connectors 108 and distribution system 115). Provided the values of the circuit elements are properly chosen, this output voltage will be independent of the value of the conductance of load 128, within a nominal range of such conductance. To create this independence, it is sufficient to select the values of the elements such that, as one example:

the reactance of inductor 129 in parallel with the magnetizing inductance of transformer 131 is equal to the reactance of capacitor 130 in parallel with the adjunct output capacitance of switch 122 at the frequency of operation;

the reactance of inductor 132 in series with the leakage inductance of transformer 131 is equal to the reactance of capacitor 133 at the frequency of operation; and the reactance of inductor 134 is equal to the reactance of capacitor 35 at the frequency of operation.

Selection of the values of the circuit elements in this manner will result in a stable, constant, high frequency, pure sinusoidal voltage across load 128, independent of the value of the conductance of load 128, thereby accomplishing the objective of providing a constant voltage to the distribution system.

The necessity for the parallel resonant circuit formed by inductor 134 and capacitor 135 is reduced if the minimum load conductance is not too close to zero. That is, the network comprised of elements 134 and 135 has the function of providing a minimum load to the generator so that the output waveform remains sinusoidal when load 128 is removed or reduced to a very low value. Should the application to which the invention is applied not present a load variation down to low values, or if the requirement for low THD not be present at light loads, the network comprised of elements 134 and 135 may be dispensed with. Alternatively, the network comprised of elements 134 and 135 may be reduced to a single element, which may be either an inductor or a capacitor, if the highest efficiency is not demanded.

It is generally possible to also dispense with inductor 129 by affirmatively utilizing the magnetization inductance of transformer 131. Similarly, it is generally possible to dispense with inductor 132 by affirmatively utilizing the leakage inductance of transformer 131. This may be accomplished through the modification of the construction of transformer 131 in the manner well known to those skilled in the art.

As before, to attain high efficiency it is important to affirmatively utilize the gate capacitance of switch 122, and all the remarks made above in reference to FIG. 1-7 apply to the embodiment of FIG. 1-6 as well.

As mentioned earlier, and referring to FIG. 1-4, converter 113, operating together with AC/DC element 146, is designed to provide a constant high frequency ac output voltage with low THD, independent of load. It is VRM 118 which must convert this high frequency ac power from power unit 147 to low voltage high current DC power for use by the powered circuitry 145, 141, and 143. FIG. 1-8 shows one embodiment of the rectifier portion of one embodiment of a VRM to accomplish this conversion in accordance with the present invention. Input AC power from power unit 147 may also be processed further to enhance its stability before the rectification process, and this further processing is not shown in FIG. 1-4. The result of this processing is a stable regulated ac input 177 to the rectifier circuit 178 shown in the dotted box in FIG. 1-8.

Rectifier circuit 178 is comprised of transformer 179, which in practice will exhibit leakage inductance caused by imperfect coupling between its primary and secondary windings. This leakage inductance may be represented in general as an inductance in series with the primary or secondary of the transformer. In FIG. 1-8, it is represented by inductor 180, which therefore may not be an actual component in the circuit, but rather simply a circuit representation of part of the real transformer 179, as built. It should be noted that, should the natural leakage inductance of transformer 179 be smaller than desirable for any reason, additional inductance may be added in series with its secondary (or primary) to increase the natural value, as will be understood by those skilled in the art. For the purposes of this disclosure, inductor 180 may be considered to be the total of the natural leakage inductance of transformer 179 and any additional discrete inductance which may have been added for any purpose.

Diodes 83 rectify the ac output of transformer 179, and filter inductors 184 and filter capacitor 185 create a steady dc output for consumption by the microprocessor or other electronic load 186. For small output voltages, the voltage drop across the diodes 183 is too large relative to the output voltage, resulting in loss of efficiency. As a result diodes 183 may be profitably replaced by field effect transistor (FET) switches, which can be manufactured to have a much lower voltage drop. In this case the FET devices require a drive signal to determine their conduction period; the circuitry to do this is not shown in FIG. 1-8.

A second problem which arises as the output voltage is dropped is the intrinsic leakage inductance of transformer 179. This inductance, which, together with other circuit inductance, is represented as inductor 180, and acts as a series impedance which increases the output impedance of the overall circuit. That is, there is a natural voltage division between the reactance of inductor 180 and load impedance 136, which requires an increased input voltage in compensation, if the output voltage is to remain constant over changes in the resistance of load 186. This voltage division causes the output voltage to be a strong function of the resistance of load 186, which is another way of saying that the output impedance of the circuit is not small compared to the load resistance 186.

The diodes 183 shown in FIG. 1-8 would ideally conduct whenever the voltage on their anodes was positive with respect to their cathodes, and would not conduct when the voltage was in the opposite polarity. This is what is called zero voltage switching, or ZVS, because the switching point, or transition, from the conducting to the nonconducting state occurs at zero voltage point in the waveform. Operating an FET device at ZVS is an advantage, because the losses are lowered, since the device does not have to discharge energy from its output capacitance, or the energy stored in capacitors 182, which are in parallel with the switches. As the output current through load 186 increases, the timing for the switches to produce ZVS must change, and may complicate the FET drive circuitry. In the description of the figures which follow, we shall nevertheless assume that the switches are operated at ZVS conditions, or that a true diode is used.

FIG. 1-9 shows how the output voltage varies with changes in the value of capacitance 182 placed across diodes 183. These curves were plotted for an operating frequency of 3.39 MHz. As may be seen in FIG. 1-9, as the value of capacitances 182 are increased, the output voltage (that is, the voltage across load resistance 186) first begins to increase, but as the value of the capacitance 182 is increased still further, the voltage across load resistance 186 begins to drop again. Thus there is an optimum value for the capacitances 182 which obtains the highest voltage transfer function. In FIG. 1-9 two curves are shown, curve 187 a value of inductance 180 of 40 nH, and curve 188 for a value of inductance 180 of 20 nH. Curve 187 shows that a peak in output voltage occurs at a value for capacitances 182 of about 27 nF, while curve 188 shows that a peak occurs at a value for capacitances 182 of about 86 nF. Note that these are not a factor of two apart (86/27>3) as would be the case if the values of capacitances 182 and inductor 180 satisfied the resonance condition since the two curves are for values of inductor 180 which are a factor of two apart. This means that the condition for maximum output is not the same as for resonance at the frequency of the input power from generator 177. The two capacitors 180 may be replaced by a single capacitor 181 in a parallel position across the secondary winding of transformer 179 and inductor 180, with the same result, although the current in the diodes 183 will not be the same in this case.

FIGS. 1-10 and 1-11 show the voltage across load resistance 186 as a function of the load resistance 186. The slope of these curves is a measure of the output impedance of the circuit 178. That is, if the slope is zero, the output impedance is zero, and the circuit exhibits "natural regulation" without feedback. Curve 189 in FIG. 1-10 and curve 192 in FIG. 1-11 show that, for a value for capacitances 182 equal to the value which results in a peak in voltage across load resistance 186, a slope of nearly zero is obtained, without feedback. That is, for a proper selection of the value of capacitances 182 in relation to inductance 180, the voltage across load resistor 186 becomes relatively independent of the actual value of the load resistor 186—the output is "naturally regulated". It will be seen that the advantage of "natural regulation"—regulation without feedback—is that one does not need to wait for a feedback system to recognize a change in output voltage compared to a reference, and to change some parameter internal to the circuit. Under the described conditions, the output voltage is held constant and maintained so within a cycle or two of the operating frequency, which is short compared to stable feedback systems.

Thus a system has been described which produces a stable output voltage over a wide range of load resistances without feedback, even under conditions of rapid change in the load resistance. For systems which can tolerate the change in output shown in the figures, no feedback is required. For systems which require tighter control of the output voltage under conditions of changing load, feedback may be added, and it will be noted that the teachings of the present invention reduce the requirement for action on the part of the feedback system, permitting simpler, faster, and less costly feedback circuits to be used.

As mentioned earlier, the circuit can be embodied in a variety of manners to achieve the overall goals of this invention. For example, referring to FIG. 1-12 as but one other example of a circuit design, in general, the circuit can be understood. It may have any combination of a variety more generically stated elements. First, it may have a constant output element, such as the constant output voltage element 161. In this arrangement, the constant output element serves to maintain some output parameter as a constant regardless of a variation such as may occur from the variable load. As one skilled in the art would readily understand, the parameter maintained may be selected from a great variety of parameters, including but not limited to parameters such as:

- a substantially constant switch voltage output which is substantially constant over all levels at which said variable load exists practically,
- a substantially constant load voltage input which is substantially constant over all levels at which said variable load exists practically,
- a substantially constant switch voltage Fourier transform which is substantially constant over all levels at which said variable load exists practically,
- a substantially constant switch voltage output waveform which is substantially constant over all levels at which said variable load exists practically,
- a substantially constant switch voltage transition endpoint which is substantially constant over all levels at which said variable load exists practically, and
- all permutations and combinations of each of the above In the configuration shown, this constant output voltage element 161 has inductor L1 and capacitor C5 which may be tuned for series resonance at the fundamental frequency of operation, inductor L2 and capacitor C6 which may be tuned for parallel resonance at the fundamental frequency of operation, and capacitors C7 & C8 arranged to form a half supply with low AC impedance as is common for a half bridge configuration, with R5 representing the load to be powered. Of course, from these general principles, as a person of ordinary skill in the art would readily understand, other designs can be configured to achieve this basic goal.

Second, the system can include a constant trajectory element such as the constant trajectory element 162. In this arrangement, the constant trajectory element serves to maintain the response waveform (or even the Fourier component of the waveform) as substantially a constant regardless of a variation such as may occur from the variable load. In the configuration shown, this constant trajectory element 162 has inductor L4 connected to a half supply (shown as capacitors C7 & C8). It provides a constant current at the time of transition from switch T1 conducting or switch T2 conducting (or visa versa) where diode D2 and capacitor C2 are adjunct elements of switch T1, and diode D3 and capacitor C4 are adjunct elements of switch T2. The trajectory which is maintained may even be held to one which present a continuous second derivative of voltage with respect to time. As shown herein, designs may also be configured to achieve a constant end point. The end point may or may not be zero, for instance, it may be desirable in certain designs to have a non-zero end point. That type of a design may include values such as: zero volts, a voltage which is less than a diode turn-on level, less than about 5% of said switch DC supply voltage, less than about 10% of said switch DC supply voltage, less than about 20% of said switch DC supply voltage, and less than about 50% of said switch DC supply voltage, each over all levels at which said variable load exists practically. Regardless, a constant result (trajectory, end point, or otherwise) can be important since it is the voltage at the moment of switch turn-on or the avoidance of turning on the body diode which can be highly important. Again, from all these general principles, as a person of ordinary skill in the art would readily understand, other designs can be configured to achieve each of these basic goals. Designs may thus provide a network which is substantially load independent and which provides a substantially trajectory fixed response. Further, any nonlinear transfer characteristics of any component, such as the varactor capacitance nature of many switches, the nonlinear transfer characteristics of a transformer, or the like, can be affirmatively utilized by the network as well for an optimal result.

Third, the circuit may include an energy maintenance element, such as the energy maintenance circuit 163. In this feature, the energy maintenance circuit 163 serves to maintain the energy needed as a constant regardless of a variation such as may occur from the variable load. In the configuration shown, this energy maintenance circuit 163 has a capacitor C6 configured in parallel with inductor L2, both being in parallel with the load shown as R5. This element may serve to supply substantially all of the rapid energy demand of the load such as discussed earlier. Again, as before other designs can be configured to achieve this basic goal.

Fourth, the circuit may have some type of stabilizer element such as the stabilizer element 164 shown. This stabilizer element 164 serves to absorb energy not in the fundamental frequency in accordance with the principles discussed in U.S. Pat. No. 5,747,935, hereby incorporated by reference, to the assignee of the present invention.

Finally, the circuit may include an automatic bias network such as the direct bias alteration element 165 as shown for each switch. In this arrangement, these networks may include some type of voltage divider 166 with a conduction control element such as diode 167. Here, the voltage divider 166 uses two resistors R1 & R2 which may be selected to be equal, each with high values such as 1k ohm. This element provides a negative bias in proportion to the AC drive amplitude. The result can be a conduction period which is independent of the drive amplitude. It can thus provide a constant dead time (response time) when neither switch is in the conductive state. Again, from these general principles, as a person of ordinary skill in the art would readily understand, other designs can be configured to achieve this basic goal as well.

As illustrated in FIGS. 1-13 and 1-14, it can be seen how a properly configured system according to the present invention has the constancy features mentioned. The plots 1-4 show waveforms as follows:

1- the voltage at the junction between switches T1 and T2;
2- the output voltage across the load, R5;

3- the current through L1; and 4- the current through L4.

By comparing the high load and low load situations for the same network as shown between the two figures, several events can be noticed. These include the constant output voltage (A), constant end point (B and B'), constant trajectory (C and C'), constant response time period (D and D'), zero voltage switching (B and B'), and constantly an event of zero load current in the transition (E), all even though there is a highly varying power and load current as indicated by the current into the network at L1 (F and F'). Other features are also noticeable, as one skilled in the art should easily understand.

As mentioned earlier, buck converter topologies (such as shown in FIG. 3-1) are in current use for powering microprocessors, especially for voltage regulation modules. For a 2.5 volt, 13 ampere requirement, a switching frequency of 300 kHz is becoming inadequate. To meet substantial step load changes an output capacitance 301 of 3 mF (milifarads) is becoming required. As microprocessor voltage requirements move downward toward 1.0 volt at 50 amperes, the prior art topologies become even less suitable. With a drop in voltage (and an attendant drop in differential voltage tolerance) of 2.5 times, and an increase of current of 4 times, an output capacitor of 30 mF would be needed to maintain the required step response. It becomes increasingly difficult or impossible, however, to locate such a large capacitor close to the microprocessor connections. In addition, the cost of this approach increases with decreasing voltage. The other possibility would be to increase the frequency. The voltage waveform 302 shown in FIG. 3-2 is typical for a buck converter. When the frequency increases in such an arrangement, however, the non-resonant edges of this waveform cause problems such as the commutation of FET output capacitance and prevent increasing the switching frequency above about a megahertz. This situation is rapidly becoming serious as microprocessors and other low voltage electronics are being developed which are increasingly difficult to provide suitable power for. The present invention permits the achievement of higher frequencies and currents as will be required. It permits frequencies such as greater than at least about 300 kHz, greater than at least about 500 kHz, greater than at least about 1 MHz, greater than at least about 3 MHz, greater than at least about 10 MHz, and even greater than at least about 30 MHz and beyond, and can be configured to handle currents of more than about 15 amperes, more than about 20 amperes, more than about 50 amperes, and even more than about 100 amperes and beyond.

In one embodiment, an aspect of this invention is the basic change from a circuit converting dc to dc to a circuit transforming ac to dc making use of a transformer and a synchronous rectifier. A transformer is useful in this approach as it is possible to eliminate large currents being distributed to the converter input. The high current secondary can thus be located physically close to the load. One circuit for accomplishing this shown in FIG. 3-3.

With the invention disclosed, the energy conversion frequency can be increased substantially, thereby allowing the output capacitance 303 to remain small and be located adjacent to a given load such as the microprocessor interconnections. In fact, much higher conversion frequencies can be achieved and whereby the output capacitance can be substantially reduced. In the case of the 1.0 volt, 50 ampere requirement, the output capacitance 303 with the present invention can be 500 μF or lower, depending upon load requirements. In fact, with the present invention, designs can be accomplished which provide a network having an effective capacitance (that which causes an appreciable effect in the use or circuit designed) which is less than about 10 millifarads, less than about 3 millifarads, less than about 1 millifarads, less than about 0.5 millifarads, and even less than about 0.3 millifarads.

Such a dramatic improvement can come through the incorporation of several elements individually or simultaneously. One primary goal of this invention is the elimination of frequency related limitations. Consequently it can be important to eliminate forced voltage commutation of any capacitors. The Synchronous Rectifier (SR) 304 device used may be a Field Effect Transistor (FET) with adjunct drain to source capacitance 305. This SR can always be commutated to the conducting state at a time when there is zero voltage across it.

FIG. 3-3 shows a preferred embodiment for the rectification portion of a low voltage high current supply. The element LT 306 (total series inductance) is defined as the total of the transformer leakage inductance plus any other inductance in series with the transformer (inductance in the primary is simply scaled to the secondary). The element CT (total parallel capacitance) is defined as the total of the SR adjunct capacitance 305 (Coss), plus any external parallel capacitance of each SR 307 (Csr) plus any capacitance in parallel with the transformer secondary 308 (Cp).

There are several parameters which may be considered to optimize this circuit. If the load being powered has the possibility of high di/dt or if the load current can be a step function up or down then the following parameters could be considered:

fundamental frequency of operation transformer turns ratio

LT

CT conduction angle (CA) for the SR's phase delay (PD) of the SR's

The output inductance LF and capacitance CF can be important but may have a less direct impact on the proper operation of the invention.

Also to be potentially considered is the basic relationship between conduction angle and efficiency. In prior art and practice the conduction angle for the SR's has been carefully chosen to be less than or equal to 180 degrees (i.e., no SR conduction overlap) to prevent a short circuit on the transformer secondary. This common misperception arises from lower frequency assumptions. With the present invention, a conduction angle greater than 180 degrees is not only allowed but provides a fundamental benefit of operation. Conduction angles in the range of 300 degrees or higher are clearly demonstrated. With properly chosen LT, CT, phase angle (PA) and conduction angle (CA), the drain waveforms on the SR's 304 shown in FIG. 3-4 can be realized. With these conditions, a low ratio of SR root-mean-square (RMS) current to output current can be realized. Ratios of <1.3:1 have been achieved.

Just as a general comparison, the waveforms from FIG. 3-4 can be compared to FIG. 3-2 from the prior art. They both share the low duty cycle aspect but it is clear in FIG. 3-4 the switching of the SR occurs at zero volts and is ideally lossless.

Leakage Inductance & Overlapping Conduction Angle

The transformer leakage inductance is a fundamental limiting factor for low voltage, high current, high frequency power supplies. It consists of an inductance in series with the transformer and has historically limited the conversion frequency.

In other art leakage inductance has been dealt with in various ways. Three patents, by Schlecht, Lee and Bowman, covering dc to dc converters will be touched on as all include methods of handling the leakage inductance. In Schlecht et al., U.S. Pat. No. 4,788,634, the leakage inductance is managed by minimizing it. As that patent states: "It is desirable to limit the size of this leakage inductance to a negligibly small value compared to the resonant inductor (in this case the transformer primary inductance) such that the unilateral conducting element and controllable switch both have zero voltage switching transitions." In Lee et al., U.S. Pat. No. 4,785,387 and Bowman U.S. Pat. No. 4,605,999 the transformer leakage inductance is used in a circuit resonant at or slightly above the fundamental frequency. The goal for this circuit is to accomplish zero voltage switching both for the primary switches as well as for the rectifiers. However, the present invention shows use of the leakage inductance in a manner not resonant at the fundamental frequency.

One fundamental aspect of this invention is a circuit topology and class of operation which can make allowance for a larger leakage inductance. This benefit can be realized by the choice of a high conduction angle in the SR's. In fact, for some applications conduction angles even greater than 300 degrees are shown to be valuable. As the output voltage requirement is reduced and the current requirement is increased, both of these shifts result in still higher conduction angles. The setting of this large conduction angle, the total inductance and total capacitance is done simultaneously with one of the desirable conditions being Zero Voltage Switching (ZVS) for the synchronous rectifiers. This allows operation at a higher frequency or, at a given frequency operation with a higher leakage inductance. This combination of high frequency operation and/or higher leakage inductance tolerance is a fundamental benefit of this design and may perhaps be a necessary benefit as microprocessor power requirements become more difficult to fulfill.

One additional note with respect to the total capacitance—the choice of location between putting the capacitor across the transformer 308 or across the SR's 307 changes the current waveform through the SR's but does not greatly affect the voltage waveform. With the capacitor across the transformer makes the current waveform more like a square wave while it is quasi-sinusoidal when the capacitor is across the SR. This difference can have significant ramifications as those of ordinary skill in the art should readily understand to some degree.

High Voltage on SR

One general principal observed in rectifier circuit design is to minimize the reverse voltage stress across the rectifier device. Depending on the type of filter input the peak inverse voltage is usually in the range of being equal to the DC output voltage upwards to 1.4 times the output voltage or in rare circumstances up to twice the DC output voltage.

One consequence though of the high conduction angle is substantially higher voltage across the rectifier devices. For example in the circuit values disclosed here the output voltage is 1.8 volts while the voltage across the rectifier devices is 15 volts! Historically this type of circuit performance has been thought of as poor practice for a variety of reasons as those of ordinary skill in the art well understand. Perhaps this is one reason why such a valuable circuit has not been discovered to date.

But a high conductance angle with attendant high voltage across the SR during the non-conducting state has the benefit of low RMS current through the SR during the conducting state and is a condition for allowing large transformer leakage inductance. This circuit is ideally suited for low voltage, high current requirements. Furthermore it is well suited to loads which have a high di/dt requirement as a result of the higher operating frequency and lower stored energy in the output capacitance. As it turns out the higher voltage requirement for the SR's is not troublesome. With current manufacturing technology there appears to little benefit to restraining the SR off state voltage to less than about 20 volts.

Gate Drive

The next circuit being disclosed, FIG. 3-5, is a gate drive circuit that derives its power from the ac input and uses only passive elements. The gate drive of the SR's is also almost lossless. This all results in low cost and predictable performance. It is also important for higher frequency operation.

In addition it is possible to add a dc or low frequency bias to provide regulation or improve efficiency under various load conditions. In FIG. 3-5 the point labeled BIAS INPUT is an example of an injection point for the control input. Varying the voltage on this input has the effect of varying the conduction angle of the SR's without effecting the DELAY ANGLE (FIG. 3-4).

The correct phase angle for conduction of the SR's is determined by the gate drive. Referring to FIG. 3-4, the angle labeled DELAY ANGLE could be derived by using something like elements L1, R1,2 and C1,2 of FIG. 3-5. The inductance L1 includes the gate drive transformer leakage inductance.

There could be many variations of gate drive which embody these principles. This may be contrasted with conventional technology in which the gate drive is derived from a DC source and involves timing circuitry and switching devices.

Regulation With the SR

It is possible to also control and/or regulate the output voltage by varying the SR Conduction Angle (CA). Consider FIG. 3-3 again with the inclusion of the capacitor Cin 309 shown in dotted lines.

To select values for the controlled output circuit, first examine the case where the CA goes to 360 degrees for the SR's. This results in a zero DC output. The impedance of Cin 309 should now be matched to the value of LT (transformed to the primary by the square of the turns ratio) forming a parallel resonant circuit at the fundamental frequency. As can now be seen the AC input is only loaded by a parallel resonant circuit which in the ideal condition is lossless.

There exists a continuum of CA's from 360 degrees downward until the full load condition is reached as before. With properly chosen circuit parameters ZVS switching can be maintained over the whole regulation range. One important requirement for ZVS is to provide constant phase relationship between conduction time and the ac input. In the first order analysis, the only control input required is that shown in FIG. 3-5.

Parametric Regulation

Another method of providing regulation or control of the output could be to use parametric elements such as a varactor capacitor or saturable inductor to vary the output voltage. This can involve tuning the circuit to maximize the sensitivity to a given element and subsequently varying it. Another approach to this type of design is to begin with a basic transfer function having the characteristic of a voltage source. Then with small changes in one or more variable elements, the output can be held constant.

For some load requirements, this method of control may be the simplest or most cost effective. In particular loads which do not have high di/dt requirements or if the voltage required is not too low, parametric regulation may be ideal.

This method of control may have the disadvantage of poor response time for varying loads and poor input regulation. Another disadvantage is the incumbent increased sensitivity to component tolerances. In FIG. 3-4 it can be seen that the CA is quite large. In general, the optimum CA increases for lower output voltages. One consequence when using parametric regulation is that it can become increasingly difficult to manage the increased sensitivity of the output voltage to the actual circuit values. If the component sensitivity becomes unmanageable, it may be preferable to optimize the rectification portion of the circuit for rectification only and regulate or control on the primary side of the transformer, where the impedance is higher. Layout and component values can be more manageable on the primary. Naturally linear components such as linearly variable capacitors, linearly variable inductors, or even linearly variable resistors (as should be understood, resistors are likely not the preferred component since they may cause losses) may be utilized as well.

Regulation on the Primary Side (With a Single Ended Switch):

FIG. 3-6 shows a simplified series switch on the primary side of the transformer. This circuit design can be used to vary the ac voltage on the input of the transformer as a potential method of regulating the dc output. For instance, C1 310 can be resonant with any residual inductive component of the rectifier circuit. C2 311 may be low impedance at the fundamental frequency. The duty cycle of Q1 312 can be controlled to vary the ac voltage into the rectifier circuit. The phase delay 313 (L1, R1, and C4) may be chosen such that at the commencement of conduction the voltage across Q1 312 is substantially zero. Further, the gate drive of Q1 can be set in similar fashion to the gate drive for the synchronous rectifier discussed earlier. The ac input 315 may be used as the source power, transformed down in voltage and supplied to the gate through the delay circuit 313. In series with this drive signal can be a control input 314. By summing these two voltages the conduction angle can be varied from 0 to 360 degrees.

The conduction angle can be set by the control input and the phase relationship may be derived from the ac input 315. With properly chosen circuit elements and delay time, Q1 312 may be always commutated to the conducting state at a time when the voltage across it is zero. Thus the ac voltage to the rectifier circuit can be varied from nearly zero to full while maintaining a lossless condition. FIG. 3-7 shows a family of voltage waveforms across Q1 312 (Vds for a FET switch) as a function of the control input. The waveform labeled 316 occurs with a low bias that results in a short conduction time. This condition provides minimum output. The waveform labeled 320 occurs with a high bias input and corresponds to a large conduction angle and provides maximum output. A simultaneous optimization of all parameters is also possible.

Regulation on the Primary Side (With a Dual Switch)

FIGS. 3-8 and 3-12 show other arrangements to provide regulation on the primary side of the transformer. This circuit can use two switches 323 that may operate 180 degrees out of phase. They can operate so as to move from a series resonance between a capacitor 321 and the leakage inductance 322 of the series transformer 320. This occurs when both switches are closed. This shorts the primary inductance and leaves only a series resonance already mentioned. This condition can give maximum ac voltage to the rectifier circuit.

A second condition can occur when both switches are completely open. During this condition the capacitors 324 (which includes the switch adjunct capacitance) can be in series across the series switch transformer. It is also possible to just use a capacitor across the transformer 325 or a combination of both. This total capacitance can be resonant with the magnetizing inductance of the transformer. This can create a parallel resonant circuit in series with the primary of the main transformer and may result in minimum ac voltage to the rectifier circuit.

The third and normal condition can occur with a variable conduction angle. With the values disclosed this circuit can operate over the entire conduction range with ZVS.

Natural Regulation

If certain values of total inductance, total capacitance and the output filter inductance are chosen correctly a new phenomenon can exist. The DC output voltage can remain relatively independent of the load current. This can occur without any variable elements or feedback.

EXAMPLES

Choosing all the circuit parametric values can be a lengthy task. The following example is a general-purpose rectifier which may be optimized for powering a microprocessor operating at 1.8 volts and requiring 20 amperes. Using the circuit of FIG. 3-3 the following parametric values may be appropriate:

| | | |
|---|---|---|
| Frequency | = | 3.3 MHz |
| Turns ratio | = | 5:1 |
| Input voltage | = | 30 VAC |
| LT | = | 30 nH |
| CT | = | 10 nF |
| Cin | = | 2 nF |
| L1 & L2 | = | 100 nH |
| Co | = | 500 $\mu$F |
| SR1 & SR2 | = | 3 ea. FDS6880 |
| Conduction angle | = | 266 degrees |
| Delay angle | = | 24 degrees |

FIG. 3-5 shows one embodiment of a SR gate drive; it consists of summation of sinusoidal signal derived from the AC input plus a control signal. Also, the signal derived from the AC input can have an optimal delay for high efficiency. This circuit can produce a clean ac voltage by taking advantage of the gate transformer leakage inductance and the gate capacitance to filter harmonics from the ac input. This circuit can also show the creation of delay using R1,2, the combination of C1,2 (which includes the adjunct gate to source capacitance), and the inductor L1.

Output Trap

Also shown in FIG. 5 is a valuable filter element. C3 and L1 can form a parallel circuit resonant at twice the fundamental frequency. This parallel trap can provide the following advantages:

1) targeting largest ripple component only
2) storing very little energy—allowing fast loop control
3) sharply reducing the ac current component of the connection to the output capacitor.

If this circuit powers a microprocessor, the C4 may be critically located to minimize inductance to the microprocessor. In this case the parallel trap can minimize the 'hot leads' problem for the connection from the rest of the circuit to the Cout.

Topology Variations

FIGS. 3-9 A, B, C, and D show various topologies that may be used to implement the invention disclosed. The location of the total inductance and total capacitance is shown in each. FIG. 3-9 A shows a single ended version. This can be an excellent topology for low cost concerns. FIG. 3-9 B shows the effect of a transformer with a center tap. This circuit can be useful but may not utilize the transformer secondary fully. In addition for low voltages some realizations can require the secondary to have only one turn possibly making a center tap more difficult to implement. FIG. 3-9 C shows inverting the SR's and the filter inductors. This circuit can be almost identical to the preferred one. In addition, the gate drive may not be referenced to a common source point making the drive circuit more complex (not shown). FIG. 3-9 D shows a center tapped coil in place of a center tapped secondary. Some magnetic realizations make this circuit attractive. The essentials of this disclosure apply as well.

The above examples represent only a few of the many designs possible. It should be obvious from these variations that other circuits may be designed which embody the ideas disclosed.

Third Harmonic Trap

As may be understood from the above and the circuit designs, even or odd harmonics may exist or be of concern in different directions. For examples even order harmonics (i.e. 2nd, 4th, etc.) may be of concern in the forward direction and odd order harmonics (i.e. 3rd, 5th, etc.) may be of concern in the backward direction. Each may be addressed. Naturally, the highest order of such harmonics (ie. 2nd or 3rd) may be of initial interest. In the above discussion, a forward concerned, even order harmonic (e.g. the 2nd harmonic) was addressed. A backward concerned, odd order harmonic (e.g. the 3rd harmonic) may also be addressed. For the third harmonic, a series connection of an inductor and capacitor tuned to the third harmonic can be placed across the primary of the main VRM transformer. The preferred embodiment disclosed can draw an input current with substantial third harmonic content. By placing a trap on the input of the circuit the harmonic currents can flow through the trap and may not appear on the distribution supplying the circuit. As those skilled in the art would easily appreciate, by simple tuning, other harmonics can also be addressed.

More importantly, the efficiency of the rectifier can be improved with the addition of a third harmonic trap. The output circuit can be non-linear especially with the SR's having a long conduction angle (see FIG. 3-4).

The DC output voltage from this circuit (FIGS. 3-4 & 3-10) can be equal to the integral of the voltage across the SR's (the average voltage across an inductor must be zero). Any distortion of this waveform can usually cause a reduction of the DC output voltage and consequently a reduction in efficiency. The third harmonic trap can preserve the natural peak of the SR voltage waveform.

Another potential benefit of the third harmonic trap is improved stability of a system where multiple SR circuits are fed from a common AC source. A local third harmonic trap can prevent SR circuits from interacting due to third harmonic current flowing along the distribution path.

Better put, without a third harmonic trap negative impedance can exist during a SR non-conduction time. Slight phase variations between SR circuits can result in high harmonic energy flowing between SR circuits. This can manifest itself in overall system instability. The presence of a third harmonic trap on the input of each SR circuit can locally satisfy the high order current requirement and can result in system stability.

Remote Power

Devices like microprocessors can require low voltage, high current and exhibit high di/dt requirements. In the circuit of FIG. 3-10, one problem which can exist is the di/dt limitation caused by the interconnect inductance 326. In this commonly used circuit, bypass capacitor 328 (which may be composed by many small capacitors in parallel) can be located near the microprocessor power pins. A larger capacitor, often called the bulk capacitor 327, can be located a small distance away. The short distance between capacitors 327 and 328 can form an inductor 326. This inductor 326 may limit the maximum di/dt the microprocessor can pull from the power supply. This can be especially true if the bypass capacitor is small (this is normally the case) and/or the basic power conversion frequency is too low (also the normal case). The bypass capacitor 328 may not be kept charged to the demanded voltage. Even if the power supply feeding capacitor 327 were ideal, or if capacitor 327 were replaced with an ideal voltage source a di/dt limit might still exist as a result of the interconnect inductance 326.

In the circuit of the invention this problem can be overcome. Referring to FIG. 3-3, with this method and circuit the power conversion frequency can be increased to the point where the output capacitance can be small enough to be used as the microprocessor bypass capacitor which can be located adjacent to the microprocessor power pins. Thus the DC supply voltage for the particular component can be located electrically remote to the component itself. This location can avoid the need for providing the VRM immediately adjacent to the particular component involved. Importantly, with the present invention, the DC voltage can now be supplied at distances such as greater than about one-half an inch from the active portion (such as the microprocessor itself) of the component. By considering the active portion of the component, that is, the portion which consumes the power to achieve some desired function—other than merely transmitting the power such as wires or connectors or the like do, the true electrical effect of being remotely located can be fully appreciated. Significantly, with this design even greater distances for locating the power are possible. This may include distances of not only greater than about one-half an inch from the active portion, but also distances of greater than about one inch from the active portion and even distances of greater than about two inches from the active portion.

Quiet Power

One of the problems facing the power supply industry as voltages drop, currents increase and di/dt requirements increase is noise. The circuit of FIG. 3-1 is noisy for three reasons.

First the switching FET's 329 may be force commutated with steep voltage wavefronts. This can conduct and radiate noise into the surrounding structures. Compare the voltage waveforms of FIG. 3-2 to those of FIG. 3-4 to see the difference.

Second, the input circuit shown in FIG. 3-1 can inject current into the ground path. As he FET's 329 are switched, large current can flow around loop 330 through the input capacitor 32, interconnect inductance 331 and FET's 329. The rate of change of current di/dt around this loop 330 can cause a voltage to be developed across inductor 331 which can be impressed onto the output voltage.

Third, the output of a circuit like FIG. 3-1 can be inherently noisy as the DC output voltage is reduced. The DC output voltage is the average value of the voltage on point 2 shown in FIG. 3-2. The voltage regulation method is sometimes dubbed pulse width modulation. For lower output voltages the pulse width becomes narrower to the point of difficulty of control. This is because a variation in width is a larger percentage of the total pulse width. This can create a shaky or noisy output voltage.

The circuits being disclosed can use zero voltage switching (ZVS) and can have smooth voltage waveforms in the rectification circuitry. Compare the voltage waveforms for FIG. 3-2 (Prior Art) to FIG. 3-4. It is obvious the waveforms on the invention will be less noisy. Secondly in one preferred embodiment the regulation can occur on the primary of the transformer. This circuit is also ZVS plus it is isolated from the DC output voltage. These factors combined can make this approach much more suited to the next generation low voltage devices.

Additional Example

FIGS. 3-11 and 3-12 show schematics for a complete ac to dc power converter which can include the rectifier section, the gate drive, the series switch(es) along with a self derived dc power supply and feedback from the output to the series switch for regulation. These schematics can embody much of what has been disclosed and can show a complete working 1.8 volt, 20 ampere DC power supply suitable for loads requiring high di/dt. They can operate from an AC input buss at 30 volts RMS at a frequency of 3.39 MHz. Finally, FIG. 3-13 shows a potential design for some significant overall portions of the "silver box" as it may be configured in one preferred design.

Regulation on the Primary Side (With a Variable Capacitor)

The difference between a series switch on the primary side of the transformer and a capacitor is that the capacitor can present a lossless element. It may also be a linear element. Referring to the embodiment shown in FIG. 3-14, the variable capacitor (C1) can create a phase shift between the primary AC energy source and the primary winding of the main transformer. In this configuration of the primary side regulator the mechanism of regulation is different from the one described previously for single and dual switches. No resonance of the magnetizing inductance is involved for the process of regulation. The primary elements of regulation for this topology may include the gate drive phase angle and the combination of series capacitor impedance with SR input impedance. Certain combinations of values of the series capacitor, the leakage inductance of the transformer(s), and the natural or additional capacitances of the SRs can provide a number of advantages including:

1) The circuit can be relatively insensitive to the magnetization inductance of the transformer (e.g. the stability of magnetic permeability of materials used for transformers can be largely irrelevant);
2) The phase delay circuit for the gate drive of the SR may no longer be required, (e.g. elements L1, R1, R2, C1 and C2 as shown in FIG. 3-5 can be excluded);
3) In situations of a variable load, while undergoing the variable load conditions (e.g. an output current change) the SR gate drive voltage can adjust automatically to the most efficient value for the given load condition. For example, in one of the practical realizations of this circuit the efficiency at 10% current load was only 15% less than at full load!
4) The reactive part of the circuit can become constant under different load conditions and may be brought to zero (for series equivalent R-X circuit) by adding a parallel inductor to the input of the circuit. That is, the input impedance of the circuit can stay substantially non-reactive for the full range of load conditions. This is shown in FIG. 3-15 for various load conditions. This aspect can be important for the primary energy source as most AC generators can work efficiently only into substantially resistive loads. This feature can allow the use of a less complicated AC generator for the primary power source.
5) the phenomenon of natural regulation can appear. This can result in limiting the range required for the series capacitor to achieve the full range of load regulation. For example, in one embodiment, the series capacitor value range needed is only ±25% of the mean value. A simple varactor element may be used to achieve this.

Regulation on the Primary Side (With a Switch Equivalent of the Variable Capacitor)

As a result of the limited range of the capacitance required a ZVS switch can be used as an analog equivalent on the primary side of transformer. The configuration of one realization of the switch equivalent can be similar to that described above with regard to FIG. 3-8, but it operates in a different mode. This circuit can use two switches that may operate 180 degrees out of phase as can be understood from FIG. 3-12. The circuit may be galvanically isolated from the SR with a transformer. There may be no special requirements for the transformer except in many cases it may need to have stable leakage inductance. The leakage inductance value can also be taken into account during circuit design and compensated if necessary. Neither magnetization inductance nor leakage inductance may need to be part of a resonant circuit. There also may be no special requirements for stability of the core magnetic permeability for the transformer. With properly chosen circuit parameters ZVS switching and equivalence to the linear variable capacitor can also be maintained over the whole regulation range. Control of the value of effective capacitance may be set by the control DC bias voltage on the FET gates. In contrast to the Series Switch embodiment described above, the waveform across the insulation transformer may be substantially sinusoidal over the whole regulation range and the amplitude may only change under a different load condition.

Output Transformer

Yet another potentially independent aspect of the invention is shown in FIG. 3-14. This shows another option for the output filter element for the SR. Instead of two output inductors such as Lf shown in FIG. 3-3, only one transformer with 1:1 ratio can be used. More generally, the output transformer may simply be two output inductances (W3 and W4 in FIG. 3-14) which are coupled in some manner. By using a magnetic coupling or even a transformer, the following advantages can be realized:

1) Only one magnetic element instead of two may be used;
2) The fundamental frequency ac current through the magnetic elements may be sharply reduced, reducing also the radiated ac magnetic field;
3) Leakage inductance of the transformer may b used as a filtering element for the output of the SR. Again, leakage inductance in the first approach may not depend on magnetic permeability of the core hence no special requirements for magnetic material stability;
4) The output DC current from the two halves of the SR may flow through the transformer in opposite directions and cancel each other so the resulting DC magnetic field in the transformer core may be nearly zero. As a result there may be no magnetic saturation in the core and a small amount of magnetic material can be used in a closed configuration (toroid).

The discussion included in this patent is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. A variety of changes may be made without departing from the essence of the invention. All these are implicitly included in this disclosure. Where the invention is described in device-oriented terminology, each element of the device implicitly performs a function. Apparatus claims are included for many of the embodiments described, however only initial method claims are presented. Both additional method claims to track the apparatus claims presented and even additional method and/or apparatus to address the various functions the invention and each element performs may be included. Product by process claims or the like may also be added to any results achieved through such systems. Importantly, it should be understood that neither the description, nor the terminology, nor the specific claims presented is intended to limit the scope of the patent disclosure or the coverage ultimately available. Coverage for computer system as well as other electronics items may be presented and should be understood as encompassed by this application regardless of what is initially presented or the title indicated. All this should be particularly noted with respect to the method claims as well. Although claims directed to the apparatus have been included in various detail, for administrative efficiencies, only initial claims directed toward the methods have been included. Naturally, the disclosure and claiming of the apparatus focus in detail is to be understood as sufficient to support the full scope of both method and apparatus claims. Additional method claims may and likely will be added at a later date when appropriate to explicitly claim such details. Thus, the present disclosure is to be construed as encompassing the full scope of method claims, including but not limited to claims and subclaims similar to those presented in a apparatus context. In addition other claims for embodiments disclosed but not yet claimed may be added as well.

Further, the use of the principles described herein may result in a wide variety of configurations and, as mentioned, may permit a wide variety of design tradeoffs. In addition, each of the various elements of the invention and claims may also be achieved in a variety of manners or may be presented independently. This disclosure should be understood to encompass each such variation and the various combinations and permutations of any and all elements or applications. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "switch" should be understood to encompass disclosure of the act of "switching"—whether explicitly discussed or not —and, conversely, were there only disclosure of the act of "switching", such a disclosure should be understood to encompass disclosure of a "switch" or even a "means for switching." Such changes and alternative terms are to be understood to be explicitly included in the description as is particularly true for the present invention since its basic concepts and understandings are fundamental in nature and can be applied in a variety of ways to a variety of fields.

Furthermore, any references mentioned in the application for this patent as well as all references listed in any list of references filed with the application are hereby incorporated by reference, however, to the extent statements might be considered inconsistent with the patenting of this invention such statements are expressly not to be considered as made by the applicant.

Finally, unless the context requires otherwise, the word "comprise" or variations such as "comprises" or "comprising", should be understood to imply the inclusion of a stated element or step or group of elements or steps but not the exclusion of any other element or step or group of elements or steps.

What is claimed is:

1. A DC powered computer system comprising:
   a. a utility power input which supplies AC utility power having a line frequency;
   b. a line voltage rectifier element which converts said AC utility power to a DC signal;
   c. an inverter element responsive to said DC signal which establishes an alternating power output;
   d. a frequency driver which controls said inverter element to establish a distribution frequency;
   e. a supply transformer element which is responsive to said alternating power output and which establishes at least one distribution output at at least one distribution voltage;
   f. a power distribution system responsive to said supply transformer element and which provides computer components power at locations electrically remote from said inverter element;
   g. at least one electrically remote voltage regulation module responsive to said power distribution system comprising;
      1) an alternative power input;
      2) at least one voltage regulation module transformer which is responsive to said alternative power input;
      3) a first switched voltage regulation module rectifier element responsive to said voltage regulation module transformer element;
      4) a second switched voltage regulation module rectifier element responsive to said voltage regulation module transformer element;
      5) a passive rectifier control to which said first and said second switched voltage regulation module rectifier elements are responsive;
      6) a bias input to which said passive rectifier control is responsive;
      7) a second harmonics trap which is responsive to said first and said second voltage regulation module rectifier elements; and
      8) a substantially non-capacitive DC output system which is responsive to said second harmonics trap; and
   h. at least one computer component responsive to said DC supply output.

2. A DC powered computer system as described in claim 1 wherein said computer component responsive to said remote power DC supply system comprises a component operating at a nominal DC voltage selected from a group consisting of: less than about 2 volts, less than about 1.8 volts, less than about 1.5 volts, less than about 1.3 volts, less than about 1 volt, and less than about 0.4 volts.

3. A DC powered computer system as described in claim 2 wherein said computer component is capable of a rapid current demand which rises at a level selected from a group consisting of: at least about 0.2 amperes per nanosecond, at least about 0.5 amperes per nanosecond, at least about 1 ampere per nanosecond, at least about 3 amperes per nanosecond, at least about 10 amperes per nanosecond, and at least about 30 amperes per nanosecond.

4. A DC powered computer system as described in claim 3 wherein said computer component comprises a component operating at a maximum current selected from a group consisting of: more than about 15 amperes, more than about 20 amperes, more than about 50 amperes, and more than about 100 amperes.

5. A DC powered computer system as described in claim 1 wherein said passive rectifier control to which said first and said second switched voltage regulation module rectifier elements are responsive comprises an alternating control input.

6. A DC powered computer system as described in claim 5 wherein said alternating control input comprises a sinusoidal drive system to which said first switched voltage regulation module rectifier element and said second switched voltage regulation module rectifier element are responsive.

7. A DC powered computer system as described in claim 6 wherein said voltage regulation module further comprises:
 a. a first rectifier inductive output responsive to said first switched voltage regulation module rectifier element;
 b. a second rectifier inductive output responsive to said second switched voltage regulation module rectifier element; and
 c. a rectifier junction responsive to both said first rectifier inductive output and said second rectifier inductive output, and
wherein said second harmonics trap comprises a parallel inductor and parallel capacitor connected to said rectifier junction.

8. A DC powered computer system as described in claim 7 wherein said voltage regulation module further comprises an alternating input voltage regulator to which said voltage regulation module transformer is responsive.

9. A DC powered computer system as described in claim 8 wherein said alternating input voltage regulator comprises a variable capacitor.

10. A DC powered computer system as described in claim 8 wherein said alternating input voltage regulator comprises a series switch element.

11. A DC powered computer system as described in claim 10 wherein said series switch element comprises two switch elements.

12. A DC powered computer system as described in claim 8 wherein said alternating input voltage regulator comprises a regulator isolation element.

13. A DC powered computer system as described in claim 11 wherein said two switch elements comprise switch elements driven at about a 180 degree phase relationship.

14. A DC powered computer system as described in claim 8 wherein said voltage regulation module further comprises a DC output coupling responsive to both said first rectifier inductive output and said second rectifier inductive output.

15. A DC powered computer system as described in claim 14 wherein said voltage regulation module further comprises a third harmonics trap.

16. A DC powered computer system as described in claim 15 wherein said voltage regulation module transformer has a primary side and wherein said third harmonics trap comprises a third harmonics trap electrically tied to said primary side of said voltage regulation module transformer element.

17. A DC powered computer system comprising:
 a. a utility power input which supplies AC utility power having a line frequency;
 b. a line voltage rectifier element which converts said AC utility power to a DC signal;
 c. an inverter element responsive to said DC signal which establishes an alternating power output;
 d. a frequency driver which controls said inverter element to establish a distribution frequency;
 e. a supply transformer element which is responsive to said alternating power output and which establishes at least one distribution output at at least one distribution voltage;
 f. a power distribution system responsive to said supply transformer element and which provides computer components power at locations electrically remote from said inverter element;
 g. at least one electrically remote voltage regulation module responsive to said power distribution system comprising;
  1) a first voltage regulation module rectifier element;
  2) a second voltage regulation module rectifier element;
  3) an overlapping rectifier control system to which said first and said second voltage regulation module rectifier elements are responsive; and
  4) a DC supply output responsive to said first voltage regulation module rectifier element and said second voltage regulation module rectifier element; and
 h. at least one computer component responsive to said DC supply output.

18. A DC powered computer system as described in claim 17 wherein said overlapping rectifier control system to which said first and said second voltage regulation module rectifier elements are responsive causes conduction in both said first voltage regulation module rectifier element and said second voltage regulation module rectifier element to simultaneously occur at at least some time.

19. A DC powered computer system as described in claim 17 wherein said overlapping rectifier control system to which said first and said second voltage regulation module rectifier elements are responsive comprises an overlapping rectifier control system configured to create a conduction angle in each of said first and said second voltage regulation module rectifier elements selected from a group consisting of:
 at least about 180 degrees,
 at least about 300 degrees,
 a conduction angle which creates a low rectifier RMS current,
 a conduction angle which creates a rectifier RMS current which less than about 1.3 as compared to a DC output current,
 a conduction angle which creates a rectifier RMS current which less than about 1.4 as compared to a DC output current,
 a conduction angle which creates a rectifier RMS current which less than about 1.5 as compared to a DC output current, and
 a conduction angle which creates zero voltage on said rectifier at the time when said rectifier is switched to a conductive state.

20. A DC powered computer system as described in claim 17 or 18 wherein said voltage regulation module further comprises high voltage response circuitry which subjects said first and said second voltage regulation module rectifier elements to a high voltage when said first and said second voltage regulation module rectifier elements are in a non-conducting state.

21. A DC powered computer system as described in claim 20 wherein said high voltage response circuitry subjects said first and said second voltage regulation module rectifier elements to a voltage selected from a group consisting of:
  at least about 1.4 times the voltage to which said first and said second voltage regulation module rectifier elements are subjected in a conducting state,
  at least about 8 times the voltage to which said first and said second voltage regulation module rectifier elements are subjected in a conducting state,
  at least about 15 volts, and at least about 20 volts when said first and said second voltage regulation module rectifier elements are in a non-conducting state.

22. A DC powered computer system comprising:
a. a utility power input which supplies AC utility power having a line frequency;
b. a line voltage rectifier element which converts said AC utility power to a DC signal;
c. an inverter element responsive to said DC signal which establishes an alternating power output;
d. a frequency driver which controls said inverter element to establish a distribution frequency;
e. a supply transformer element which is responsive to said alternating power output and which establishes at least one distribution output at at least one distribution voltage;
f. a power distribution system responsive to said supply transformer element and which provides computer components power at locations electrically remote from said inverter element;
g. at least one voltage regulation module responsive to said power distribution system comprising;
  1) at least one voltage regulation module rectifier element;
  2) at least one harmonic trap which is responsive to said voltage regulation module rectifier element;
  3) a DC supply output responsive to said voltage regulation module rectifier element; and
h. at least one computer component responsive to said DC supply output.

23. A DC powered computer system as described in claim 22 wherein said harmonic trap which is responsive to said voltage regulation module rectifier element substantially eliminates transmission away from said voltage regulation module of at least one harmonic frequency.

24. A DC powered computer system as described in claim 22 wherein said voltage regulation module rectifier element comprises a switched voltage regulation module rectifier element.

25. A DC powered computer system as described in claim 24 wherein said switched voltage regulation module rectifier element comprises:
a. a first switched voltage regulation module rectifier element; and
b. a second switched voltage regulation module rectifier element.

26. A DC powered computer system as described in claim 22 or 25 wherein said voltage regulation module further comprises a voltage regulation module transformer element to which said voltage regulation module rectifier element is responsive.

27. A DC powered computer system as described in claim 22 wherein said harmonic trap which is responsive to said voltage regulation module rectifier element comprises a forward transmitted harmonics trap.

28. A DC powered computer system as described in claim 22 wherein said harmonic trap which is responsive to said voltage regulation module rectifier element comprises an even harmonics trap.

29. A DC powered computer system as described in claim 28 wherein said even harmonics trap comprises a second harmonics trap.

30. A DC powered computer system as described in claim 29 wherein said voltage regulation module comprises:
a. a first switched voltage regulation module rectifier element;
b. a first rectifier inductive output responsive to said first switched voltage regulation module rectifier element;
c. a second switched voltage regulation module rectifier element;
d. a second rectifier inductive output responsive to said second switched voltage regulation module rectifier element; and
e. a rectifier junction responsive to both said first rectifier inductive output and said second rectifier inductive output, and wherein said second harmonics trap comprises a parallel inductor and parallel capacitor connected to said rectifier junction and tuned to said second harmonic frequency.

31. A DC powered computer system as described in claim 22 wherein said harmonic trap which is responsive to said voltage regulation module rectifier element comprises a backward transmitted harmonics trap.

32. A DC powered computer system as described in claim 22 wherein said harmonic trap which is responsive to said voltage regulation module rectifier element comprises an odd harmonics trap.

33. A DC powered computer system as described in claim 32 wherein said odd harmonics trap comprises a third harmonics trap.

34. A DC powered computer system as described in claim 33 wherein said voltage regulation module further comprises a voltage regulation module transformer element to which said voltage regulation module rectifier element is responsive and having a primary side and wherein said third harmonics trap comprises a third harmonics trap tied to said primary side of said voltage regulation module transformer element.

35. A DC powered computer system as described in claim 34 wherein said third harmonics trap tied to said primary side of said voltage regulation module transformer element comprises a series inductor and a series capacitor tied to said primary side of said voltage regulation module transformer element.

36. A DC powered computer system comprising:
a. a utility power input which supplies AC utility power having a line frequency;
b. a line voltage rectifier element which converts said AC utility power to a DC signal;
c. an inverter element responsive to said DC signal which establishes an alternating power output;
d. a frequency driver which controls said inverter element to establish a distribution frequency;
e. a supply transformer element which is responsive to said alternating power output and which establishes at least one distribution output at at least one distribution voltage;
f. a power distribution system responsive to said supply transformer element and which provides computer components power at locations electrically remote from said inverter element;
g. at least one electrically remote voltage regulation module responsive to said power distribution system comprising:
  1) at least one switched voltage regulation module rectifier element;

2) at least one passive rectifier control to which said switched voltage regulation module rectifier element is responsive; and
3) a DC supply output responsive to said switched voltage regulation module rectifier element; and
h. at least one computer component responsive to said DC supply output.

37. A DC powered computer system as described in claim 36 wherein said switched voltage regulation module rectifier element comprises:
a. a first switched voltage regulation module rectifier element; and
b. a second switched voltage regulation module rectifier element.

38. A DC powered computer system as described in claim 37 wherein said voltage regulation module further comprises a voltage regulation module transformer element to which said voltage regulation module rectifier element is responsive.

39. A DC powered computer system as described in claim 36 wherein said passive rectifier control to which said switched voltage regulation module rectifier element is responsive comprises an alternating control input.

40. A DC powered computer system as described in claim 38 wherein said voltage regulation module transformer element to which said voltage regulation module rectifier element is responsive has an alternating transformer input and wherein said alternating control input is responsive to said alternating transformer input.

41. A DC powered computer system as described in claim 36 or 39 wherein said passive rectifier control comprises a bias input.

42. A DC powered computer system as described in claim 41 wherein said passive rectifier control to which said switched voltage regulation module rectifier element is responsive comprises a rectifier control transformer having a secondary side and wherein said bias input is electrically connected to said secondary side of said rectifier control transformer.

43. A DC powered computer system comprising:
a. a utility power input which supplies AC utility power having a line frequency;
b. a line voltage rectifier element which converts said AC utility power to a DC signal;
c. an inverter element responsive to said DC signal which establishes an alternating power output;
d. a frequency driver which controls said inverter element to establish a distribution frequency;
e. a supply transformer element which is responsive to said alternating power output and which establishes at least one distribution output at at least one distribution voltage;
f. a power distribution system responsive to said supply transformer element and which provides computer components power at locations electrically remote from said inverter element;
g. at least one electrically remote voltage regulation module responsive to said power distribution system comprising;
1) a first switched voltage regulation module rectifier element;
2) a first rectifier output inductance responsive to said first switched voltage regulation module rectifier element;
3) a second switched voltage regulation module rectifier element;
4) a second rectifier output inductance responsive to said second switched voltage regulation module rectifier element; and
5) a DC output coupling responsive to both said first rectifier output inductance and said second rectifier output inductance;
6) a DC supply output responsive to said first switched voltage regulation module rectifier element and said second switched voltage regulation module rectifier element; and
h. at least one computer component responsive to said DC supply output.

44. A DC powered computer system as described in claim 43 wherein said DC output coupling responsive to both said first rectifier output inductance and said second rectifier output inductance comprises a magnetic coupling.

45. A DC powered computer system as described in claim 43 wherein said first rectifier output inductance, said second rectifier output inductance, and said DC output coupling responsive to both said first rectifier output inductance and said second rectifier output inductance comprise a voltage regulation module output transformer.

46. A DC powered computer system comprising:
a. a utility power input which supplies AC utility power having a line frequency;
b. a line voltage rectifier element which converts said AC utility power to a DC signal;
c. an inverter element responsive to said DC signal which establishes an alternating power output;
d. a frequency driver which controls said inverter element to establish a distribution frequency;
e. a supply transformer element which is responsive to said alternating power output and which establishes at least one distribution output at at least one distribution voltage;
f. a power distribution system responsive to said supply transformer element and which provides computer components power at locations electrically remote from said inverter element;
g. at least one electrically remote voltage regulation module responsive to said power distribution system;
h. a remote power DC supply system responsive to said electrically remote voltage regulation module and which provides computer components power at locations electrically remote from said voltage regulation module; and
i. at least one electrically remote low voltage, high current computer component responsive to said remote power DC supply system.

47. A DC powered computer system as described in claim 46 wherein said low voltage, high current computer component has an active component and wherein said remote power DC supply system provides said low voltage, high current computer components power over a distance selected from a group consisting of: over at least about one-half inch from said voltage regulation module to said active portion of said low voltage, high current computer component, over at least about one inch from said voltage regulation module to said active portion of said low voltage, high current computer component, over at least about two inches from said voltage regulation module to said active portion of said low voltage, high current computer component.

48. A DC powered computer system as described in claim 46 wherein said low voltage, high current computer component responsive to said remote power DC supply system comprises a component operating at a nominal DC voltage selected from a group consisting of: less than about 2 volts, less than about 1.8 volts, less than about 1.5 volts, less than about 1.3 volts, less than about 1 volt, and less than about 0.4 volts.

49. A DC powered computer system as described in claim 46 or 48 wherein said low voltage, high current computer component is capable of a rapid current demand which rises at a level selected from a group consisting of: at least about 0.2 amperes per nanosecond, at least about 0.5 amperes per nanosecond, at least about 1 ampere per nanosecond, at least about 3 amperes per nanosecond, at least about 10 amperes per nanosecond, and at least about 30 amperes per nanosecond.

50. A DC powered computer system as described in claim 46 or 48 wherein said low voltage, high current computer component comprises a component operating at a maximum current selected from a group consisting of: more than about 15 amperes, more than about 20 amperes, more than about 50 amperes, and more than about 100 amperes.

51. A DC powered computer system comprising:
   a. a utility power input which supplies AC utility power having a line frequency;
   b. a line voltage rectifier element which converts said AC utility power to a DC signal;
   c. an inverter element responsive to said DC signal which establishes an alternating power output;
   d. a frequency driver which controls said inverter element to establish a distribution frequency;
   e. a supply transformer element which is responsive to said alternating power output and which establishes at least one distribution output at at least one distribution voltage;
   f. a power distribution system responsive to said supply transformer element and which provides computer components power at locations electrically remote from said inverter element;
   g. at least one electrically remote voltage regulation module responsive to said power distribution system comprising:
      1) an alternative power input;
      2) at least one voltage regulation module transformer element which is responsive to said alternative power input;
      3) at least one voltage regulation module rectifier element which is responsive to said voltage regulation module transformer element; and
      4) a substantially non-capacitive DC output system which is responsive to said voltage regulation module rectifier element; and
   h. at least one computer component responsive to said substantially non-capacitive DC output system.

52. A DC powered computer system as described in claim 51 wherein said at least one computer component responsive to said substantially non-capacitive DC output system comprises a low voltage, high current computer component.

53. A DC powered computer system as described in claim 51 wherein said substantially non-capacitive DC output system comprises a DC output system having an effective capacitance selected from a group consisting of: less than about 0.3 millifarads, less than about 0.5 millifarads, less than about 1 millifarads, less than about 3 millifarads, less than about 10 millifarads, about only the inherent capacitance of a response network, about only an inherent reactance of a component connector, about only an inherent capacitance of said computer component, about only a bypass capacitance of a microprocessor, and any permutations or combinations of the above.

54. A DC powered computer system as described in claim 51 wherein said at least one computer component responsive to said substantially non-capacitive DC output system comprises a low voltage, high current computer component.

55. A DC powered computer system as described in claim 51 wherein said substantially non-capacitive DC output system comprises a DC output system having an effective capacitance selected from a group consisting of: less than about 0.3 millifarads, less than about 0.5 millifarads, less than about 1 millifarads, about only the inherent capacitance of a response network, about only an inherent reactance of a component connector, about only an inherent capacitance of said computer component, about only a bypass capacitance of a microprocessor, and any permutations or combinations of the above.

56. A DC powered computer system as described in claim 51 wherein said substantially non-capacitive DC output system comprises a DC output system having an effective capacitance selected from a group consisting of: less than about 3 millifarads, and less than about 10 millifarads.

* * * * *